United States Patent
Sugar et al.

(10) Patent No.: US 7,254,191 B2
(45) Date of Patent: Aug. 7, 2007

(54) SYSTEM AND METHOD FOR REAL-TIME SPECTRUM ANALYSIS IN A RADIO DEVICE

(75) Inventors: Gary L. Sugar, Rockville, MD (US); Karl A. Miller, Frederick, MD (US); Jong Sup Baek, Rockville, MD (US)

(73) Assignee: Cognio, Inc., Germantown, MD (US)

( * ) Notice: Subject to any disclaimer, the term of this patent is extended or adjusted under 35 U.S.C. 154(b) by 783 days.

(21) Appl. No.: 10/420,511

(22) Filed: Apr. 22, 2003

(65) Prior Publication Data

US 2004/0028123 A1  Feb. 12, 2004

Related U.S. Application Data

(63) Continuation-in-part of application No. 10/246,365, filed on Sep. 18, 2002, now Pat. No. 6,714,605.

(60) Provisional application No. 60/320,008, filed on Mar. 14, 2003, provisional application No. 60/453,385, filed on Mar. 10, 2003, provisional application No. 60/319,714, filed on Nov. 20, 2002, provisional application No. 60/319,542, filed on Sep. 11, 2002, provisional application No. 60/319,435, filed on Jul. 30, 2002, provisional application No. 60/380,891, filed on May 16, 2002, provisional application No. 60/380,890, filed on May 16, 2002, provisional application No. 60/374,365, filed on Apr. 22, 2002, provisional application No. 60/374,363, filed on Apr. 22, 2002.

(51) Int. Cl.
*H03D 1/00* (2006.01)
*H03L 27/06* (2006.01)

(52) U.S. Cl. ............... 375/340; 375/259; 375/224; 375/228

(58) Field of Classification Search ........ 375/340, 375/259, 224, 228, 316; 73/579; 324/76.21, 324/76.19, 76.22–76.25, 76.43, 76.47, 76.52–76.57; 455/226.1, 226.2; 702/75–77

See application file for complete search history.

(56) References Cited

U.S. PATENT DOCUMENTS 3,992,666 A  11/1976  Edwards et al. .......... 324/77 R (Continued)

FOREIGN PATENT DOCUMENTS

| CA | 2260336 | 8/2000 |
|---|---|---|
| CA | 2298316 | 8/2000 |

OTHER PUBLICATIONS

MEDAV, Dr Hans-Joachim Kolb, "Short Time Spectral Analysis Of Audio Signals On A PC," date unknown.

(Continued)

*Primary Examiner*—Phuong Phu
(74) *Attorney, Agent, or Firm*—Edell, Shapiro & Finnan, LLC

(57) ABSTRACT

A real-time spectrum analysis engine (SAGE) that comprises a spectrum analyzer component, a signal detector component, a universal signal synchronizer component and a snapshot buffer component. The spectrum analyzer component generates data representing a real-time spectrogram of a bandwidth of radio frequency (RF) spectrum. The signal detector detects signal pulses in the frequency band and outputs pulse event information entries output, which include the start time, duration, power, center frequency and bandwidth of each detected pulse. The signal detector also provides pulse trigger outputs which may be used to enable/disable the collection of information by the spectrum analyzer and the snapshot buffer components. The snapshot buffer collects a set of raw digital signal samples useful for signal classification and other purposes. The universal signal synchronizer synchronizes to periodic signal sources, useful for instituting schemes to avoid interference with those signals.

19 Claims, 24 Drawing Sheets

U.S. PATENT DOCUMENTS

| | | | |
|---|---|---|---|
| 4,054,785 A | 10/1977 | Lehmann | 708/405 |
| 4,084,245 A | 4/1978 | Bunge | 364/485 |
| 4,166,980 A | 9/1979 | Apostolos et al. | 325/363 |
| 4,227,255 A | 10/1980 | Carrick et al. | 455/226 |
| 4,336,541 A | 6/1982 | Tsui et al. | 343/18 E |
| 4,501,020 A | 2/1985 | Wakeman | 455/226 |
| 4,597,107 A | 6/1986 | Ready et al. | 455/226 |
| 4,818,949 A | 4/1989 | Cohen | 324/77 B |
| 4,839,582 A | 6/1989 | Fukaya et al. | 324/77 B |
| 4,947,338 A | 8/1990 | Vistica | 364/485 |
| 4,950,999 A | 8/1990 | Agnello et al. | 324/76.22 |
| 5,005,210 A | 4/1991 | Ferrell | 455/115 |
| 5,144,642 A | 9/1992 | Weinberg et al. | 375/10 |
| 5,210,820 A | 5/1993 | Kenyon | 395/2 |
| 5,230,087 A | 7/1993 | Meyer et al. | 455/67.1 |
| 5,271,036 A | 12/1993 | Lobert et al. | 375/227 |
| 5,303,262 A | 4/1994 | Johnson | 379/454 |
| 5,323,337 A | 6/1994 | Wilson et al. | 364/574 |
| 5,432,862 A | 7/1995 | Hirsch | 382/207 |
| 5,436,556 A | 7/1995 | Komninos | 324/76.23 |
| 5,446,370 A | 8/1995 | Voight | |
| 5,565,764 A * | 10/1996 | Priebe et al. | 324/76.21 |
| 5,574,979 A | 11/1996 | West | 455/63.1 |
| 5,697,078 A | 12/1997 | Peterson et al. | 455/190 |
| 5,706,202 A | 1/1998 | Itahara et al. | 702/77 |
| 5,745,777 A | 4/1998 | English et al. | 395/800 |
| 5,752,164 A | 5/1998 | Jones | |
| 5,808,463 A | 9/1998 | Nagano | 324/76.21 |
| 5,905,949 A | 5/1999 | Hawkes et al. | 455/410 |
| 5,956,633 A | 9/1999 | Chang et al. | 455/423 |
| 6,084,919 A | 7/2000 | Kleider et al. | 375/285 |
| 6,130,907 A | 10/2000 | Chen | 375/200 |
| 6,198,779 B1 * | 3/2001 | Taubenheim et al. | 375/316 |
| 6,226,680 B1 | 5/2001 | Boucher et al. | 709/230 |
| 6,229,997 B1 | 5/2001 | Addy | 455/226.1 |
| 6,229,998 B1 | 5/2001 | Hamdy et al. | 455/226.1 |
| 6,233,529 B1 | 5/2001 | Nonaka | 702/76 |
| 6,349,198 B1 | 2/2002 | Carlson et al. | 455/63.1 |
| 6,374,082 B1 | 4/2002 | Carlson | 455/63.1 |
| 6,385,434 B1 | 5/2002 | Chuprun et al. | 455/11.1 |
| 6,408,696 B1 * | 6/2002 | Jong | 73/579 |
| 6,484,111 B1 | 11/2002 | Nara | 702/77 |
| 6,509,728 B1 | 1/2003 | Uchino et al. | 324/76.15 |
| 6,512,788 B1 | 1/2003 | Kuhn et al. | 375/224 |
| 6,584,419 B1 | 6/2003 | Alexander | 702/68 |
| 6,629,151 B1 | 9/2003 | Bahl | 709/250 |
| 6,711,134 B1 | 3/2004 | Wichelman et al. | |
| 6,714,605 B2 | 3/2004 | Sugar et al. | |
| 6,850,735 B2 * | 2/2005 | Sugar et al. | 455/67.11 |
| 2001/0055952 A1 | 12/2001 | Ficarra | 455/67.3 |
| 2002/0086641 A1 | 7/2002 | Howard | 455/67.1 |
| 2002/0142744 A1 | 10/2002 | Okanoue et al. | 455/226.1 |
| 2002/0154614 A1 | 10/2002 | Jagger et al. | 370/332 |
| 2002/0155811 A1 | 10/2002 | Prismantas et al. | 455/63 |
| 2002/0177446 A1 | 11/2002 | Bugeja et al. | 455/450 |
| 2003/0050014 A1 | 3/2003 | Cain | 455/67.1 |
| 2003/0067662 A1 | 4/2003 | Brewer et al. | 359/189 |
| 2003/0123420 A1 | 7/2003 | Sherlock | 370/338 |
| 2003/0198200 A1 | 10/2003 | Diener et al. | 370/329 |
| 2003/0198304 A1 | 10/2003 | Sugar et al. | 375/340 |
| 2003/0224741 A1 | 12/2003 | Sugar et al. | 455/115.1 |
| 2004/0028003 A1 | 2/2004 | Diener et al. | |

OTHER PUBLICATIONS

Agilent publication, "Agilent PSA Performance Analyzer Series Swept And FFT Analysis, Product Note," 2000.

Agilent Publication, "Agilent 89400 Series Vector Signal Analyzer Product Overview," 2000.

Agilent Publication, "Agilent Technologies: 2G & 3G Solutions-Accelerating Progress," 2002.

Agilent Publication, "Agilent Technologies: Powerful Solutions To Complex Measurement Problems; Burst, Transient+Modulated Signal Analysis," 2000.

Agilent Publication, "Agilent PN 89400-8 Using Vector Modulation Analysis In The Integration, Troubleshooting And Design Of Digital RF Communications Systems," 2000 (and earlier).

Agilent Publication, "Agilent PN 89400-10 Time-Capture Capabilities Of The Agilent 89400 Series Vector Signal Analyzers," 2000 (and earlier).

Agilent Publication, "Agilent 89440A-1 Frequency And Time-Selective Power Measurements With The Agilent 89410A And 89440A," 2001 (and earlier).

Canadian Communications Research Center, "Spectrum Explorer Project Of Canadian Communications Research Center," 1998 (and later).

Stanford Research Systems, "Stanford Research Systems SR785 Two Channel Dynamic Signal Analyzer," 1998.

Agilent Publication, "Agilent Technologies Vector Signal Analyzer: Open New Windows For Alcatel Space Satellite Communications Business: Case Study," May 24, 2001.

MEDAV, Dr. Hans-Joachim Kolb, "Signal Processing And Neural Networks In Surveillance And Radio Monitoring," Excerpt from ETH Zurich, 1993.

Agilent Publication, "Agilent Technologies: Select The Right Agilent Signal Analyzer For Your Needs," 2003 (and earlier).

MEDAV, "MEDAV Astrid Analysis System For Telecom Signals, Recognition, Interception And Demodulation Of HF/VHF/UHF Radio Signals From 0 To 2 GHz," 2000.

MEDAV, "MEDAV OC-6040 PC-based 4-Channel Analyser and Demodulator for Narrowband COMINT Signals with Automatic Signal Recognition and Text Decoding Capability," 2002.

MEDAV, "Medav DSP-Kit Melab TM—Toolbox For Real-Time Measurement Acquisition," date unknown.

MEDAV, "Medav Spectro-Kit Online Spectrogram Analysis On A PC," date unknown.

Tektronix, "Net Tek® BTS Transmitter And Interference Analyzer Ybt250", Sep. 2002.

Boudreau, Daniel et al., "Monitoring Of The Radio-Frequency Spectrum With A Digital Analysis System", Jun. 27, 2000, Proceedings of the 15th International Wroclaw Symposium and Exhibition on Electromagnetic Compatibility.

BBN Technologies, "Using Signal Processing To Analyze Wireless Data Traffic," May 22, 2002, BBN Technical Memorandum No. 1321, prepared for DARPA.

Carlemalm, Catharina, "Suppression Of Multiple Narrowband Interferers In A Spread-Spectrum Communication System," Aug. 2000, IEEE Journal on Selected Areas in Communications, Special Issue on Broadband Communications, vol. 18.

Boudreau, Daniel et al., "A Fast Automatic Modulation Algorithm And Its Implementation In A Spectrum Monitoring Radio Signals", Oct. 2000, Milcom 2000.

Lo, Victor Yeeman, "Enhanced Spectral Analysis Tool (SAT) For Radio Frequency Interference Analysis And Spectrum Management," Milcom, 1998.

MEDAV, "Astrid++ Analysis, Monitoring, Recording And Multi-Channel Direction Finding Of Wideband Application," 2000.

Tektronix, "Real-Time Spectrum Analysis Tools Aid Transition To Third-Generation Wireless Technology," 1999.

Patenaude, Francois et al., "Spectrum Surveillance: System Architecture," CRC-TN-97-001, Canadian Communications Research Centre, Apr. 15, 1997.

Oscor, "Oscor 5000 Omni-Spectral Correlator," publication date unknown.

Anritsu, "MS2711A Handheld Spectrum Analyzer," May 2000.

PCT Search Report from counterpart PCT application No. PCT/US03/12376 filed Apr. 22, 2003.

Specification and Allowed claims from related U.S. Appl. No. 10/246,365 filed Sep. 18, 2002.

* cited by examiner

FIG. 11

| Time\Freq | 0 | 1 | 2 | 3 | 4 | 5 |
|---|---|---|---|---|---|---|
| 0 | -100 | -100 | -50 | -50 | -50 | -50 |
| 20 | -100 | -100 | -50 | -50 | -50 | -50 |
| 125 | -100 | -100 | -50 | -50 | -50 | -50 |
| 175 | -100 | -100 | -100 | -100 | -100 | -100 |
| 200 | -100 | -100 | -30 | -30 | -30 | -30 |
| 255 | -100 | -100 | -30 | -30 | -30 | -30 |
| | -100 | -100 | -30 | -30 | -30 | -30 |
| | -100 | -100 | -100 | -100 | -100 | -100 |
| | -100 | -100 | -100 | -50 | -50 | -50 |
| | -100 | -100 | -100 | -50 | -50 | -50 |
| | -100 | -100 | -100 | -50 | -50 | -50 |

↑

| SumPwr | DutyCnt | MaxPwr |
|---|---|---|
| -400 | 4 | -50 |
| -400 | 4 | -50 |
| -400 | 4 | -50 |
| -600 | 0 | -100 |
| -320 | 4 | -30 |
| -320 | 4 | -30 |
| -320 | 4 | -30 |
| -600 | 0 | -100 |
| -450 | 3 | -50 |
| -450 | 3 | -50 |
| -450 | 3 | -50 |

FIG. 12

| | Number of Stats Update Cycles With: |
|---|---|
| No Peaks | 2 |
| 1 Peak | 0 |
| 2 Peaks | 1 |
| 3 Peaks | 3 |
| 4 Peaks | 0 |
| 5 Peaks | 0 |
| 6 Peaks | 0 |
| 7 Peaks | 0 |
| 8 Peaks | 0 |
| 9 Peaks | 0 |

FIG. 14

| SAGE Address SDADDR[15:0] | DPR Word (32-bit) | MCU Internal Address | AHB Word Address MDADDR[15:0] | AHB Byte Enable MDBYTEEN[3:0] |
|---|---|---|---|---|
| 0000h | Word 0 | XXXX0000h | XXXX0000h | 0 |
| 0001h | Word 1 | XXXX0004h | XXXX0001h | 0 |
| 0002h | Word 2 | XXXX0008h | XXXX0002h | 0 |
| FFFFh | Word 65,535 | XXX3FFFCh | XXXXFFFFh | 0 |

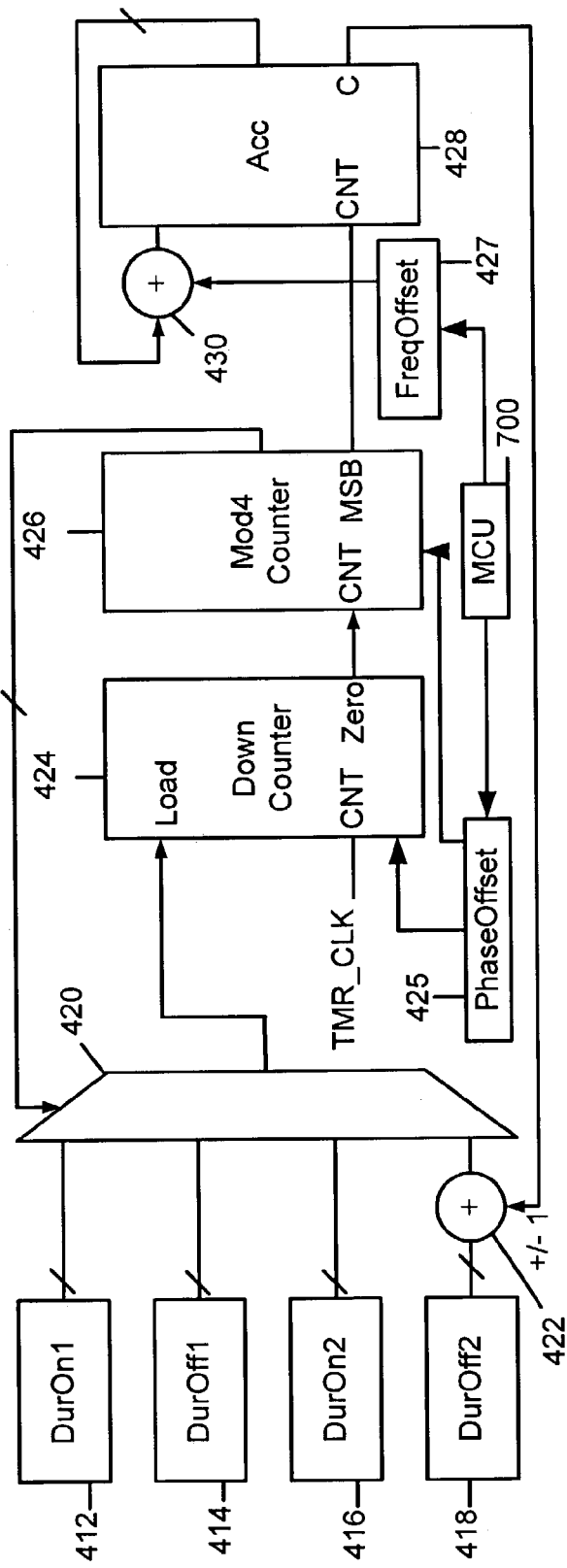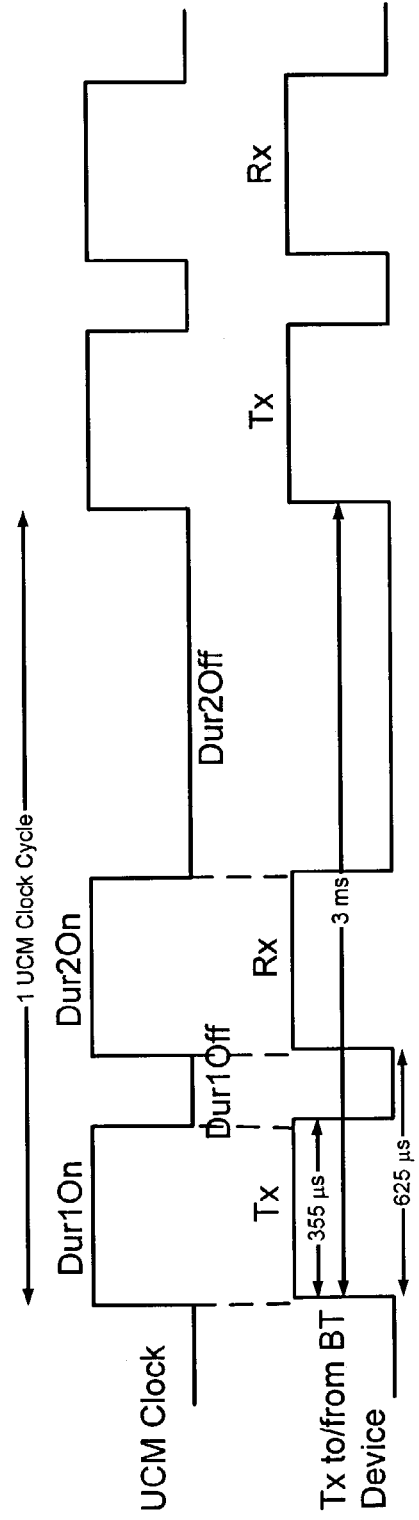

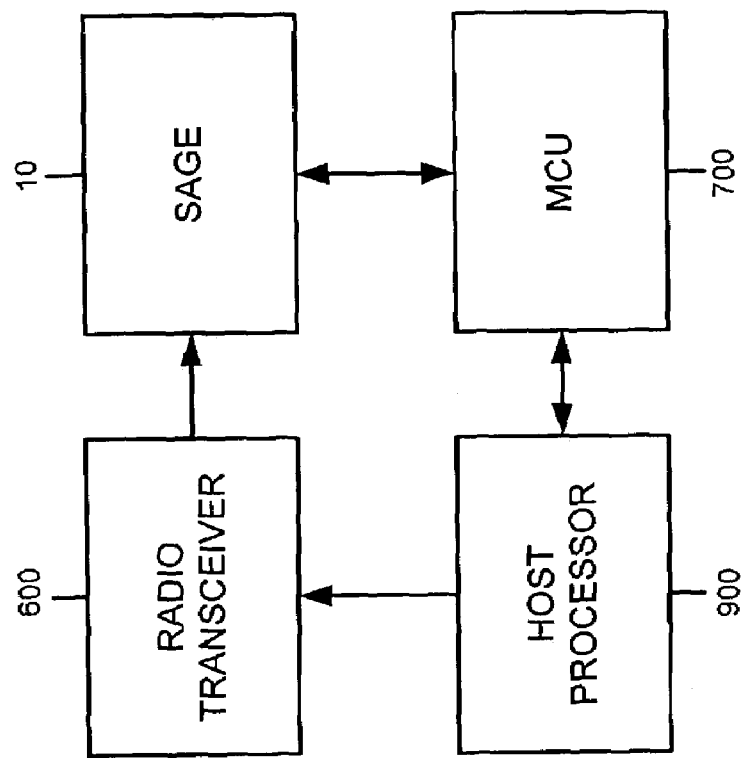
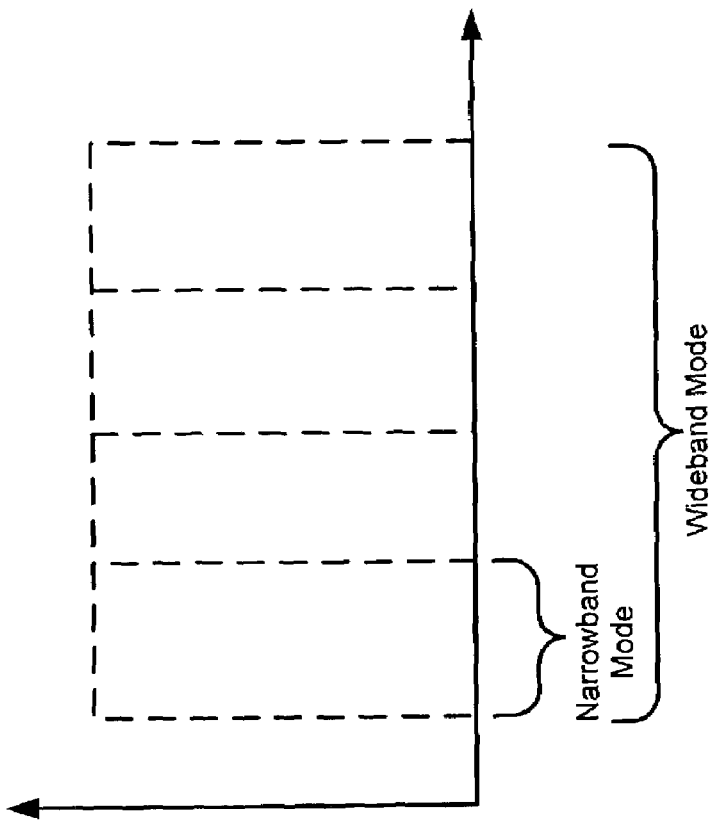
FIG. 20

SYSTEM AND METHOD FOR REAL-TIME SPECTRUM ANALYSIS IN A RADIO DEVICE

This application claims priority to the following U.S. Provisional Patent Applications, all of which are incorporated herein by reference except for as noted:

U.S. Application No. 60/374,365, filed Apr. 22, 2002.
U.S. Application No. 60/380,890, filed May 16, 2002.
U.S. Application No. 60/319,435, filed Jul. 30, 2002.
U.S. Application No. 60/319,542, filed Sep. 11, 2002.
U.S. Application No. 60/319,714, filed Nov. 20, 2002.
U.S. Application No. 60/453,385, filed Mar. 10, 2003.
U.S. Application No. 60/320,008, filed Mar. 14, 2003.
U.S. Application No. 60/380,891, filed May 16, 2002 (the entirety of which is not incorporated by reference).
U.S. Application No. 60/374,363, filed Apr. 22. 2002 (the entirety of which is not incorporated by reference).

This application is a continuation-in-part of U.S. application Ser. No. 10/246,365 filed Sep. 18, 2002 now U.S. Pat. No. 6,714,605, the entirety of which is incorporated herein by reference.

BACKGROUND OF THE INVENTION

The present invention is directed to technology used in a radio communication device to derive information about the signals active in a radio frequency band where the radio communication device is operating, such as an unlicensed radio frequency band shared by many different devices.

In certain radio communication systems, it would be desirable to know whether and what types of other signals or devices are active. For example, an unlicensed radio frequency band is, by its nature, free to be used by any device that emits radio energy within certain power levels in that part of the allocated spectrum. It is possible that many devices would share the unlicensed frequency band at the same time, potentially causing interference with each other. Under these circumstances, what would be useful is to provide the capability of processing signals that represent activity in the frequency spectrum over a time interval to derive information about the basic characteristics of those signals in order to identify or classify them.

SUMMARY OF THE INVENTION

A real-time spectrum analysis engine (SAGE) is provided that generates information about the signal activity in a frequency band. The SAGE has several components to produce generalized spectrum information as well as specific information concerning the type of signal pulses in the frequency band at any given time.

The SAGE is, for example, a hardware accelerator that resides in a communication device and comprises a spectrum analyzer component, a signal detector component, a universal signal synchronizer component and a snapshot buffer component. The spectrum analyzer component generates data representing a real-time spectrogram of a bandwidth of radio frequency (RF) spectrum. The signal detector detects signal pulses in the frequency band and outputs pulse event information entries which include the start time, duration, power, center frequency and bandwidth of each detected pulse. The signal detector also provides pulse trigger outputs which may be used to enable/disable the collection of information by the spectrum analyzer and the snapshot buffer components. The snapshot buffer collects a set of raw digital signal samples useful for signal classification and other purposes. The universal signal synchronizer synchronizes to periodic signal sources, useful for instituting schemes to avoid interference with those signals. Some or all of the functions of the SAGE may be implemented entirely in software executed by a processor.

The above and other objects and advantages will become readily apparent when reference is made to the following description taken in conjunction with the accompanying drawings.

BRIEF DESCRIPTION OF THE DRAWINGS

FIG. 11 is a diagram showing exemplary stats that are accumulated by the stats logic module.

FIG. 12 is a diagram showing the exemplary peak stats that are accumulated by the stats logic module.

FIG. 14 is a diagram showing the addressing scheme for data stored in the DPR.

FIG. 17 is a block diagram of a universal clock module component of the universal signal synchronizer.

FIG. 18 is a timing diagram showing how a universal clock module is used to synchronize to an exemplary pulse detected in the frequency band.

FIG. 20 is a diagram showing how the SAGE may be operated.

DETAILED DESCRIPTION OF THE DRAWINGS

Figure 1:
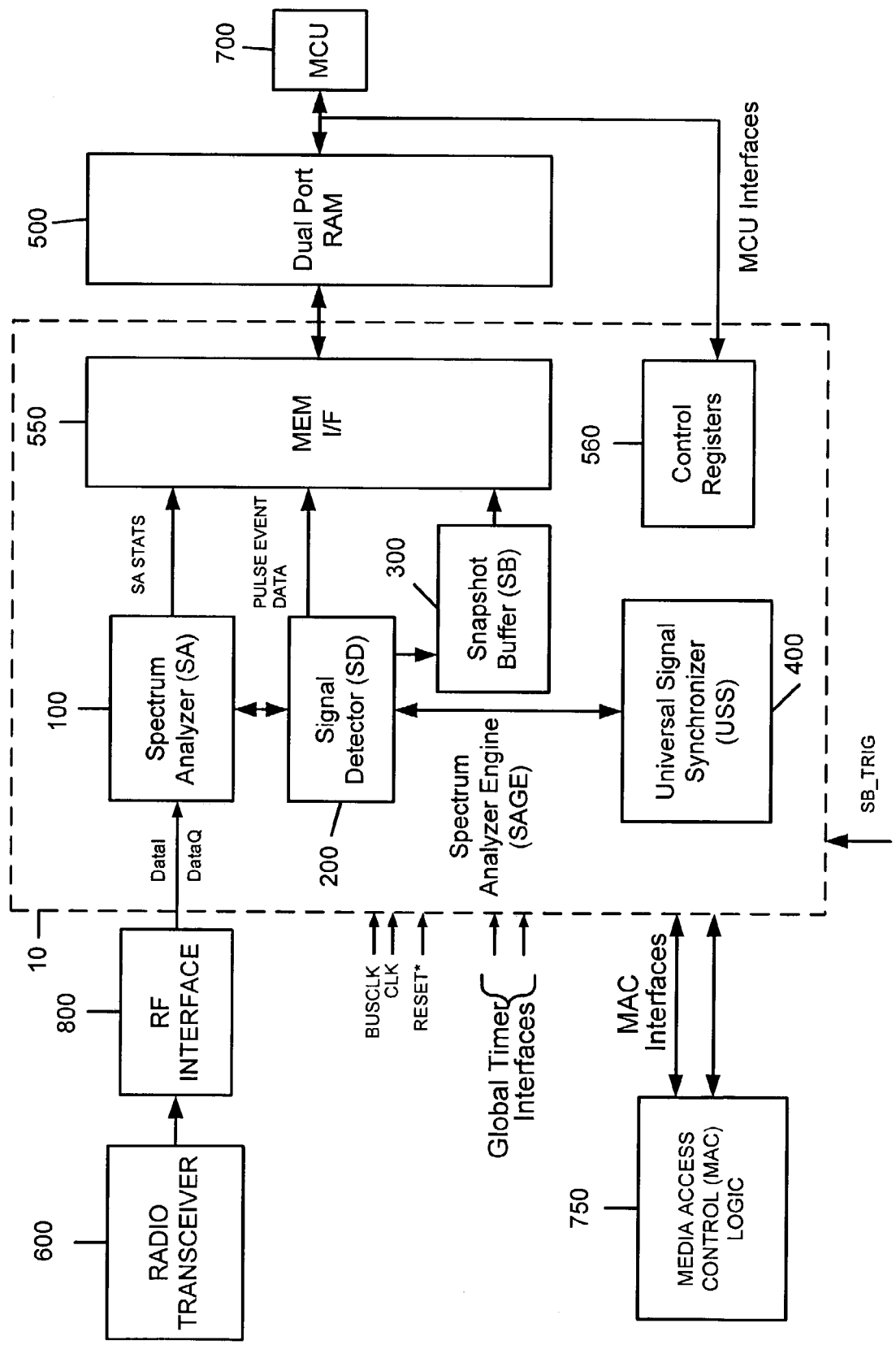
FIG. 1 is a block diagram showing the spectrum analysis engine (SAGE).

The spectrum analysis engine, hereinafter referred to as "SAGE" is a hardware accelerator useful to generate in real-time information about the activity in a frequency band. FIG. 1 is a block diagram showing the SAGE 10 together with other hardware components that SAGE interacts with during operation. The SAGE 10 and related components may be implemented in a variety of ways. One way is with digital logic gates on a single or multiple semiconductor chips configured to perform the functions described herein. Another way is in one or more semiconductor devices using a CMOS process. For example, the majority of the SAGE 10 can be implemented as part of or the entirety of an application specific integrated circuit (ASIC) by digital logic gates. It is also envisioned that for certain applications, some or all of the functions of the SAGE 10 are implemented with software instructions stored on a processor readable medium, and executed by a processor, such as the MCU, or another processor in another device coupled to receive as input the output an ADC that converts the downconverted signals to a digital signal. An example of one software implementation of the SAGE 10 is described hereinafter in connection with FIG. 21.

The SAGE 10 comprises a spectrum analyzer (SA) 100, a signal detector (SD) 200, a snapshot buffer (SB) 300 and a universal signal synchronizer (USS) 400. The SA 100 generates data representing a real-time spectrogram of a bandwidth of radio frequency (RF) spectrum, such as, for example, up to 100 MHz. As such, the SA 100 may be used to monitor all activity in a frequency band, for example, the 2.4-2.483 GHz ISM band, or the 5.15-5.35 GHz and 5.725-5.825 GHz UNII bands. Power vs. frequency information generated by SAGE 10 is stored in a dual-port RAM (DPR) 500 and is also used by the signal detector 200.

The signal detector 200 detects signal pulses in the frequency band and outputs pulse event information entries, which include one or more of the start time, duration, power, center frequency and bandwidth of each detected pulse. The signal detector 200 also provides pulse trigger outputs which may be used to enable/disable the collection of information by the spectrum analyzer 100 and the snapshot buffer 300 components.

The snapshot buffer 300 collects a set of raw digital signal samples useful for signal classification and other purposes, such as time of arrival location measurements. The snapshot buffer 300 can be triggered to begin sample collection from either the signal detector 200 or from an external trigger-source using the snapshot trigger signal SB_TRIG.

The universal signal synchronizer 400 synchronizes to periodic signal sources, such as Bluetooth SCO headsets and cordless phones. The USS 400 interfaces with medium access control (MAC) logic 750 that manages scheduling of packet transmissions in the frequency band according to a MAC protocol, such as, for example, the IEEE 802.11 protocols. The MAC logic 750 may be implemented in DSP firmware, or in higher level software.

The SAGE 10 is useful in a radio communication device where a radio transceiver 600 (or a radio receiver) is used to process received RF signals and convert them to baseband signals. A microprocessor control unit (MCU) 700 interfaces with the SAGE 10 to receive spectrum information output by SAGE 10, and to control certain operational parameters of SAGE 10 for particular functions described in detail hereinafter. The MCU 700 may be any suitable microprocessor that resides either on the same semiconductor chip as the SAGE 10, or on another chip. The MCU interfaces with SAGE 10 through the DPR 500 and the control registers 560. The SAGE 10 interfaces with the MCU 700 through a memory interface (I/F) 550 that is coupled to the DPR 500.

The control registers 560 include registers to enable the MCU 700 to configure control and monitor the SAGE 10. There is a control/status register, an interrupt enable register, an interrupt flags register, spectrum analyzer control registers, signal detector control registers, snapshot buffer control registers and USS control registers. The control/status register includes a field to perform a reset of the SAGE components. The interrupt enable register is used to indicate one or more pending interrupt conditions to the MCU 700. The MCU 700 also uses the interrupt flags register to clear any processed interrupts.

Two clock signals are used to drive the SAGE 10. The main clock signal, CLK, runs at the sampling rate of the ADC 810 and controls most of the SAGE logic. The other clock, BUSCLK, is used to control the MCU side of DPR 500, interface to the control registers 560, the global timer interfaces (GFIs), and the lower medium access control (LMAC) interfaces. The DPR 500 is driven using a separate clock on each port: CLK on the SAGE side and BUSCLK on the MCU side. The control registers 560 may be double-buffered to avoid synchronization problems between SAGE and MCU control logic.

The SAGE 10 operates on digital signals derived from the baseband signals output by the radio transceiver 600. An RF interface 800 is provided that pre-processes the baseband signals for processing by the SAGE 10.

Figure 2:
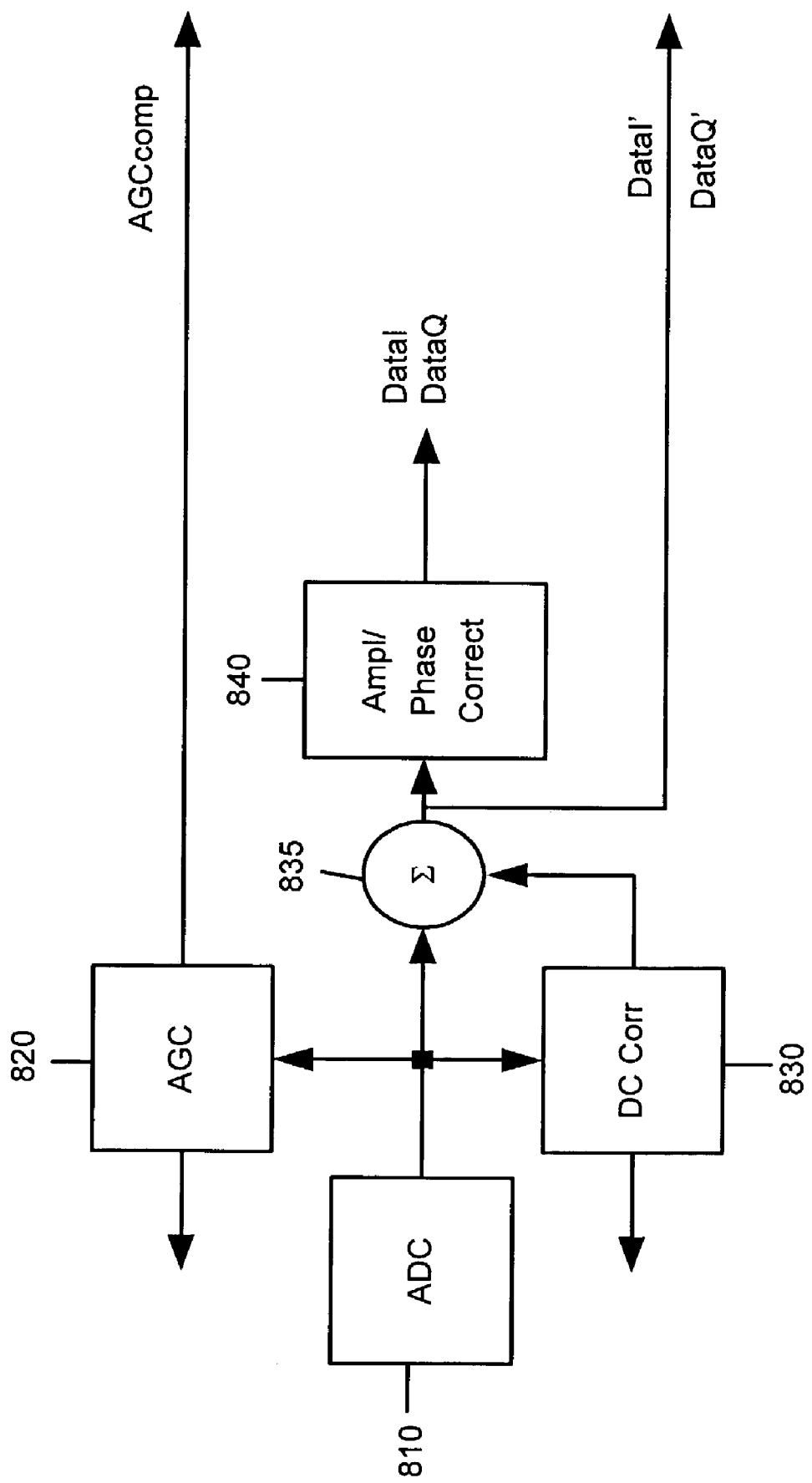
FIG. 2 is a block diagram of a radio transceiver interface that interfaces the SAGE to a radio transceiver or radio receiver.

Turning to FIG. 2, the RF interface 800 will be described. The RF interface 800 comprises an analog-to-digital converter (ADC) block 810, an automatic gain control (AGC) block 820, a direct current (DC) correction block 830 and an amplitude/phase correction block 840.

The radio transceiver 600 that generates the received (Rx) baseband signals may have an RF receiver in which the local oscillator (LO) for the quadrature downconverter is placed at the center of the band of interest. As such, DC, amplitude and phase offset compensation circuits are provided before the Fast Fourier Transform (FFT) to maximize LO and sideband suppression.

The Rx baseband signals are sampled at the CLK frequency using two ADCs, one for the in-phase signal (I), and another for the quadrature signal (Q). Only one ADC is shown in FIG. 2 for simplicity. An example of a CLK and ADC frequency is 120 MHz, which is sufficient to digitize the entire 2.4 GHz ISM band. Consequently, the maximum FFT rate is 468.8 kHz (2.13 microseconds per FFT) at CLK=120 MHz, though faster or slower rates may be suitable for other applications.

The AGC block 820 dynamically adjusts the gain of the receiver to optimize the placement of the Rx signal within the dynamic range of the ADC 810. A slow, feedback-driven algorithm is useful, in which the Rx gain is adjusted to place the maximum signal level received in the last T seconds (nominally T=1 second) 6 dB below full-scale on the ADC 810. The use of a "slow" AGC algorithm is beneficial because it prevents the ADC 810 from saturating when sampling the entire frequency band of interest (wideband mode) whenever strong signals appear suddenly in the band, without requiring rapid adjustments in gain which can cause distortion and discontinuities in Rx signal pulses. The output of the AGC 820 is an AGCcomp signal, the use of which is described hereinafter.

The DC correction and amplitude/phase correction blocks 830 and 840, respectively, compensate for LO leakage and amplitude/phase imbalance in the quadrature mixer of the radio transceiver. DC correction is performed adaptively by estimating the DC offset at the ADC output and updating a correction DAC to remove large DC offsets. Any residual DC offset after course correction is removed after the ADC via digital subtraction. The MCU estimates the amplitude and phase imbalance and programs the correction values into the appropriate control registers.

The output of the RF interface 800 comprises a digital signal DataI representing the in-phase received signal and a digital signal DataQ representing the quadrature phase received signal. The signals DataI' and DataQ' represent the output of the summer 835, uncorrected for DC and amplitude/phase, and can be supplied as the raw data to the snapshot buffer 300.

The SAGE 10 can be used in a radio communication device that includes a RF receiver capable of operating in a wideband mode or narrowband mode. In a wideband mode, the RF receiver may downconvert an entire or a substantial portion of a frequency band in which the radio communication device operates. In the wideband mode, the RF interface 800 supplies digital signals representing activity in the entire frequency band for successive time intervals as input to the SAGE 10. In a narrowband mode, the RF receiver may downconvert only a single RF channel or portion of the frequency band, in which case, the RF interface 800 would supply digital signals representing activity in that single RF channel or portion of the frequency band. The RF receiver may be tuned to different portions of the frequency band so as to scan across the frequency band. An example of a radio receiver having a wideband mode as part of a radio transceiver is disclosed in commonly assigned U.S. Provisional Application No. 60/319,434 filed Jul. 30, 2002, the entirety of which is incorporated herein by reference.

The Spectrum Analyzer

Figure 3:
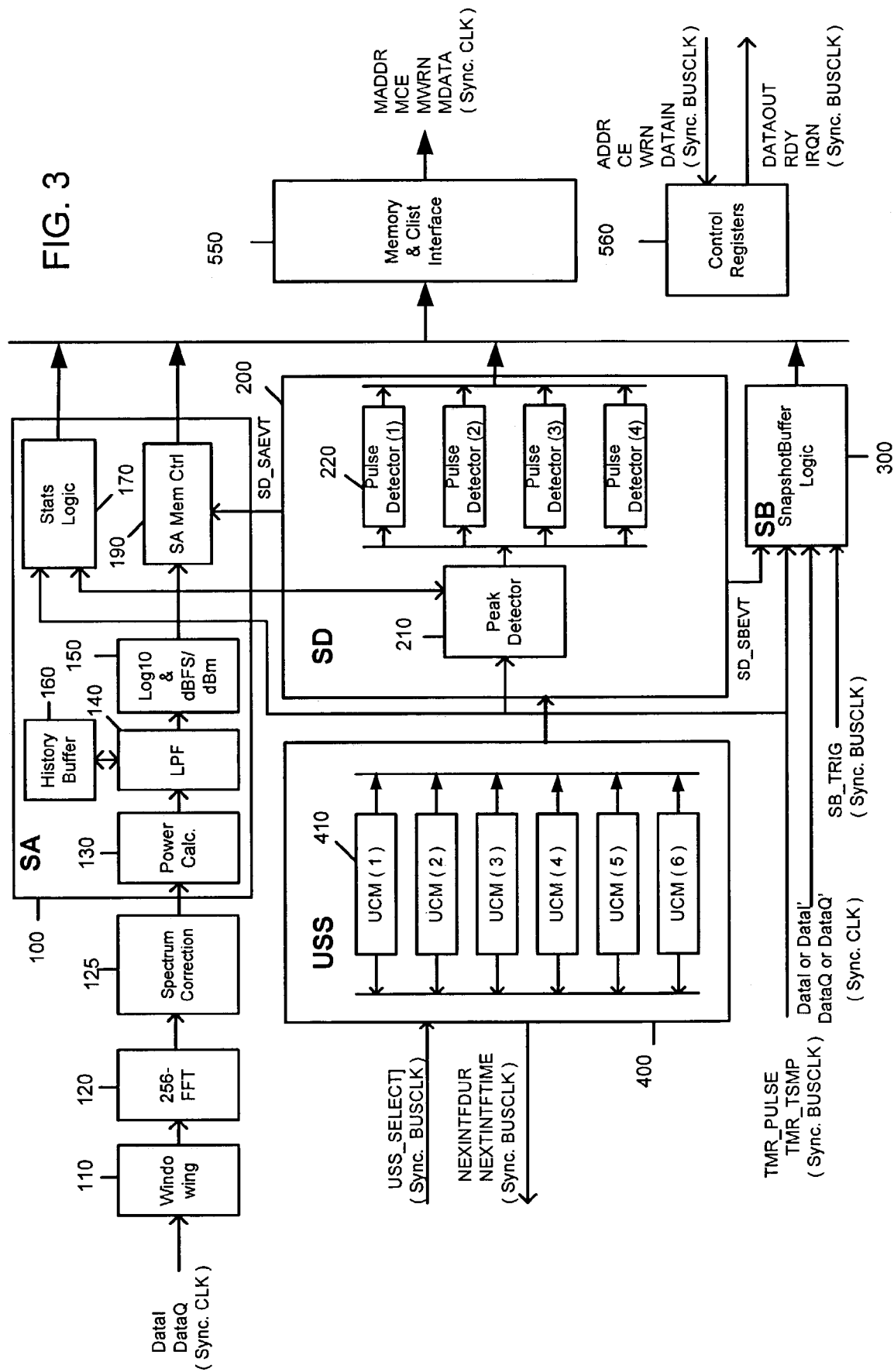
FIG. 3 is a more detailed block diagram of the SAGE.
Figure 4:
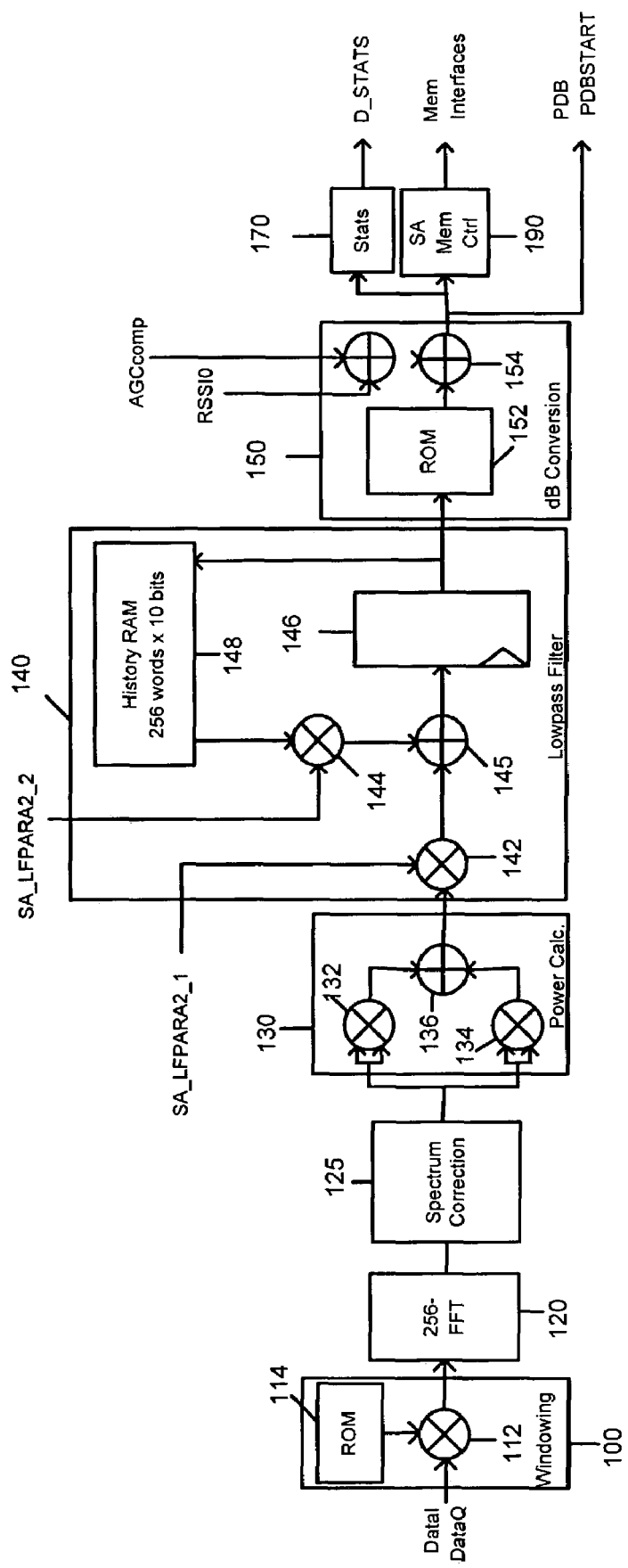
FIG. 4 is schematic diagram of the spectrum analyzer component of the spectrum analysis engine.

With reference to FIGS. 3 and 4, the spectrum analyzer 100 performs real-time FFT-based spectrum analysis on the DataI and DataQ signals. As an example, the SA 100 is capable of providing real-time spectrum analysis information of a frequency band (whether from wideband radio receiver or a scanning narrowband receiver), and as such can be used to monitor all activity in either the 2.4 GHz or 5.7 GHz unlicensed bands, for example. Other applications for monitoring smaller or greater bandwidths are also possible using similar techniques.

The data path leading to the SA 100 comprises a windowing block 110, a Fast Fourier Transform (FFT) block 120 and a spectrum correction block 125. These components are external to the SA 100 because they can be shared with other components in a system. The SA 100 itself comprises a power calculation block 130, a lowpass filter block 140, a linear-to-log converter (dB conversion) block 150, a history buffer 160, stats logic 170 and a SA memory controller 190.

As shown in FIG. 4, the windowing block 110 performs pre-FFT windowing on the I and Q data using either a Hanning or rectangular window with a multiplier 112 and a ROM 114 that stores slope coefficients for the windowing process.

Figure 5:
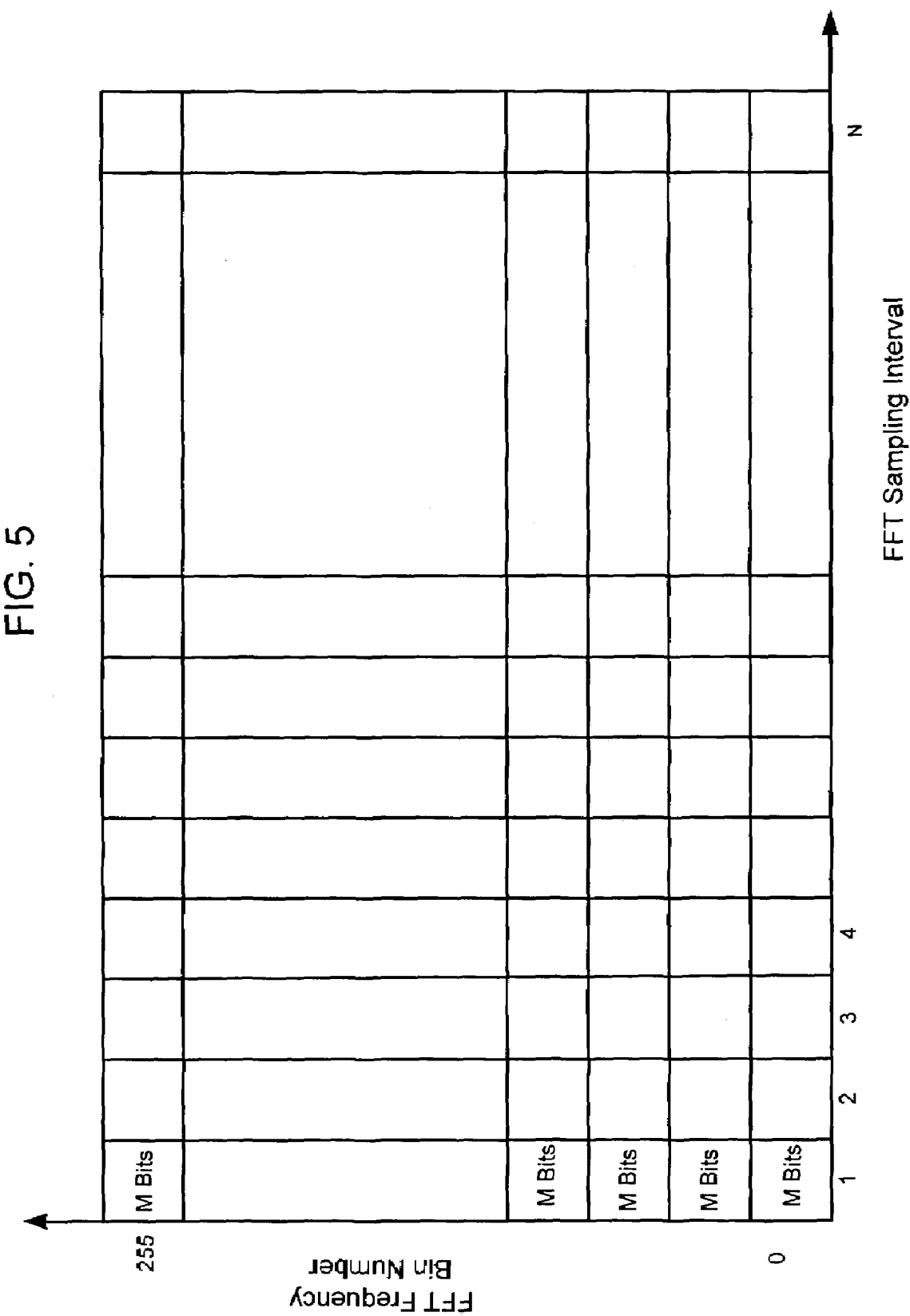
FIG. 5 is a graphical diagram showing a representation of the FFT data generated by the spectrum analyzer.

The FFT block 120 is, for example, a 256 frequency bin FFT block that provides (I and Q) FFT data for each of 256 frequency bins that span the bandwidth of frequency band of interest. An example of the FFT data field is shown in FIG. 5. For each FFT sampling time interval, the FFT block outputs M (such as 10) bits of data for each FFT frequency bin, for example, 256 bins. Thus, it can be seen that two-dimensional data structure can be defined for the FFT data fields across time intervals. This diagram is a useful paradigm to understand the further operations that are performed on the FFT data.

The output of the FFT block 120 is coupled to the spectrum correction block 125. The spectrum correction block 125 corrects for I and Q channel imbalance by estimating an I-Q channel imbalance parameter related to phase error and amplitude offset between the I and Q channels. To suppress a side tone resulting from the RF downconversion process, the following relationship is used:

$$S(k)=w(k)*[Y(k)+v(k)*Y(-k)], k=0 \ldots 255$$

where w(k) and v(k) are not greatly dependent on frequency dependent, so that we can use one of w(k), v(k) vectors for sixteen k-indexes. In the wideband mode, it is the one spectrum correction coefficient for 6.25 MHz bandwidth. To find the optimized w and v vectors, the spectrum correction block 125 collects at least 8 samples from the output of the FFT 120 and optimizes the vectors using the following recursive algorithm.

---

Q(k, i), E(k, i) is a real number
C(k, i), v(k, i), w(k, i) is a complex number
v(k, 0) = 0, E(k, 0) = 0
for i = 1 : N $$Q(k, i) = |Y_f(k, i)|^2 + |Y_r(k, i)|^2$$

$$C(k, i) = Y_f(k, i) * Y_r(k, i)$$

$$E(k, i) = \left(\frac{M-1}{M}\right) * E(k, i-1) + \left(\frac{1}{M}\right) * Q(k, i)$$

$$v(k, i) = v(k, i-1) - \frac{v(k, i-1) * Q(k, i) + C(k, i)}{M * E(k, i)}$$

$$w(k, i) = \frac{1 - v^*(k, i)}{1 - |v(k, i)|^2}$$

end
return(w(k, N))
return(v(k, N))

---

Other suitable spectral correction algorithms may be employed. Further details concerning one correction algorithm are disclosed in the publication "A Spectral Correction Algorithm for I-Q Channel Imbalance Problem," Tien-Yow Liu, Stuart Golden and Naiel Askar, IEEE, 2001, publication.

The power calculation block 130 comprises two multipliers 132 and 134 and an adder 136. The multipliers 132 and 134 compute (FFTdataI)$^2$ and (FFTdataQ)$^2$, respectively, and the adder 136 adds them together, to output a power value.

The lowpass filter block 140 comprises a multiplier 142, multiplier 144, an adder 145, a flip-flop 146 and a history RAM 148. The lowpass filter block 140 performs a unity-gain, single-pole lowpass filtering operation on the power values of the signal at each FFT frequency bin. Using $P_{\mathit{fft}}(k)$ to denote the power value at FFT frequency f(k), the lowpass filter output $P_{\mathit{lpf}}(k)$ is updated once per FFT interval (t) as follows: $P_{\mathit{lpf}}(k, t):=\alpha_1 P(k, t)+(1\alpha_1)P_{\mathit{lpf}}(k, t-1)$, 1=k=256, where α1 and (1−α1) are parameters for the multipliers 142 and 144, respectively specifying the LPF bandwidth which is configured by the MCU 700. The history RAM 148 stores the FFT power data for the previous FFT interval that is used with multiplier 144 according to the mathematical relationship described above.

The dB conversion block 150 at the output of the lowpass filter block 140 computes the decibel value PDB(k)=10*log (|P$_{lpf}$(k, t)|) for each FFT bin value P$_{lpf}$(k, t) (in dBFS, i.e., dB from full-scale on the ADC). The ROM 152 stores a table used for the dB conversion computation and the adder 152 subtracts the gain compensation AGCcomp output by the AGC 820, calibrated by RSSIO. RSSIO is input signal power, RX(dBm), when dBFS equals 0 dB with setting GC as 0 dB. The output of the dB conversion block 150 is a PDB(k) data field (k=number of frequency bins) containing dB power data at each frequency bin and a PDBSTART signal that indicates the start of the following PDB(k) field.

The stats logic block 170 will be described hereinafter in conjunction with FIG. 10.

The spectrum analyzer 100 has two operating modes for writing data into the DPR 500. In a continuous mode, one power vs. frequency value is written to the DPR 500 every N FFT cycles (N=decimation factor). In a transitional mode, a power vs. frequency value is written whenever a pulse event is detected by the signal detector 200, in response to a spectrum analyzer trigger event signal SD_SAEVT, described hereinafter. The transitional mode generally improves DPR storage efficiency over the continuous mode since in the former case power vs. frequency information is written to the DPR only after pulse transitions.

Examples of control registers for the spectrum analyzer include a control field, a register for the lowpass filter parameter a, registers for the DPR address of the DPR buffers that store the spectrum analyzer stats, a register that counts the number of times the stats have been updated, a register that stores a value that determines the number of FFT intervals for a statistic update cycle, a register that stores the power threshold value for the duty cycle stats (described hereinafter), and a register for the structure for the power vs. frequency circular list.

The spectrum analyzer control register includes fields to, among other things, indicate received signal strength indicator (RSSI) mode, absolute or relative. The relative mode means that power measurements are in units of dB full scale; absolute mode means the measurements are in units of dBm. In addition, there is a field to indicate the operational mode of the spectrum analyzer, continuous mode or transitional mode.

The Signal Detector

Figure 6:
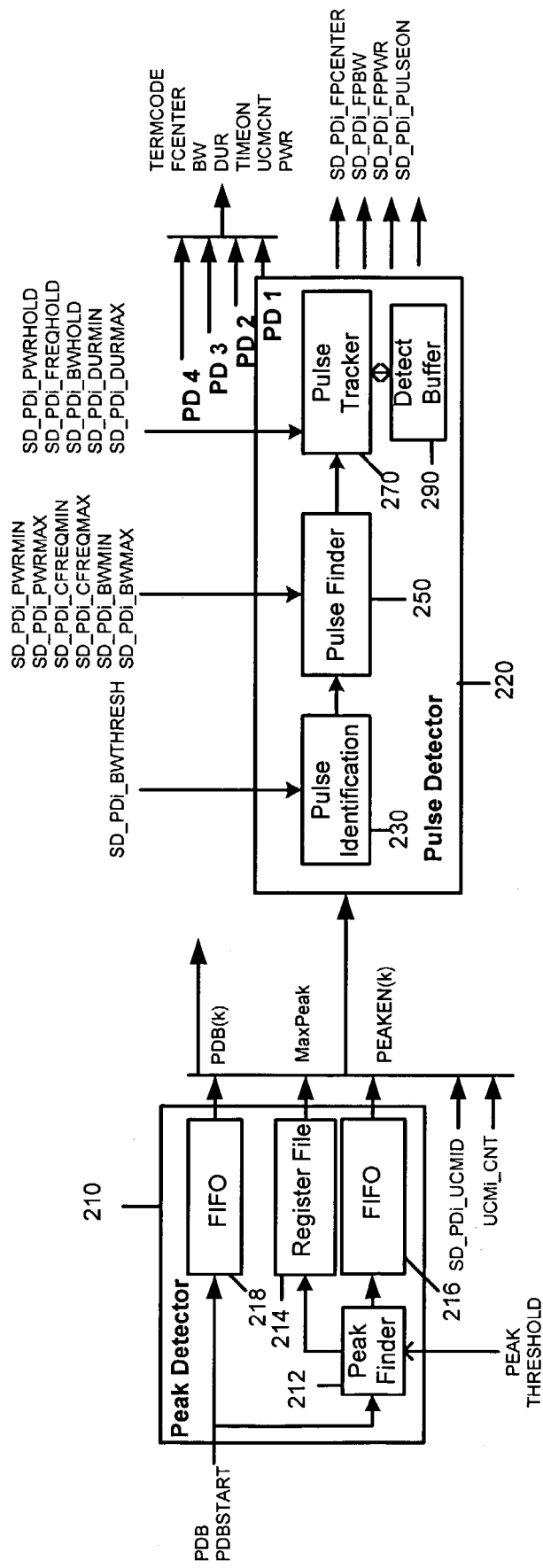
FIG. 6 is a more detailed block diagram of the peak detector and pulse detector components of the spectrum analysis engine.

With reference to FIG. 3 in conjunction with FIG. 6, the signal detector 200 identifies signal pulses in the Rx data path, filters these signals based on their spectral and temporal properties, and passes characteristic information about certain detected pulses to the MCU 700 via the DPR 500. The signal detector 200 also provides pulse timing information to the universal signal synchronizer 400 to allow it to synchronize its clocks to transmissions to/from other devices operating in the frequency band, for example, to eliminate interference with QoS-sensitive devices such as cordless phones, Bluetooth™ headsets, video-over-802.11 devices, etc.

As shown in FIG. 3, the signal detector 200 comprises a peak detector 210 and a one or more pulse detectors 220. For example, there are four (4) pulse detectors 220. The peak detector 210 looks for spectral peaks in the FFT sequence at its input, and reports the bandwidth, center frequency and power for each detected peak. The output of the peak detector is one or more peaks and related information. The pulse detectors 220 detect and characterize signal pulses based on input from the peak detector 210.

The peak detector 210 detects a peak as a set of FFT points in contiguous FFT frequency bins, each above a configured minimum power level. Once per FFT interval, the peak detector 210 outputs data describing those frequency bins that had a FFT value above a peak threshold and which frequency bin of a contiguous set of frequency bins has a maximum value for that set. In addition, the peak detector 210 passes the PDB(k) data field for each FFT interval. This can be represented by the pseudo code (where k is the frequency bin index):

```
PDB_diff(k)= PDB(k) - SD_PEAKTH;
If(PDB_diff(k) = 0)
    PDB_peak(k)= PDB(k);
    PEAKEN(k)= 1;
Else
    PDB_peak(k)= 0;
    PEAKEN(k)= 0;
end
```

The peak detector 210, as shown in FIG. 6, comprises a comparator 212, a register file 214, a FIFO 216 and a FIFO 218. The comparator 212 compares the dB power value PDB(k) with the peak threshold (SD_PEAKTH). The FIFO 216 stores a data word that indicates which frequency bins k had a power value above the peak threshold, and which did not. For example, if the FFT outputs 256 FFT values, the FIFO 216 stores a 256 bit word, with 1's indicating FFT values that exceed the peak threshold and 0's indicating FFT values that do not exceed the peak threshold. The register file 214 stores the maximum peak power value in any set of contiguous FFT values that exceed the peak threshold. This maxpeak information is used in the pulse detector. The FIFO 218 stores the PDB(k) data field corresponding to the data stored in the register file 214 and FIFO 216.

Figure 7:
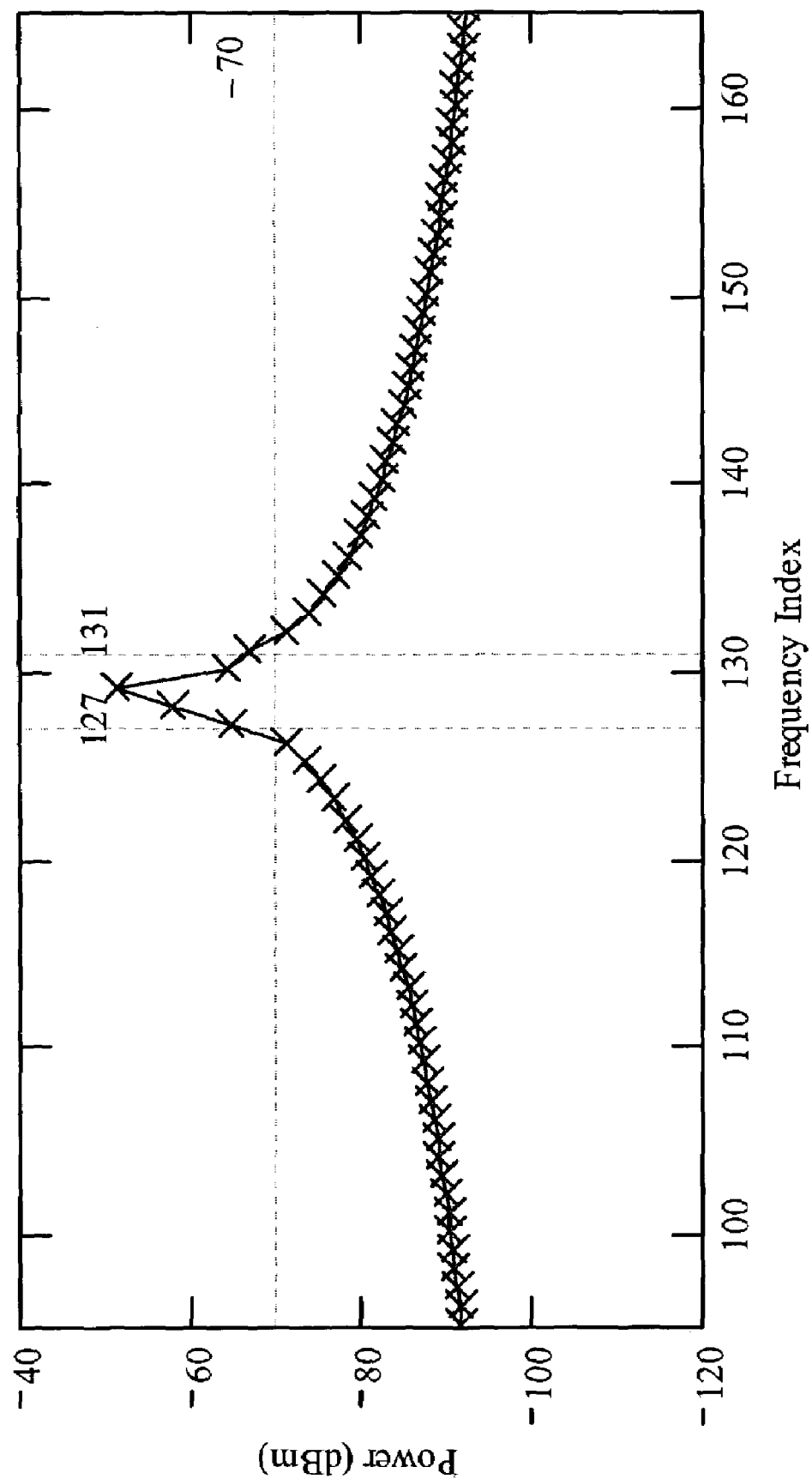
FIG. 7 is a graphical plot showing a signal peak that is detected by the peak detector.

FIG. 7 shows an example where a peak is detected at the frequency bin 130 by a contiguous set of points above a peak threshold shown in the dotted line. In this example, NFFT=256, fs=120 MHz, configured min power level=−80 dBm (not shown), k0=129, kl=127, kh=131, P(k0)=−50 dBm, BW_THRESH=15 dB, bandwidth=1.875 MHz, center frequency=0.4688 MHz. These latter parameters will be described hereinafter in conjunction with the pulse detector 220. The variable fs is the sampling rate of the ADC (FIG. 2), which will depend on the width of the frequency band to be processed. Narrowband and wideband operation of the radio transceiver is described above.

The signal detector 200 has one or more pulse detectors 220 (such as 4), allowing several pulses to be detected and characterized simultaneously. Generally, a pulse detector calculates relative thresholds based on configured information, and checks whether pdB exceeds the relative threshold. If pdB exceed the relative threshold, it defines the peak as a pulse candidate. Once a pulse candidate is found, the pulse detector compares the identified pulse candidate with a pulse definition such as power, center frequency, and bandwidth (defined by the pulse detector configuration information). After matching pulse candidate with a defined pulse, it checks the defined pulse duration. If it is the first time to detect (which means pulse duration counter is zero), it registers current pulse candidate information as a DETECTED PULSE. If duration counter is not zero, it increases pulse duration count. After increasing pulse duration count, if it is greater than a minimum required pulse duration, it triggers start of pulse. If it is greater than a maximum allowed pulse duration, it triggers termination of pulse. When the pulse detector does not detect a pulse at a given time slot, and there is a non-zero value of the pulse duration counter, then it triggers termination of pulse as well.

Figure 8:
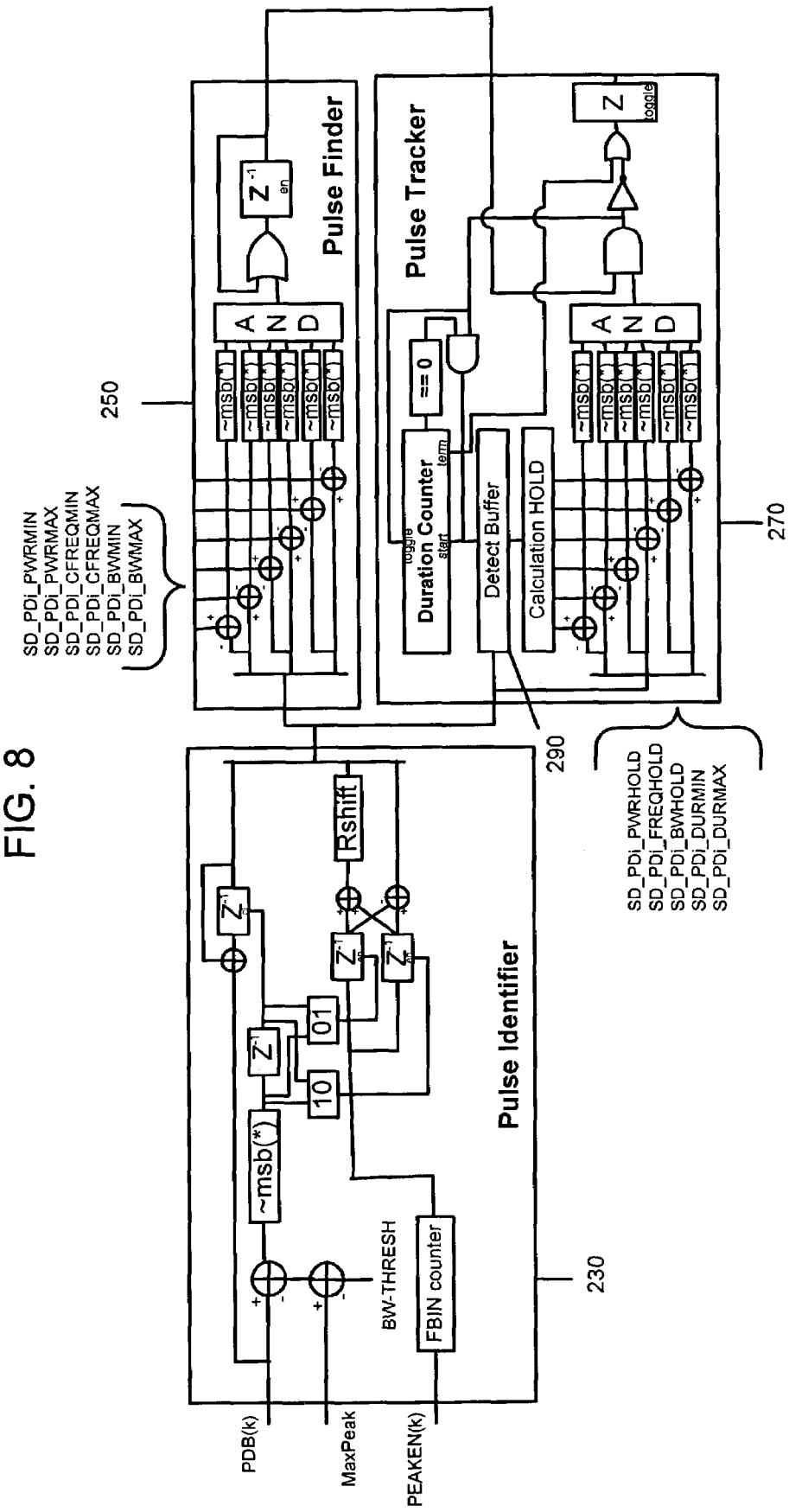
FIG. 8 is a schematic diagram of the components of the pulse detector.

As shown in FIG. 6, each pulse detector 220 comprises a pulse identifier block 230, a pulse finder block 250, a pulse tracking block 270 and a detect buffer 290. These components, described further in conjunction with FIG. 8, are operated with configurable parameters to execute a set of rules:

Pulse Shaping Rules: How should pulse information be extracted from raw peak information—performed by the pulse identifier 230.

Pulse Detection Rules: Under what conditions is the start of a pulse detected—performed by the pulse finder 250.

Pulse Termination Rules: Under what conditions should an individual pulse be considered complete—performed by the pulse tracker 270.

Pulse Shaping Rules.

For a detected FFT peak at frequency index k0, the bandwidth of the peak is defined as the length of the largest interval over which the FFT power level is at least a certain value below the peak FFT power level. Specifically, the bandwidth is $FP_{BW}$=Bandwidth (Hz)=(kh−k1+1)*fs/NFFT, where k1 and kh are the smallest and largest integers, respectively, satisfying (1) k1≦k0≦kh, and (2)P(k)≧P(k0)−BW_THRESH for any k1≦k≦kh, where fs is the ADC sampling rate in Hz, NFFT is the number of points/bins in the FFT, and P(k) denotes the power (in milliwatts) at FFT frequency bin k.

Similarly, the center frequency of the peak is $FP_{CENTER}$=Center Frequency (Hz)=[(kh+k1)/2]*fs/NFFT. This definition of center frequency locates the signal in the Nyquist band only. The actual center frequency at RF is given by RF Center Frequency (Hz)=FPCenter−fs/2+fLO, where fLO is the RF LO frequency used to convert the FFT band to baseband, and a zero-IF receiver architecture is assumed (i.e., the LO is in the center of the RF band).

The peak detector 210 uses the following formula to estimate the power of a peak: Power (dBm)=? $PDB_{peak}(k)$, from k=k1 to kh. This is only an estimate and its accuracy depends on the signal itself and the value of BW_THRESH. The pulse identifier 230 shown in FIG. 8 comprises components to perform the pulse shaping rules using the bandwidth threshold (BW_THRESH) parameter to identify those pulses that have a bandwidth that is greater than or exceeds the bandwidth threshold.

Pulse Detection Rules. The pulse detection rules specify the conditions under which the start of a pulse is to be detected and these rules are performed by the pulse finder 250. For example, a pulse is considered DETECTED if there is a peak from the pulse shaping rules that satisfies ALL of the following conditions:

1) Estimated power is between the peak detector minimum power and the peak detector maximum power. The pulse power level DETECT_POWER which triggered the detection of this specific pulse is used by the pulse termination rules.

2) Center frequency of the peak is between a center frequency minimum and a center frequency maximum. The detected center frequency DETECT_CFREQ is used in pulse termination rules.

3) Bandwidth of the peak is within a bandwidth minimum and a bandwidth maximum.

Pulse Termination Rules. A pulse may be considered TERMINATED if, for example, the pulse duration exceeds a duration maximum, or NONE of the detected peaks from the peak detector satisfies ALL of the following conditions:

1) Estimated power of the peak is within +/− a power hold value of the power of the pulse when it was originally detected.

2) Center frequency of the peak is within +/− a frequency hold value of the center frequency of the peak when it was originally detected.

3) Bandwidth of the peak is within a bandwidth hold value of the bandwidth of the peak when it was originally detected.

The pulse tracker 270 comprises components to detect the termination of a pulse according to these rules.

When a pulse terminates, the pulse tracker 270 writes a pulse event entry into the pulse event list if the pulse duration exceeds a pulse duration threshold value. Otherwise, the pulse event entry is discarded. The conditions which terminate the pulse are stored in a bit field which is included in the pulse event structure for the pulse. The pulse event structure will be described hereinafter. A finite state machine may be used in a pulse detector to assist determining and tracking a pulse event.

Each pulse detector has its own configuration register (as part of the signal detector control registers) that stores values for each of the pulse parameters (described above) within which a pulse detector will process peak information. The following are examples of these parameters.

PWRMIN: Minimum power threshold (1 dBm)
PWRMAX: Maximum power threshold (1 dBm)
BWTHRESH: Bandwidth threshold (1 dBm)
CFREQMIN: Min center frequency (fs/NFFT Hz)
CFREQMAX: Max center frequency (fs/NFFT Hz)
BWMIN: Min pulse bandwidth (fs/NFFT Hz)
BWMAX: Max pulse bandwidth (fs/NFFT Hz)
DURMAX: Max pulse duration (TMR_PULSE)
DURMIN: Min pulse duration (TMR_PULSE)
PWRHOLD: Power hold value (1 dB)
FRQHOLD: Frequency hold value (fs/NFFT Hz)
BWHOLD: Bandwidth hold value (fs/NFFT Hz)
FPCENTER: Current pulse center frequency (fs/NFFT Hz)
FPBW: Current pulse bandwidth (fs/NFFT Hz)
PWR: Current pulse power estimate (1 dBm)

The terms fs and TMR_PULSE are described above and/or referenced in FIGS. 1-3.

Each pulse detector can be configured by the MCU 700. The MCU 700 writes appropriate values to the configuration register(s) of the signal detector to configure one or more pulse detectors to look for and characterize a certain type of pulse in the frequency band. The control register controls clearing and resetting of a pulse detector so that it can be reconfigured to look for a different type of pulse. The pulse detector control register includes a field that identifies which, if any, universal clock module of the universal signal synchronizer 400 is to be associated with the pulse detector. The universal clock module (UCM) is described hereinafter. When there is an association between the pulse detector and the universal clock module, the pulse detector stores the counter value of that universal clock module into the pulse event list whenever it detects a pulse. The counter values can be used by the MCU 700 to phase lock a universal clock module to a periodic interference source, as described hereinafter.

Each pulse detector outputs pulse event data for storage in the DPR 500. The following is an example of pulse event data.

SDID: Pulse detector identifier.

TERMCODE: Pulse termination codes:
  Bit 0 (LSB): Pulse power outside of hold range
  Bit 1: Center frequency outside of hold range
  Bit 2: Bandwidth outside of hold range
  Bit 3: Duration exceeds durMax FCENTER: Center frequency (at beginning of pulse)

BW: Pulse bandwidth (at beginning of pulse)

DUR: Pulse duration in TMR_PULSE cycles. The pulse duration value is given by $t_{off}-t_{on}$, where $t_{off}$ and $t_{on}$ denote the TMR_TSTMP values latched at the FFT_START pulse associated with the first and last FFT of a detected pulse, respectively.

TIMEON: Timestamp for start of pulse event. TIMEON contains the TMR_TSTMP value latched at the FFT_START pulse associated with the first FFT that produces a pulse detection match.

UCMCNT: Counter values from an associated universal clock module (UCM, described hereinafter) in the USS. The low-order 16 bits contain the UCM down counter value at the beginning of the pulse event. The least-significant 2 bits in the upper half-word contain the mod(N) counter value (also in the associated UCM) at the beginning of the pulse event. If there is no associated UCM with a pulse detector, this field is set to all zeros.

PWR: Pulse power estimate (at beginning of pulse, 1 dBm)

The signal detector 200 outputs descriptions of detected pulses as pulse events, containing the data described in the table above for example, into a circular list called the pulse event list in the DPR 500. A single list is used by all of the pulse detectors. The source pulse detector of an individual pulse event in the list is indicated by the pulse event "SDID" field.

Figure 9:
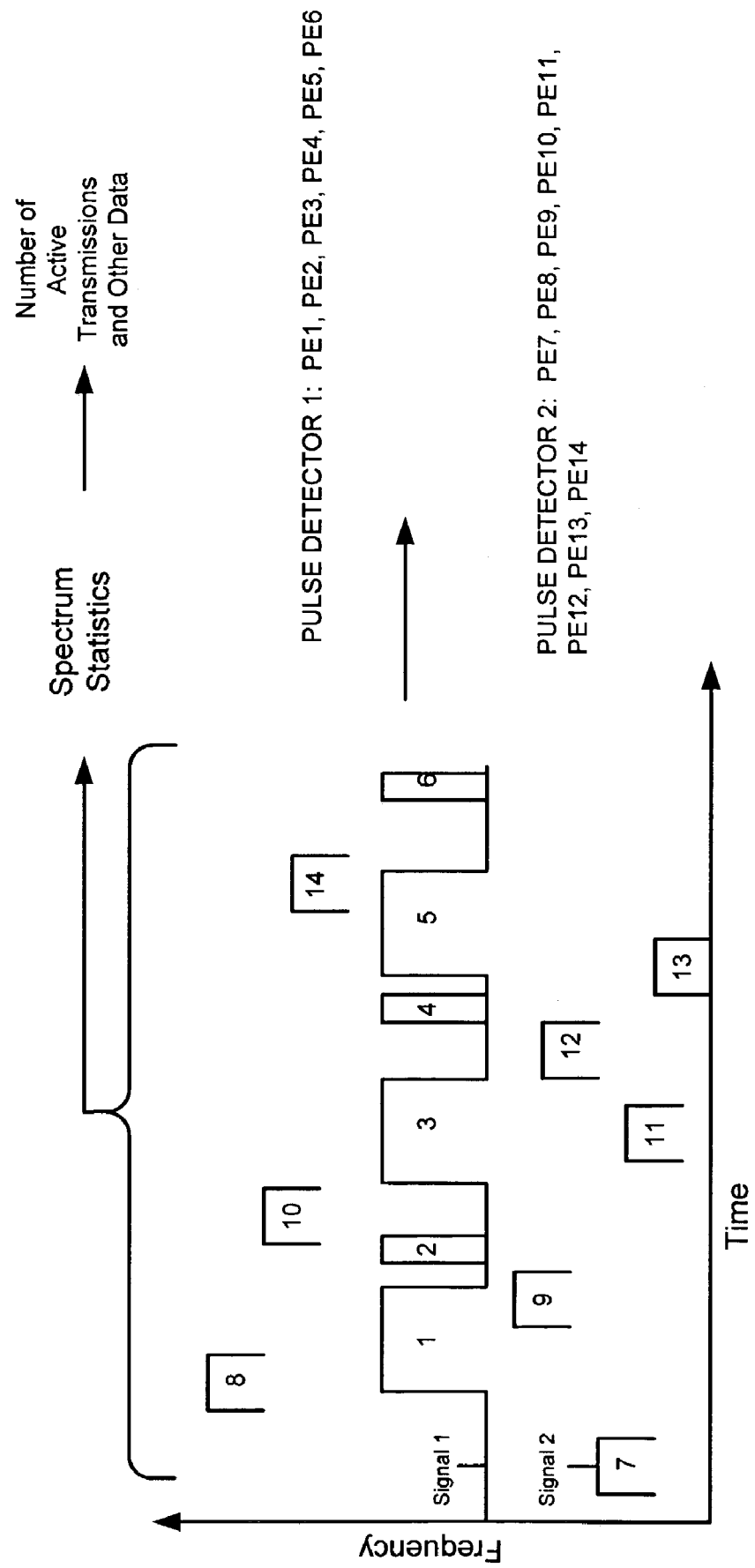
FIG. 9 is a graphical plot showing exemplary signal pulses and pulse event information generated by the signal detector for the exemplary signal pulses.

FIG. 9 illustrates exemplary signals and the corresponding pulse event data. There is IEEE 802.11b signal activity consisting of pulses 1-6. Pulses 1, 3 and 5 are the forward channel 802.11b transmissions and pulses 2, 4 and 6 are acknowledgement signals. There is also a frequency hopping signal, such as a Bluetooth™ SCO signal comprising pulses 7-14. The timing, strength and duration of the signals are not shown at precise scale.

Two pulse detectors are configured in a device where it is expected that an 802.11b signal and a frequency hopping signal would occur. A first pulse detector is configured to detect signals, such as the 802.11 signals, and would have the following parameters:

| Pulse Bandwidth: | 10 to 20 MHz |
| Center Frequency: | 36-38 MHz (To cover channel 6-2437 MHz) |
| Pulse Duration: | 70 microsec to 20 msec |
| Power: | −30 dBm to −80 dBm |

It is possible that the first pulse detector could be configured to detect a pulse on any frequency, but through prior general knowledge that can be acquired by looking at the spectrum statistics, it is possible to determine that an 802.11 signal pulse is occurring at a particular frequency in the frequency band.

A second pulse detector is configured to detect signals such as the frequency hopping signal and would have, for example, the following parameters:

| Pulse Bandwidth: | less than 2 MHz |
| Center Frequency: | 0 to 83 MHz (i.e., anywhere in the 2.4 GHz band) |
| Pulse Duration: | Up to 1 msec |
| Power: | −50 dBm to −75 dBm |

Exemplary pulse event data for these pulses are listed below. For simplicity, the time-on data associated with these pulses is omitted.

Pulse 1

| SDID: | 1 (identifying pulse detector 1) |
| Pulse Bandwidth: | 11 MHz |
| Center Frequency: | 37 MHz |
| Pulse Duration: | 1.1 msec |
| Power: | −75 dBm |

Pulse 2

| SDID: | 1 |
| Pulse Bandwidth: | 11 MHz |
| Center Frequency: | 37 MHz |
| Pulse Duration: | 200 microsec |
| Power: | −60 dBm |

Pulse 3

| SDID: | 1 |
| Pulse Bandwidth: | 12 MHz |
| Center Frequency: | 37 MHz |
| Pulse Duration: | 1.1 msec |
| Power: | −75 dBm |

Pulse 4

| SDID: | 1 |
| Pulse Bandwidth: | 11 MHz |
| Center Frequency: | 37 MHz |
| Pulse Duration: | 200 microsec |
| Power: | −60 dBm |

Pulse 5

| SDID: | 1 |
| Pulse Bandwidth: | 13 MHz |
| Center Frequency: | 37 MHz |
| Pulse Duration: | 18 msec |
| Power: | −75 dBm |

Pulse 6

| SDID: | 1 |
| Pulse Bandwidth: | 11 MHz |
| Center Frequency: | 37 MHz |

-continued

| Pulse Duration: | 200 microsec |
| Power: | −60 dBm |

The pulse event data for pulses 7-14 are very similar to each other, with the exception of the center frequency. For example, pulses 7-14 may have a pulse bandwidth of 1 MHz, a pulse duration of 350 microsec, whereas the center frequency will vary across nearly all of the 2400 MHz to 2483 MHz frequency band. The SDID for pulses 7-14 is 2, since pulse detector 2 is configured to detect these types of pulses.

There are other signal detector functions. One or more pulse detectors in the signal detector 200 may be configured to monitor pulse activity and the signal detector 200 may send a snapshot buffer trigger signal (SD_SBEVT) to the snapshot buffer 300 when a pulse event occurs corresponding to a configured pulse detector. The signal detector will monitor all pulse detectors and if any one of them detects such an event, the snapshot trigger signal SD_SBEVT is generated, either on the rising edge or falling edge of the detected pulse. The snapshot buffer trigger signal SD_SBEVT will cause the snapshot buffer 300 to capture samples of the DataI and DataQ signals, as described hereinafter.

Similarly, the signal detector may be configured to monitor activity on each pulse detector and send a spectrum analyzer trigger signal (SD_SAEVT) to the spectrum analyzer 100 (presumed to be in the transitional mode) when a desired pulse event is detected by any one of the pulse detectors. Again, this spectrum analyzer trigger signal is generated either on the rising edge or falling edge of the detected pulse. The SD_SAEVT signal is coupled to the SA memory controller 190 which will output to the DPR 500 samples (snapshots) of the PDB(k) data fields.

Figure 10:
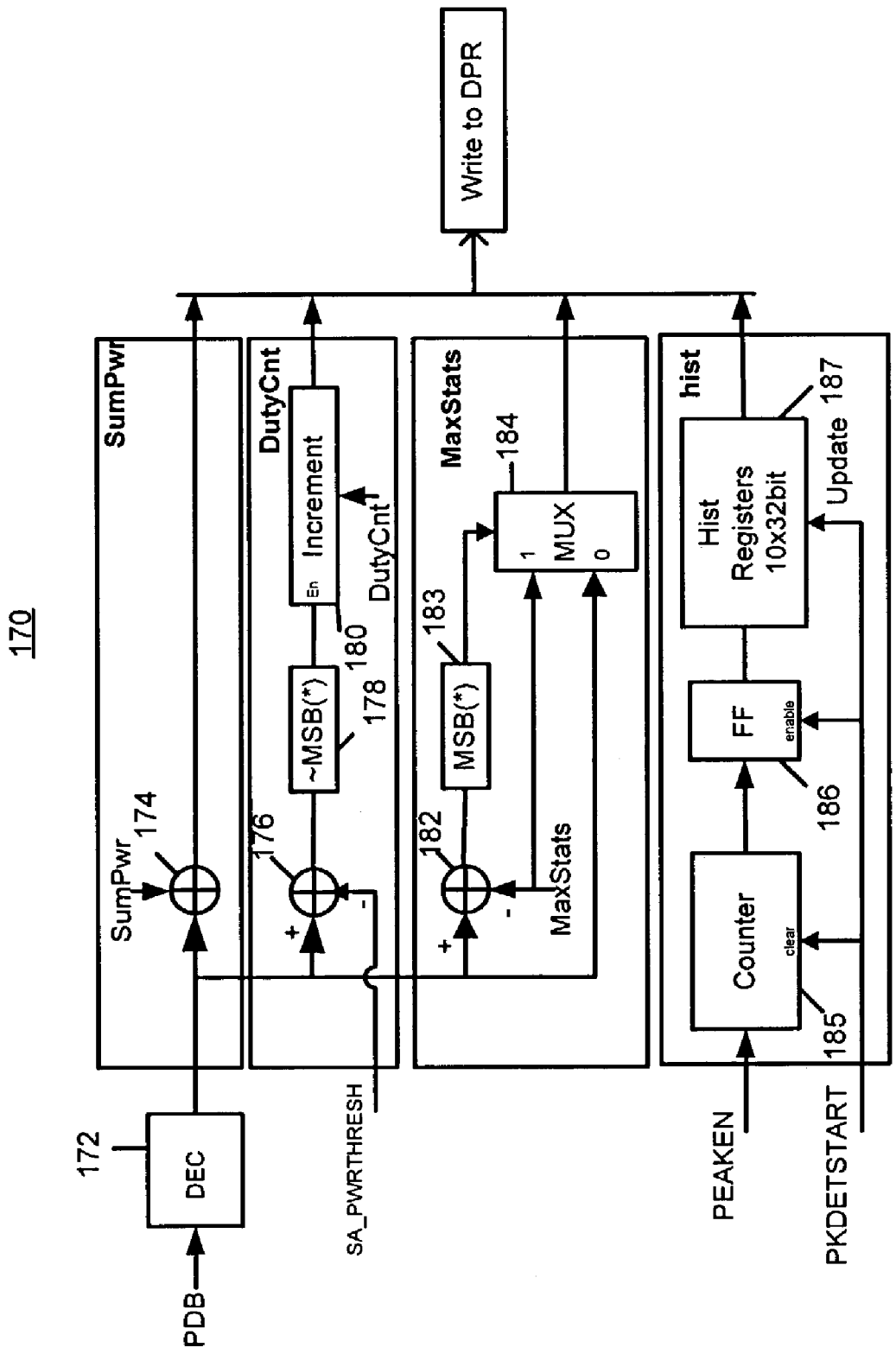
FIG. 10 is a schematic diagram of the stats module of the spectrum analyzer component of the SAGE.

Turning to FIGS. 10-12, the stats logic block 170 has modules to accumulate statistics for power, duty cycle, maximum power and a peaks histogram. Statistics are accumulated in the DPR over successive FFT time intervals. After a certain number of FFT intervals, determined by a configurable value stored in the spectrum analyzer control registers, an interrupt is generated to the MCU so that the MCU reads out the stats from the DPR into its memory. For example, the stats are maintained in the DPR for 10,000 FFT intervals before the MCU reads out the values from the DPR.

FIG. 11 illustrates an example of stats that are accumulated by the stats logic module shown in FIG. 10. The table on the left side of dB power values for exemplary frequencies during time intervals t=0 through 5. The table on the right represents values updated in the DPR for the SumPwr, DutyCnt and MaxPwr statistics at those frequencies. In this example, the peak. threshold is −50, and it is assumed that there are essentially three peaks: a first from frequency bin 0 to frequency bin 20; a second from frequency bin 125 to frequency bin 175; and a third from frequency bin 200 to frequency bin 255. All other frequency bins are assumed to be at −100 dB. Though not shown as such, the SumPwr statistic may be averaged by the MCU or another processor, and the DutyCnt may be converted to a percentage number.

To accumulate power stats, the PDB(k) data field is supplied to the stats logic block 170. It may be decimated by an optional decimator 172. The power at each frequency bin for a previous time interval is added by the adder 174 to the power at that frequency bin for the current time interval. The running power sum at each frequency bin is output to the DPR 500 as a SumPwr stat, also referred to hereinafter as the average power stat.

A duty count stat is generated by comparing the PDB at each frequency bin k with a power threshold (SA_PWRTHRESH) at the adder 176 and MSB block 178. Each time the power at a frequency bin exceeds the power threshold, the previous duty count statistic for that frequency bin is incremented by the increment block 180. The output of the increment block 180 is the duty count stat (DutyCnt), which again, is a running count of the number of times the power at a FFT frequency exceeds the power threshold.

A maximum power stat (MaxPwr) is tracked at each frequency bin. The current maximum power value at each frequency k is compared to the new power value at each frequency k by the adder 182 and MSB block 183. The multiplexer 184 selects for output either the current power maximum or the new PDB(k), depending on whether the new PDB(k) exceeds the current power maximum at the frequency.

The number of peaks that are detected by the peak detector during each FFT time interval is counted by the counter 185, buffered in the flip-flop (FF) 186 and stored in the histogram registers 187 for output to the DPR 500. The PEAKEN signal is the output of the peak detector that goes high when a peak is detected. The PKDETSTART signal restarts the counting process for a statistic update cycle.

FIG. 12 shows exemplary content of the histogram registers 187 including a running count of the number of time intervals (i.e., stats update cycles) that have 0 peaks, 1 peak, 2 peaks, . . . up to 9 peaks. This histogram is useful to estimate the number of different devices or networks operating simultaneously at different frequencies in the frequency band. As shown in FIG. 12, up until stats update cycle 5, there are two with no peaks, one stats update cycle with one peak and three stats update cycles with three peaks.

The Snapshot Buffer

The snapshot buffer 300 is a flexible data storage and triggering mechanism used to collect a set of raw ADC samples (DataI and DataQ or DataI' and DataQ', FIG. 2) for post-processing by the MCU 700. When a snapshot trigger condition is detected, the snapshot buffer 300 buffers up a set of ADC samples and asserts an interrupt to the MCU 700. The MCU 700 may then perform background-level processing on the ADC samples for the purposes of identifying or locating another device operating in the frequency band, or these samples may be passed to a different processor at for processing.

In a pre-store mode, the snapshot buffer 300 writes continuously to the DPR 500 and stops writing and interrupts the MCU when a snapshot trigger signal is detected. In a post-store mode, the DPR write operation begins only after a trigger is detected. A combination pre and post store scenario may be created (using the DELAYSTART and DELAYEND control registers) to capture samples of the receive data signals both before and after a snapshot trigger condition.

There are two types of snapshot trigger signals supported: SB_TRIG and SD_SBEVT. The snapshot trigger signal SD_SBEVT is sourced from the signal detector 200 as described above, and the SB_TRIG signal is sourced from a module external to the SAGE 10, such as a location measurement module. For example, the MCU 700 may be programmed to collect raw ADC samples when a particular signal pulse is detected for signal classification processes. The MCU 700 configures a pulse detector to generate the snapshot trigger signal SD_SBEVT upon detecting a pulse that meets a certain set of characteristics, as described above. The snapshot buffer 300 clears this bit when it has finished its processing (usually within one clock).

The snapshot buffer 300 samples may be stored in a variety of formats. One example of a format is one complex sample per 32-bit word. The high-order 16 bits contain the real part of the sample; the low-order 16-bits contain the imaginary part. The real and imaginary parts may be stored in a Q15 format, where 0 represents 0V on the ADC in the RF Interface 800, and 0x7FFF and 0x8000 represent positive and negative full-scale, respectively. A B-bit QN fractional number x takes on the values $\{n/2^N, n=-2^{B-1}, \ldots, 2^{B-1}-1\}$. The B-bit signed integer $n=2^{N}*x$ is used to represent x and is usually stored as a signed, two's complement integer.

Examples of the control registers (and what they do) for the snapshot buffer are described below.

DELAYSTART: Number of samples to wait after the SB_TRIG signal before starting to write into DPR. Only valid if CNTRL.PRESTORE=0.

DELAYEND: Number of samples to write into DPR before DPR writes are disabled and a "snapshot complete" interrupt is posted to the MCU. The count begins (1) when a trigger condition is asserted in prestore mode, or (2) DELAYSTART samples after a trigger condition in poststore mode.

STARTADDR: Address in DPR of first word of snapshot buffer.

ENDADDR: Address in DPR of last word of snapshot buffer.

WADDR: Starting write address into snapshot buffer (STARTADDR<=WADDR<=ENDADDR). When writing to the snapshot buffer, WADDR is incremented and after a write to ENDADDR, WADDR wraps back to STARTADDR. After a snapshot operation is complete, MCU may use this register to determine the address of the most recent write into the DPR.

TSTMP: Contains the TMR_TSTMP value latched immediately after the most recent snapshot trigger condition was asserted.

The control register includes the fields described below.

PRESTORE: Trigger prestore mode select. 1=Prestore mode (samples are written continuously to DPR while SB looks for a trigger signal) 0=Poststore mode (samples written to DPR DELAY_START samples after trigger detected).

REP: Repetition mode select. 1=Continuous mode—After a trigger signal is detected, immediately start looking for next trigger and continue writing to DPR if prestore mode enabled. STATUS always reads 1 in this mode. 0=One shot mode—Perform one snapshot buffering operation (during which STATUS will set to 1) and set STATUS to zero when done.

GO: Begin snapshot buffering operation. When GO is set to 0, SB is idle and does not look for a trigger. When the MCU sets GO to 1, SB starts looking for a trigger signal and prestoring samples in DPR (only if PRESTORE set to 1).

STATUS: Status field. 00=SB in idle state due to GO=0. 01=Waiting for trigger. Always set to 1 in continuous mode. 10=SB_TRIG detected in one shot mode and snapshot buffering operation complete. 11=SD_SBEVT detected in one shot mode and snapshot buffering operation complete. The SDID field indicates which pulse detector (1-4) caused the trigger.

SDID: Indicates which pulse detector caused the trigger condition.

The Dual Port RAM

The DPR 500 will be described with reference to FIGS. 13-16.

Figure 13:
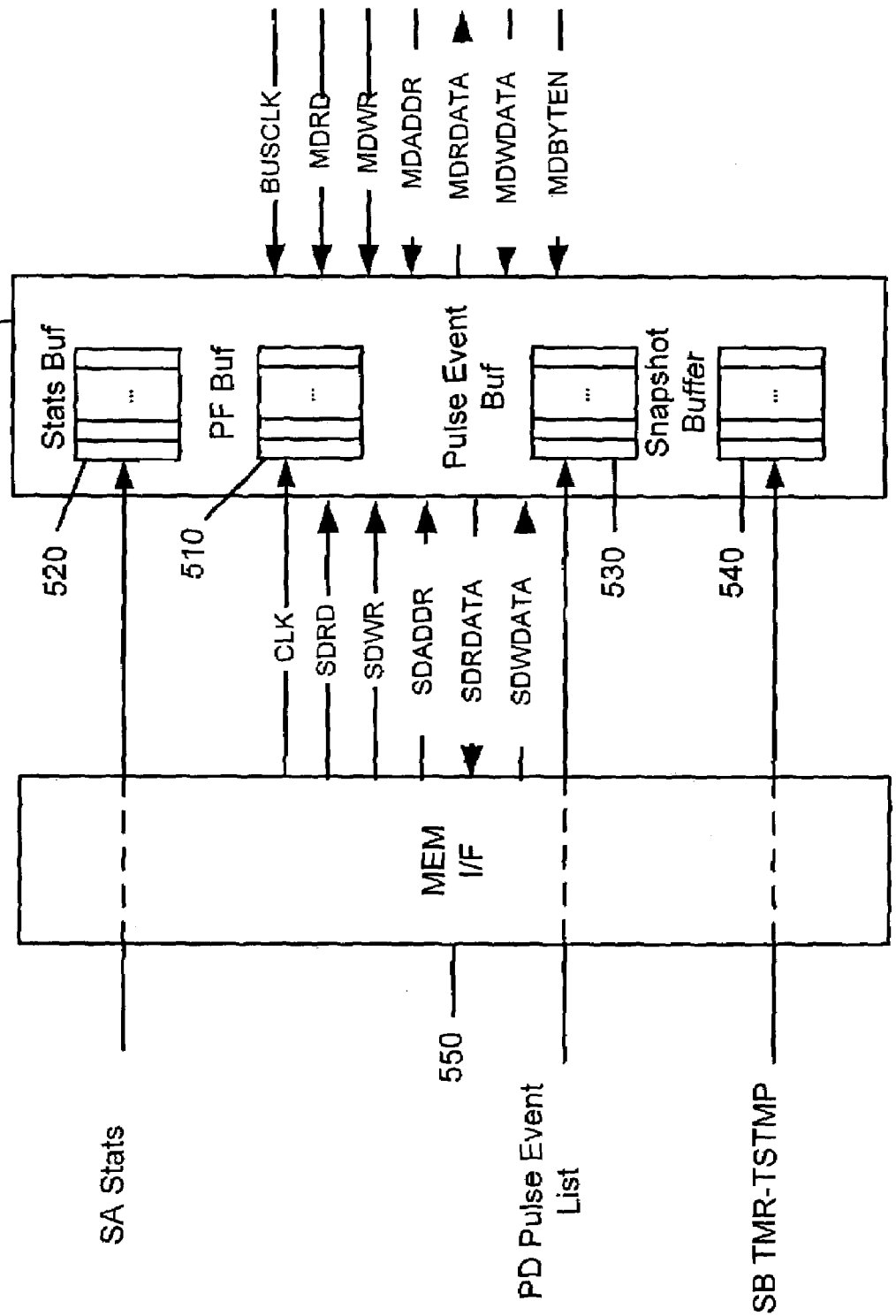
FIG. 13 is a block diagram showing the dual port RAM (DPR) storage used to store data generated by the spectrum analysis engine, and from which a microprocessor control unit (MCU) may obtain output of the SAGE.

Referring first to FIGS. 13 and 14, the DPR 500 is partitioned into several buffers or storage areas to store information generated by the spectrum analyzer 100, signal detector 200 and snapshot buffer 300. A power vs. frequency circular buffer (PF Buf) 510 stores real-time power vs. frequency information output by the spectrum analyzer 100. The table on the left in generally resembles the PF Buffer 510. A stats buffer 520 stores SumPwr, DutyCnt, MaxPwr and peaks statistics output by stats logic module. FIGS. 11 and 12 show represented data that is stored by the stats buffer 520. A pulse event circular buffer 530 stores pulse event data output by the signal detector 200 and a snapshot circular buffer 540 stores raw ADC samples from the snapshot buffer 300. Information is exchanged between elements of the SAGE 10 and the DPR 500 via the RAM interface (I/F) 550.

The DPR 500 is, for example, a 32-bit wide, synchronous DPR. Different clocks are used to drive the logic at each port. The CLK signal is used on SAGE components side and the BUSCLK signal is used on the MCU side. The DPR 500 is word addressable from the SAGE side and byte addressable from the MCU side. An AHB bus interface maps an internal MCU byte address into the corresponding word addresses (MDADDR) and byte enable (MDBYTEN) signals attached to the MCU side of the DPR.

The data structures used to manage the DPR buffers 510-540 are stored in the control registers associated with DPR. The MCU 700 is responsible for configuring the addresses and relative sizes of each buffer using these control registers after reset.

Figure 16:
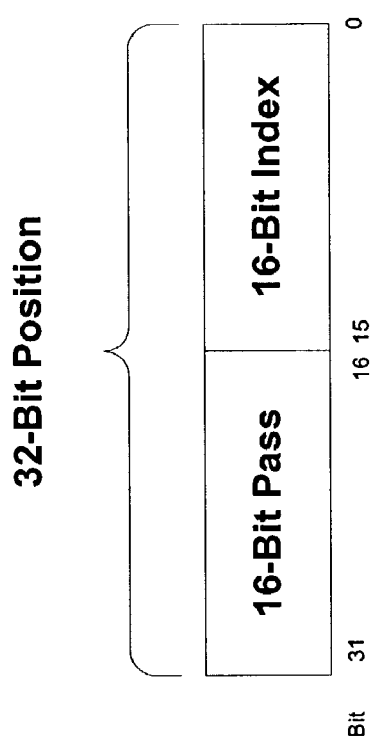
FIG. 16 is a diagram showing the position list format of the circular list for data stored in the DPR.
Figure 15:
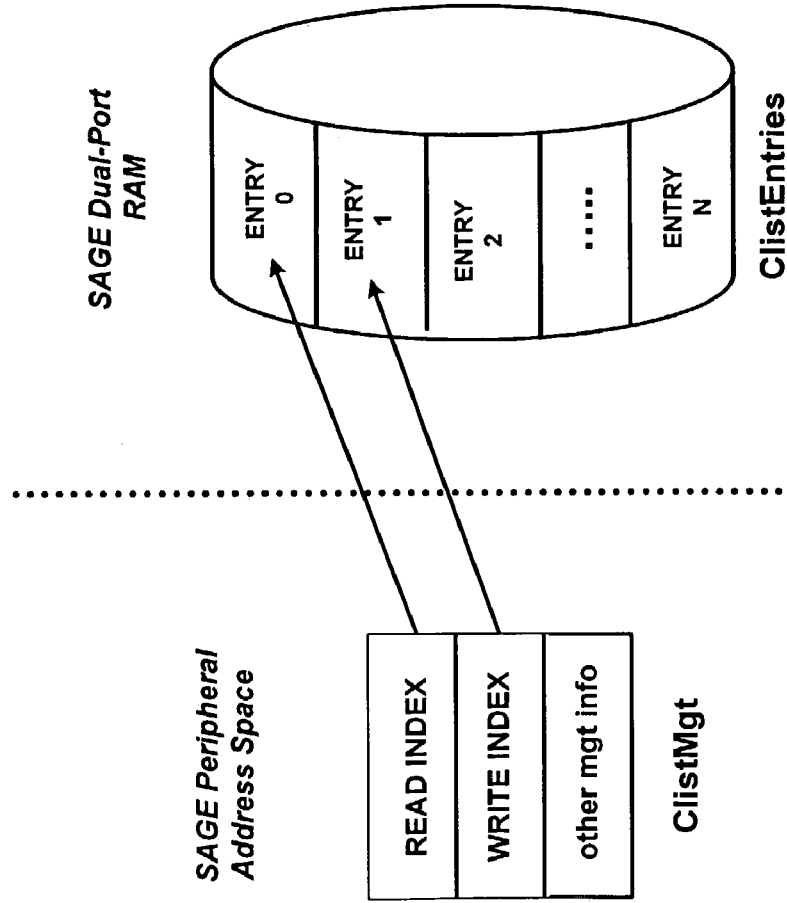
FIG. 15 is a diagram showing the circular list structure of the data stored in the DPR.

Referring to FIGS. 15 and 16, the SAGE 10 uses circular lists to manage some of the data stored in the DPR 500. As indicated above, buffers 510, 530 and 540 use circular lists. A circular list (Clist) consists of a list of fixed sized entries (ClistEntries) and a management structure (ClistMgt). The ClistEntries portion of the list is stored in the DPR 500. Each Clist has an associated ClistMgt structure which resides within the peripheral address space. The DPR location of the ClistEntries is held within ClistMgt. The entry size (ClistMgt.sizeofEntry) of the list is configurable. The Clist is essentially a circular buffer, i.e., a first-in-first-out (FIFO) buffer.

When performing input/output with a circular list, read and write indices are maintained to indicate the next entry to be read or written. Whenever the end of the list is reached the index is wrapped back to the starting position (i.e., circular list). Whenever a read or write index is wrapped to the starting position, a corresponding read pass number or write pass number is incremented. This combination of index and pass number is called a "position" or ClistPosition. The ClistPosition is, for example, a 32-bit quantity consisting of a 16-bit "pass" and a 16-bit "index." When the pass number is updated, the entire 32-bit ClistPosition is written out as a single "atomic" operation. Similarly, a read operation reads the entire 32-bit ClistPosition to ensure the pass number and index components are consistent when wrap occurs.

The Universal Signal Synchronizer

The universal signal synchronizer 400 is useful to lock to interfering periodic signal sources. The USS 400 consists of multiple programmable clock generators referred to as USS clock modules (UCMs) 410. The MCU 700 can detect interference from a periodic signal source such as a Bluetooth™ headset, a cordless phone, etc., by examining traffic statistics gathered by the host communication device. For example, the MAC logic 750 will accumulate traffic statistics indicating how successful the host communication device has been in transmitting to and receiving information from other devices according to a MAC protocol, such as IEEE 802.11x, employed by the device. Traffic statistics that may reveal the presence of an interferer are: (1) unacknowledged messages; (2) repeated cyclic redundancy code (CRC) errors; (3) low received signal strength, etc. For example, the fact that several messages are sent from the device that are not acknowledged by the intended destination device is very revealing of interference in the frequency band.

When the MCU determines to look for the cause of the interference, it configures the appropriate frequency and phase parameters corresponding to the interference source into a UCM 410, and, using pulse timing information from the signal detector 200, phase/frequency locks the UCM 20 timing to the transmit timing for the interference source. After phase/frequency lock has taken place, the UCM can be used as a timing reference to prevent data transmissions to/from the MAC logic 750 (FIG. 1) from overlapping and interfering with data exchanges with the interference source.

A block diagram of a UCM 410 is shown in FIG. 17. A timing diagram for an exemplary interferer, such as a Bluetooth™ signal, is shown in FIG. 18. Each UCM clock interval consists of two on/off segments (on=logic 1, off=logic 0), the duration of which is specified by the DurOn1, DurOff1, DurOn2, and DurOff2 registers 412, 414, 416 and 418, respectively. The two segment UCM clock scheme is used to accommodate interference sources such as Bluetooth SCO links that exchange bidirectional data using two unequally-spaced pulses, as shown in FIG. 18. A multiplexer 420 selects input from one of the registers 412 through 418, where selection from register 418 is via an adder 422 coupled between the register 418 and an input to the multiplexer 420.

A down counter 424 is connected to the output of the multiplexer 420 and counts down from the duration of each duration segment. A mod(N) counter 426 is connected to the down counter 424 and is used to reload the down counter 424 with the duration of the next segment after the down counter 424 counts down to zero. For the case shown, the mod(N) counter 426 is a mod4 counter. An accumulator 428 is coupled to the mod4 counter 424 and has a carry output that is coupled back to the adder 422. The most significant bit (MSB) output of the mod4 counter 426 is used to drive the count input of the accumulator 428. The accumulator 428 is a Z bit accumulator used to offset the UCM clock frequency, advancing or delaying the UCM clock by one TMR_CLK cycle every $2^Z$/freqOffset UCM cycles, where the freqOffset parameter is configurable by the MCU via an adder 430 coupled to the accumulator 428. There is a phaseOffset register 425 and a freqOffset register 427 that the MCU writes to for the purposes explained hereinafter.

In general, the clock module comprises at least N registers, each of which stores a programmable duration value associated with one of two states of a pulse of the communication signal, where N is equal to 2 times the number of pulses in a cycle of the communication signal, and the mod(N) counter coupled to the down counter counts up to N−1 by one in response to the down counter reaching zero and when reaching N−1, causing content of the next of the N registers to be loaded into the down counter. The count input of the Z-bit accumulator 428 is coupled to an output of the mod(N) counter, and the adder 430 adds an output of the accumulator 428 with the frequency offset value and supplies the sum to an input of the accumulator, wherein a carry output of the accumulator is coupled to the Nth register to increment or decrement the value of the Nth register before it is loaded into the counter, thereby extending or contracting the length of a cycle of the clock signal used to drive the down counter by one clock pulse every $2^Z$/(frequency offset value) clock cycles.

A UCM TMR_CLK frequency of $f_{TMR\_CLK}=2$ MHz provides sub-microsecond timing granularity on the pulse duration intervals. An 18-bit register size for the duration registers 412-418 accommodates transmission frequencies as low as 10 Hz. A 16-bit (Z=16) accumulator is suitable for the accumulator 428 to provide less than 0.01 ppm frequency resolution for a UCM clock frequency of 1 kHz. The following additional characteristics may apply to the UCM 410 shown in FIG. 17:

Output frequency=$f_{CLK}/[(M+\text{freqOffset})/2^{16}]$ $f_{CLK}/M\{1-(\text{freqOffset}/M2^{16})\}$Hz, where M=DurOn1+DurOff1+DurOn2+DurOff2.

Frequency Resolution $f_{CLK}/(M^2 2^{16})$Hz=$10^{16}/(M2^{16})$

Output clock frequency range: 1.9 Hz (DurOn1=DurOff1=DurOn2=DurOff2=$2^{18}-1$) to 500 kHz (DurOn1=DurOff1=DurOn2=DurOff2=1)

When the MCU 700 detects and classifies a periodic interference source, it takes the following steps to lock the UCM timing to the transmission timing associated with the interference source.

First, the MCU initializes and configures a UCM 410 to the appropriate (nominal) frequency using the DurOn and DurOff registers and it sets the content of the freqOffset register 425 to zero. The MCU writes values to the duration registers based on knowledge gained about the interferer from pulse events output by a pulse detector 220 (FIG. 3) and/or from snapshot buffer data supplied to the MCU that lead to the MCU determine that there is an interference event. The MCU also associates a pulse detector with the UCM 410 and configures the pulse detector to measure the phase offset between the interference source and the UCM 410. During the synchronization process, information about the timing of the interferer signal is obtained from pulse events generated by the assigned pulse detector, and the MCU compares them against the duration values written into the duration registers. The pulse events include the count values of the down counter and the mod(N) counter at the detection of a pulse, as described above in connection with the description of the signal detector.

The MCU examines the count values of the down counter and the mod(N) counter to measure a phase error between the clock signal that drives the down counter and the occurrence of the pulse of the communication signal. The MCU removes the initial phase offset/error between the UCM 410 and the interference source by loading a phase adjustment value into the PhaseOffset register 425. This causes the UCM 410 to retard the phase by the value specified in the PhaseOffset register 425 the next time the down counter 424 and mod4 counter 426 cycle to zero.

Figure 19:
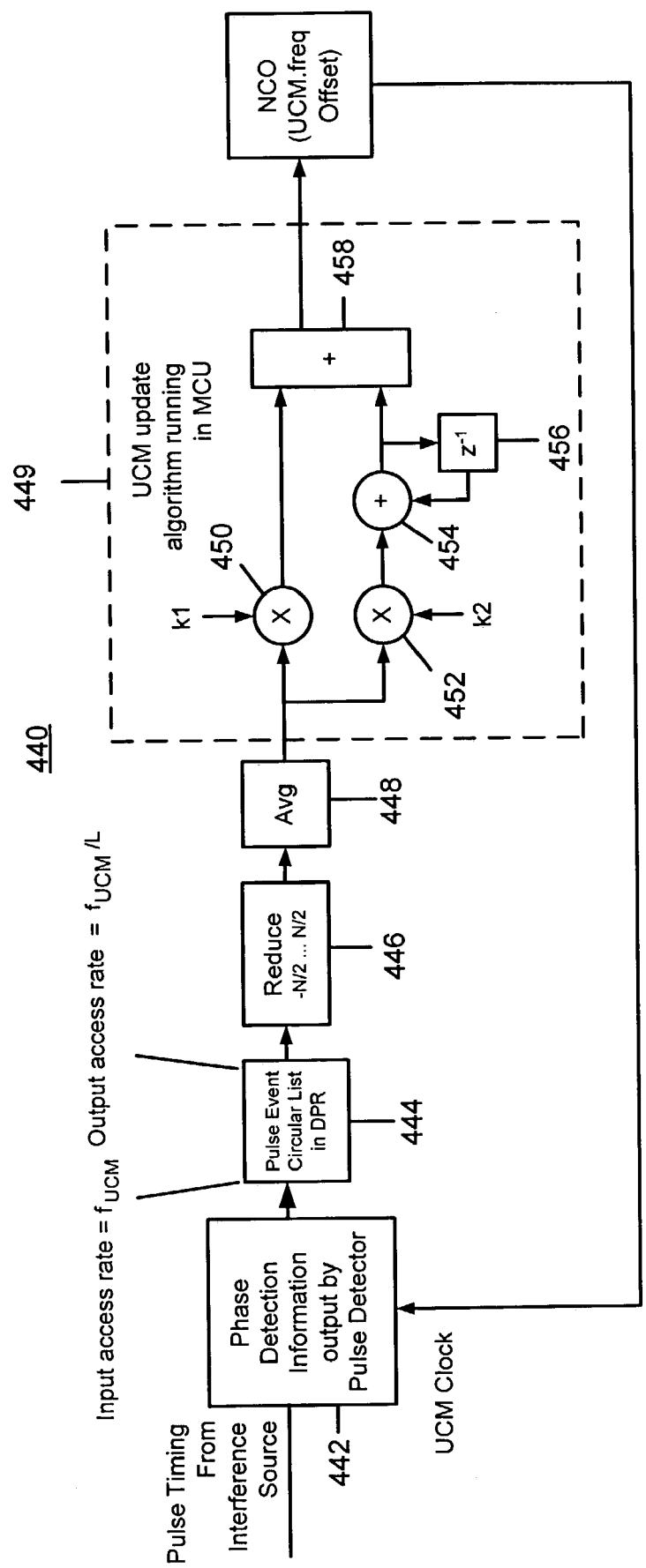
FIG. 19 is a block diagram of a clock update process to update the frequency offset between the clock of a detected signal and a local clock.

After removing the initial phase offset, the MCU periodically monitors the phase count values of the down counter and the mod(N) counter in the pulse event data to measure the phase error. The MCU generates a frequency offset between the interference source (from the pulse detector) and the UCM clock and updates the FreqOffset register 427 to compensate for frequency drift between the two signals. A block diagram of an update technique using a second order phase lock loop (PLL) is shown in FIG. 19, which will be described hereinafter. The MCU writes a value into the FreqOffset register that causes the accumulator 428 to retard or advance (depending on the sign of the adder 422) the frequency a certain number of times per UCM clock cycles.

When the phase offset samples converge to zero, the UCM is said to be phase/frequency locked to the interference source. Once the loop is locked, the MCU may let the UCM clock "flywheel" for a period of time without monitoring the phase offset from the interference source. The MCU may continue to periodically monitor the phase offset and update the loop parameters since the clocks will eventually drift (primarily due to temperature changes in the near and far end reference oscillators). A good rule of thumb to use for estimating the drift rate in this case is ½ microsecond per second, assuming an oscillator with +/−20 ppm of variation over 70 degrees C. (4/7 ppm per degree C), and 3 degrees F=1.7 degrees C. temperature variation over 5 minutes (due to air conditioner hysteresis, etc.).

Reference is now made to FIG. 19, which shows a process 440 useful by the MCU to update for clock drifts. The process 440 updates the frequency offset between the clock of the interfering signal and the local clock operating the UCM. Step 442 represents the pulse detector 220, associated with the particular interfering signal, generating phase information by reading the states of down counter 424 and mod(N) counter 426, and step 444 represents retrieving of information from the pulse event circular list in the pulse event buffer 530 of the DPR 500. Multiple pulse events from the signal detector 200 may be buffered up in the DPR 500 before the MCU has time to retrieve them. Next, in step 446, the phase detection information is updated depending on the value of the down counter 424 relative to the value of the DurOn1 register 412. If the down counter value 424 is less than the value of DurOne1 divided by 2, then the phase detection information is set equal to the value of the down counter 424. Otherwise, the phase detector information is set equal to the value of the down counter 424 less the value of the DurOn1 register 412. In step 448, output of step 446 is averaged to reduce noise effects. Next, a filter or phase-lock-loop (PLL) process 449 is performed to lock to the phase and frequency of the interfering signal clock. Any suitable first-order or second-order filtering or PLL process can be used. FIG. 19 shows a second order PLL process comprising two scaling operations 450 and 452, an adder 454, a $z^{-1}$ block 456 and an accumulator 458. The parameters k1 and k2 are PLL constants that depend on the UCM clock rate and a buffering factor of the pulse event circular list in the DPR. The output of the process 440 is a frequency offset value that is stored for later use in synchronizing to the near clock and the far-end clock (that of the particular interfering signal). Once the frequency offset value is computed, the interfering signal can be ignored for a period of time, and the UCM can more quickly lock to the interfering signal by loading the stored frequency offset (FreqOffset) into the FreqOffset register 427 of the UCM as shown in FIG. 17.

Examples of the registers used to control and monitor a UCM 410 from the MCU are described below.

DURON1: Duration in TMR_PULSE cycles of first "on" interval of a UCM clock cycle. The MCU may update this value anytime (regardless of whether the UCM is enabled).

DUROFF1: Duration in TMR_PULSE cycles of first "off" interval of a UCM clock cycle. The MCU may update this value anytime (regardless of whether the UCM is enabled).

DURON2: Duration in TMR_PULSE cycles of second "on" interval of a UCM clock cycle. The MCU may update this value anytime (regardless of whether the UCM is enabled).

DUROFF2: Duration in TMR_PULSE cycles of second "off" interval of a UCM clock cycle. The MCU may update this value anytime (regardless of whether the UCM is enabled).

FREQOFFSET: Creates a frequency offset of $(F_{TMR\_PULSE}*\text{FREQOFFSET})/(M^2*2^{16})$ Hz relative to the nominal clock frequency $(F_{TMR\_PULSE}/M)$ on the UCM clock. The CNTRL.FOFFSET bit specifies the sense of the offset. If CNTRL.FOFFSET=1, a positive frequency offset is applied, otherwise a negative frequency offset is applied (a positive frequency offset corresponds to a higher-than-nominal UCM clock frequency). The MCU may update this value anytime (regardless of whether the UCM is enabled).

PHASEOFFSET: Retards the phase of the UCM clock by PHASEOFFSET TMR_PULSE cycles by loading the value PHASEOFFSET into the Down Counter at the end of the next Dur1Off interval. The phase adjustment is made once each time the PHADJUST bit in the CNTRL register is set.

MINGAP: If the time between two consecutive interference events on the UCM signals specified by USS_SELECT is less than MINGAP TMR_PULSEs, the USS will merge the two events and report on them as if they were one interference event spanning both interference pulse durations.

DOWNCTR: Contents of UCM down counter register (updated once per TMR_PULSE)

The fields of the control register for a UCM are defined below.

ENABLE: UCM enable. Setting the ENABLE bit for 1 TMR_PULSE cycle causes the clock to start counting in the Dur1Off state. Clearing ENABLE for 1 or more TMR_PULSEs causes the UCM clock to stop counting.

PHADJUST: Writing a 1 to this bit causes the UCM to retard its clock phase by PHASEOFFSET TMR_PULSE cycles by loading the value PHASEOFFSET into the Down Counter at the end of the next Dur1Off clock segment. The UCM clears this bit after the phase change has taken place.

FOFFSET: Specifies whether a positive or negative frequency offset is to be applied using the FREQOFFSET field. 1=Positive frequency offset applied. 0=negative frequency offset applied MOD4CT: Contents of Modulo 4 counter The USS 400 passes UCM timing information to an external component, such as the MAC logic 750, using the NEXTINTFDUR and NEXTINTFTIME signals described hereinafter. The USS_SELECT signals, also described in the table above, allow for selection of which UCMs to include in next event calculation.

Other Interfaces to the SAGE

With reference to FIG. 1, other interfaces to the SAGE 10 will be described. The global timer interfaces (GTI) are used by the spectrum analyzer 100 and signal detector 200 to timestamp transmission events in the sampled frequency band. The GTI comprises, for example, the timestamp signal (TMR_TSTMP) and a global timer clock signal (TMR_PULSE), where TMR_PULSE=1 on the positive edge of BUSCLK indicates a new value of TMR_TSTMP. The GTI logic runs at the BUSCLK clock frequency. The TMR_

TSTMP field is updated periodically, such as at 2 MHz, during BUSCLKs in which TMR_CLK=1.

The SAGE 10 communicates timing information for periodic interference sources (such as Bluetooth headsets or cordless phones) to another hardware element (external to the SAGE 10), such as the MAC logic 750. There are primarily three MAC interface signals, USS_SELECT, NEXTINTFDUR and NEXTINTFTIME. NEXTINTFDUR is the duration in TMR_PULSEs of the next interference event among the selected UCM clocks via USS_SELECT. The interference condition is said to be active (due to an interferer's transmission) when any of the selected UCM clocks is high. When all of the selected interference sources are inactive (i.e., all UCM clocks are low), NEXTINTFDUR indicates the duration of the next interference event in TMR_PULSEs. When at least one of the interference sources is active, NEXTINTFDUR indicates the time in TMR_PULSEs until the end of the current interference transmission, and is updated once per TMR_PULSE.

NEXTINTFTIME is the time remaining in TMR_PULSEs until the next interference event among the selected UCM clocks via USS_SELECT. The interference condition is said to be active (due to an interferer's transmission) when any of the selected UCM clocks is high. When all of the selected interference sources are inactive, NEXTINTFTIME indicates the time until the next interference event and is updated once per TMR_PULSE. When at least one of the interference sources is active, NEXTINTFTIME reads zero.

USS_SELECT is a signal that selects which USS UCMs 410 to include in the next interference event calculations, as reported to the MAC logic 750 through the NEXTINTFXXX signals. USS_SELECT[i]=1 means include UCM(i) in the calculation.

Examples of MCU interface signals are described below. Some of these signals are identified in FIGS. 1, 3 and 6.

- ADDR: Control register word address
- BUSCLK: Clock used to control the MCU side of the DPR, USS, Lower MAC and Global Timer interfaces:
- IRQ: Level-triggered interrupt request to MCU. Whenever an enabled interrupt condition becomes active, SAGE 10 asserts an interrupt to the MCU by setting IRQ to 0. The MCU clears the interrupt by clearing the appropriate bits in the IF register. SAGE automatically sets IRQ to 1 when all active interrupt conditions have been cleared in the IF register.
- MDADDR: DPR word address—MCU side
- MDBYTEEN: DPR byte enable—MCU side
- MDRD: DPR read strobe—MCU side
- MDRDATA: DPR read data—MCU side
- MDWR: DPR write strobe—MCU side
- MDWDATA: DPR write data—MCU side
- RD: Control register read strobe
- RDATA: Control register read data
- SDADDR: DPR word address—SAGE side
- SDRD: DPR read strobe—SAGE side
- SDRDATA: DPR read data—SAGE side
- SDWR: DPR write strobe—SAGE side
- SDWDATA: DPR write data—SAGE side
- WR: Control register write strobe
- WDATA: Control register write data Operation and Uses of the SAGE With reference to FIG. 20, one example of how the SAGE 10 may be operated is described. The SAGE 10 may reside in a communication device that comprises the radio transceiver 600 and a MCU 700. In addition, for higher level processing, a host processor 900 may also be provided that is coupled to the MCU 700. The MCU 700 and host processor 900 may share responsibility for configuring the SAGE 10 and the radio transceiver 600. The host processor 900 may be responsible for more complex functions. However, it should be understood that the functions of the MCU 700 and the host processor 900 may be executed by a single processor of suitable processing capability and power consumption characteristics. The radio transceiver 600 is shared by the SAGE 10 and other communication device functions, such as receiving signals from or transmitting signals to another communication device. The receiver of the radio transceiver 600 cannot be used by the SAGE 10 when the communication device is receiving a signal, and in some cases, the same is true when the communication device is transmitting a signal to another device.

There are many ways to employ the features and functions of the SAGE 10, some examples of which are explained. The MCU 700 or the host processor 900 may be programmed to configure the receiver portion of the radio transceiver 600 to operate in a wideband mode, thereby sampling activity in an entire frequency band for a time period, such as 100 msec or longer. In addition, the MCU 700 or host processor 900 may configure certain basic parameters of the SAGE 10, such as the decimator factor, the cycle count of the number of spectrum analyzer updates (i.e., FFT intervals) before forwarding the stats to the MCU 700, the minimum power threshold for duty counting, the lowpass filter parameter of the spectrum analyzer. The receiver portion of the radio transceiver 600 may also be configured to operate in a narrowband mode at a configurable center frequency.

While the radio transceiver 600 is operated in a wideband mode, the SAGE 10 is activated to "sniff" the spectrum with the spectrum analyzer component of the SAGE 10. The spectrum analyzer stats, such as those shown in FIGS. 11 and 12, are accumulated in the DPR and read by the MCU 700 and further processed by the host processor 900. During this sniff mode, the pulse detectors of the signal detector component may be configured in a default mode to look for signal pulses of commonly expected signals in the frequency band. In the case of an unlicensed frequency band, such signals may include an IEEE 802.11 signal, a cordless phone signal, or a Bluetooth™ frequency hopping signal. Alternatively, during the sniff mode the output of the pulse detectors may be completed ignored and the spectrum analyzer stats processed to determine generally what is happening in the frequency band. Based on intelligence gathered by the spectrum analyzer stats generated from the sniff mode, the host processor 900 or MCU 700 may configure one or more pulse detectors of the SAGE 10 to look for certain types of signal pulses in the frequency band using the pulse detector configuration parameters described above.

Still another possibility is to iteratively change the configuration of one or more pulse detectors so as to cycle through pulse detector configurations over time. For example, the center frequency, bandwidth, pulse duration and/or time between pulses parameters can be changed to process incoming signal data. The incoming signals are processed during each cycle with the one or more pulse detectors. Eventually, by cycling through different pulse detector configurations, the goal is to eventually find a pulse detector configuration that fits the type of signal activity occurring in the frequency band. This is useful, for example, in a signal classification process.

Further operation of the SAGE to gather output from the signal detector may occur while the radio is in a wideband mode or a narrowband mode, depending on the demands of the radio for communication services and the type of signals suspected to be present in the frequency band. Whether configured based on information gathered from a sniff mode, or operated using predetermined configuration information, the pulse detectors will generate pulse event information that is output to the MCU 700, together with spectrum analyzer stats and any snapshot buffered data. In addition, the universal signal synchronizer component of the SAGE 10 may be operated by the MCU to synchronize to the clocks of potentially interfering communication signals in the frequency band. This synchronization information can be used in an interference mitigation or co-existence algorithm executed by the MCU 700 or the host processor 900 to schedule transmissions by the communication device so as to avoid collisions with other communication signals in the frequency band.

In addition, the output of the SAGE 10 can be used in a signal classification process to identify/classify signals in a frequency band, such as for example: a wireless headset operating with a frequency hopping communication protocol (e.g., Bluetooth™); wireless file/print services; radar systems; microwave ovens, an IEEE 802.11 wireless local area network; a HomeRF™ network; a frequency hopping cordless phone; an analog cordless phone; wireless infant/security monitors; devices operating using the IEEE 802.15.3 communication protocol. A signal classification process is disclosed in the aforementioned commonly assigned patent application.

Figure 21:
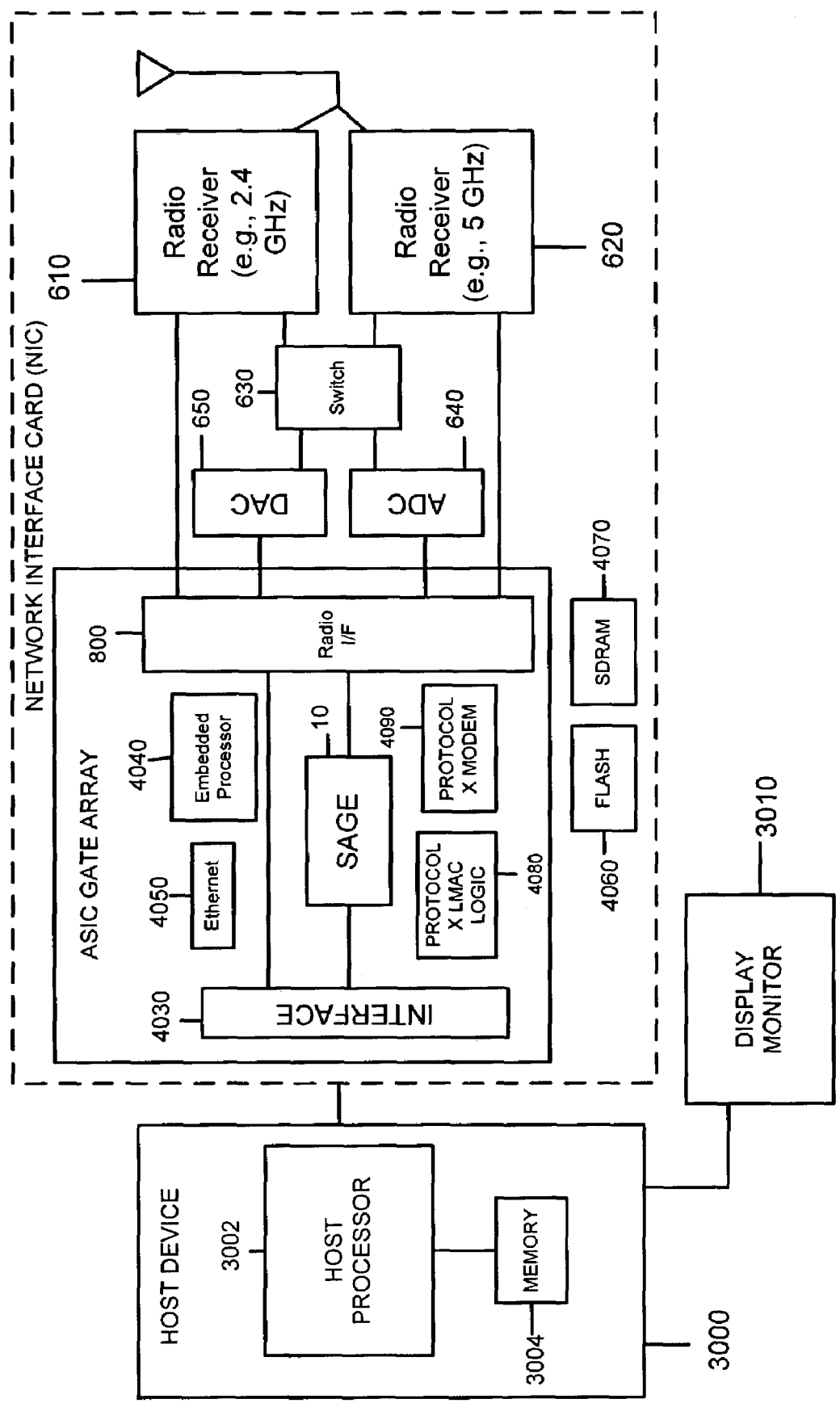
FIG. 21 is a block diagram showing another environment in which the SAGE may be deployed.

FIG. 21 illustrates an exemplary block diagram of a device, called a spectrum sensor, which employs the SAGE 10. The spectrum sensor is a device that receives signals in the frequency band of interest. In this sense, the spectrum sensor is a spectrum monitor of a sort. The spectrum sensor comprises at least one radio receiver capable of downconverting signals in the frequency band of interest, either in a wideband mode or scanning narrowband mode. It is possible, as shown in FIG. 21, that the spectrum sensor comprises one or more radio receivers 610 and 620 (dedicated to different unlicensed bands) or a single dual band radio receiver. There is an ADC 640 that converts the output of the radio receiver to digital signals that is then coupled to the SAGE 10. A DAC 650 may be useful to supply control signals to the radio receiver via a switch 630.

An interface 570, such as a Cardbus, universal serial bus (USB), mini-PCI, etc., interfaces the output of the SAGE 10 to a host device 3000 or another device. In addition, there may be an optional embedded processor 572 to perform local processing, an Ethernet block 574 to interface to a wired network, FLASH memory 576 and SDRAM 578. There are also an optional lower MAC (LMAC) logic block 4080 associated with a particular communication protocol or standard ("protocol X") and a modem 4090 associated with protocol X. Protocol X may be any communication protocol that operates in the frequency band, such as an IEEE 802.11x protocol. Multiple protocols may be supported by the device. Many of the blocks may be integrated into a gate array ASIC. The larger block around the radio(s) and other components is meant to indicate that the spectrum sensor device may be implemented in a NIC form factor for PCI or mini-PCI deployment. Alternatively, many of these components, save the embedded processor, may be implemented directly on a processor/CPU motherboard.

The host device 3000 may be a computer (e.g., PC) having a processor 3002 and memory 3004 to process the spectrum activity information supplied by the spectrum sensor via a wired network connection, USB connection, or even a wireless connection (such as an 802.11x wireless network connection). The memory 3004 may store software to enable the host processor 3002 to execute processes based on the output of the SAGE 10, including signal classification, location measurement, etc., as further described hereinafter. A display monitor 3010 may be coupled to the host device 3000. The host device 3000 may be a desktop or notebook personal computer or personal digital assistant, or any other computer device local to or remote from the spectrum sensor. The memory 3004 in the host device may also store driver software for the host device, such as drivers for operating systems such as Windows operating systems (Windows® XP, Windows® CE, etc.).

Either the embedded processor 4040 or the host processor 3002 may implement upper MAC logic associated with Protocol X. For example, if Protocol X is an IEEE 802.11x protocol, the processor 404 or processor 3002 may generate 802.11 statistics.

Examples of IEEE 802.11 MIB Global Extensions that may be provided are: Rx Bad Ver/Type; Rx Too Long; Rx Bad Multicast; Rx Self; Rx CTS other STA; Rx CTS Unexpected; Rx Ack other STA; Rx ACK Unexpected; Channel Rx Time; Tx Opps Skipped; Channel Tx Time; Tot/Num Deferrals; Num Deferrals; Rx CCA (802.11, non); Rx Filtered by Cause; Rx Forwarded by Type; Rx No Buffer; Tot Chan CCA; and Tot Chan Idle.

Examples of IEEE 802.11 MIB Extensions that may be provided for STAs are: Tot Chan Disable Time Last Rx/Tx; Rx Undefined Key; Rx RTS other STA; Rx CTS expected; Tx ACK/CTS; Tx Dropped (retries); Rx Timeout ACK/CTS; Rx ACK frags; Retry Attempt Histogram; Tx Size PER Histogram; Rx CRC for CTS/ACK; and Rx Too Small; Rx ACK Expected.

Still another variation is to implement the functions of the SAGE 10 in software on the host processor 3002. The output of the ADC 640 of any one or more device(s) operating in the frequency band (particularly those devices having a wideband capable radio receiver) can be supplied to a host processor where the SAGE and other functions described herein are performed entirely in software, such as the measurement engine, classification engine, etc. For example, the output of the ADC 640 may be coupled across any one of the interfaces shown in FIG. 21 to the host processor 3002.

The spectrum sensor may be deployed in any device that resides in a region where operation in an unlicensed or shared frequency band is occurring. For example, it can reside in a consumer device such as a camera, home stereo, peripheral to a PC, etc. Any other device connected to a spectrum sensor may obtain the spectrum knowledge that the spectrum sensor acquires.

Figure 22:
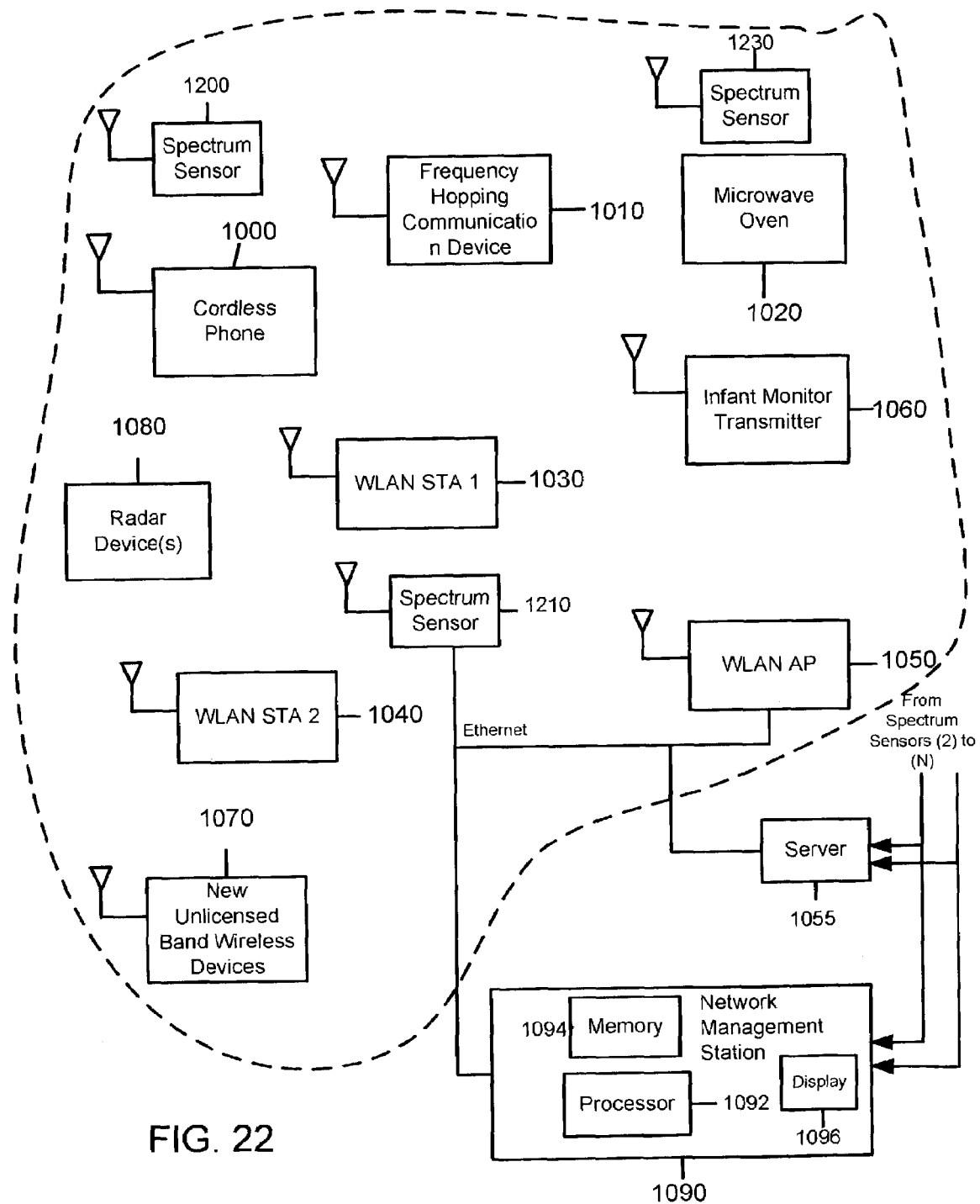
FIG. 22 is a diagram showing an application of the SAGE in an unlicensed frequency band wireless environment.

Referring first to FIG. 22, an environment is shown where there are signals of multiple types that may be simultaneously occurring. For example, at some point in their modes of operation, there are multiple devices that may transmit signals within a common frequency band. When these devices are sufficiently close in proximity to each other, or transmit signals at sufficiently high power levels, there will inevitably be interference between signals of one or more devices. The dotted-line shown in FIG. 22 is meant to indicate a region where activity from any of the devices shown may impact other devices. FIG. 22 shows a non-exhaustive exemplary selection of devices that may operate in an unlicensed frequency band, including cordless phones 1000, frequency hopping communication devices 1010, microwave ovens 1020, A wireless local area network (WLAN) comprised of a WLAN station (STA1) 1030 and a WLAN STA2 1040 associated with a WLAN access point (AP) 1050, infant monitor devices 1060 as well as any other existing or new wireless devices 1070. The WLAN AP 1050 may be connected to a wired network (e.g., Ethernet network) to which also connected is a server 1055 computer that exchanges data with the WLAN STAs 1030 and 1040 using, for example, an IEEE 802.11x communication standard. Cordless phones 1000 may be analog, digital and frequency hopping devices, depending on the type. Frequency hopping communication devices 1010 may include devices operating in accordance with the Bluetooth™ wireless communication protocol, the HomeRF™ wireless communication protocol, as well as cordless phones. In addition, radar devices 1080 may operate in an unlicensed frequency band. Finally, there may be one or several spectrum sensor devices 1200, 1210 and 1220 that are positioned at various locations in the frequency band and include the SAGE to monitor activity in the frequency band. Any one or more of the other devices shown in FIG. 22 may also include the SAGE, such as a WLAN STA or WLAN AP.

Also shown in FIG. 22 is a network management station 1090 that may play a role in the spectrum management system described hereinafter. The network management station 1090 need not physically reside in the region where the other devices are operating. The network management station 1090 may be connected to the same wired network as the server 1055 and may receive spectrum activity information from the WLAN AP 1050 and/or from a spectrum sensor 1210. The network management station 1090 has, for example, a processor 1092, a memory 1094 that stores one or more software programs executed by the processor and a display monitor 1096. The network management station 1090 may also execute one or more software programs that manage wired networks as well as wireless networks.

Currently, in the United States, the unlicensed frequency bands are in the Industry, Scientific and Medical (ISM) and UNII frequency bands, and include an unlicensed frequency band at 2.4 GHz and unlicensed frequency bands at or near 5 GHz. These are only examples of existing unlicensed bands. In other countries, other portions of the spectrum have been, or may be, set aside of unlicensed use. By definition, an "unlicensed" frequency band generally means that no one user has any preferred rights to use that frequency band over another. No one party has purchased exclusive rights to that spectrum. There are a set of basic power and bandwidth requirements associated with the unlicensed band, but any user that operates within those requirements is free to use it at any time. A consequence of the "unlicensed" character of these frequency bands is that devices operating in them will inevitably interfere with the operation of each other. When interference occurs, a signal from one device to another may not be received properly, causing the sending device to retransmit (and therefore reducing throughput), or possibly entirely destroying the communication link between two communication devices. Moreover, because these frequency bands are free to use, the zero-cost encourages more applications and users of the unlicensed band, which in turn, will make it more crowded and more susceptible to interference. There is, therefore, a need to manage the operation of devices operating in an unlicensed frequency band to ensure efficient and fair usage by all users.

Figure 23:
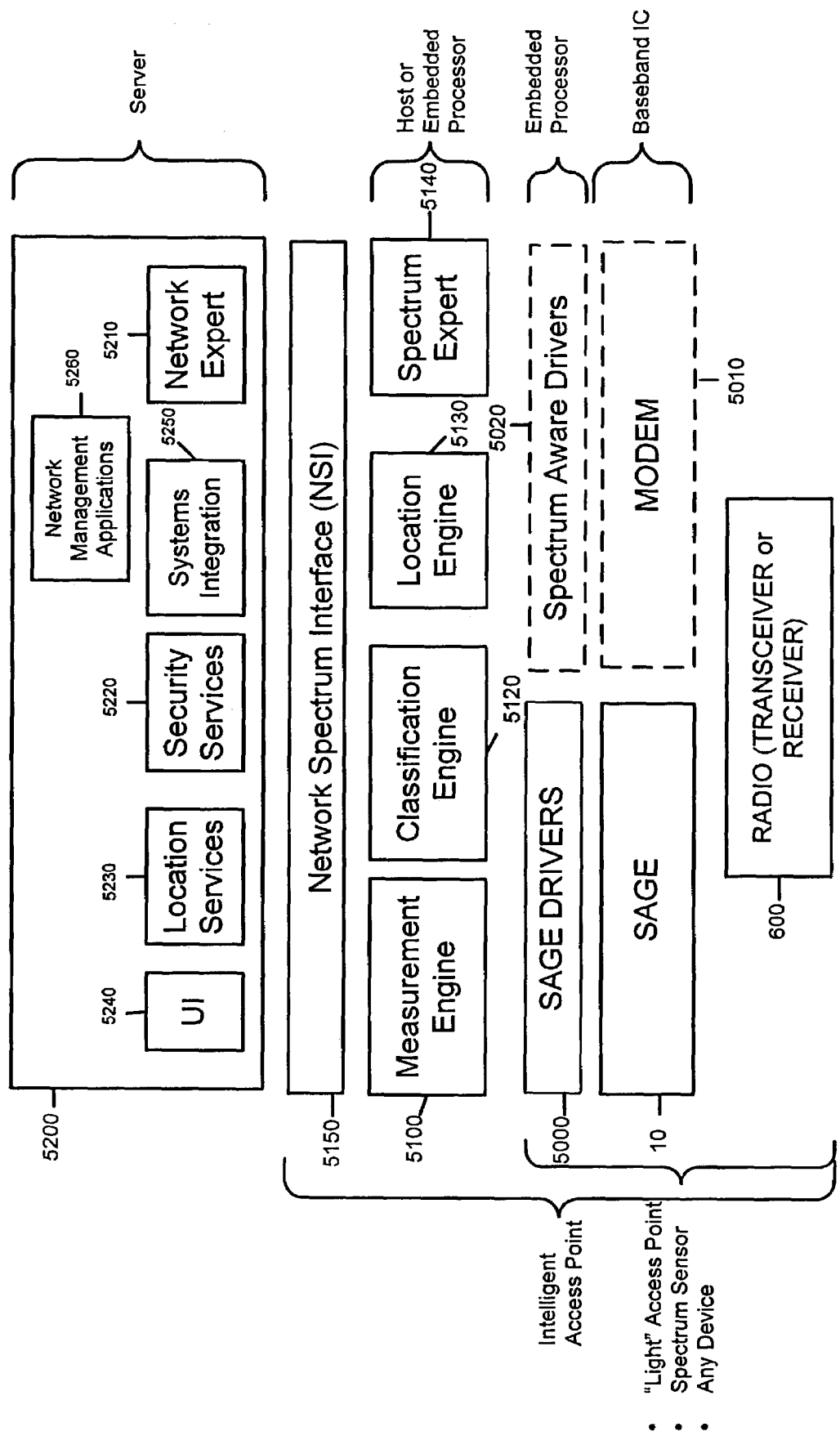
FIG. 23 is a block diagram showing use of the SAGE in a spectrum management system that manages activity in a frequency band.

FIG. 23 is diagram illustrating how the SAGE 10 may be part of a larger spectrum management system. The SAGE 10 in cooperation with the radio 600 generates spectrum activity information that is used by one or more software programs. SAGE drivers 5000 are used by the one or more software applications to configure and access information from the SAGE 10. Examples of software the software programs that may use information from the SAGE 10 including a measurement engine 5100, a classification engine 5120, a location engine 5130 and a spectrum expert 5140. These processes may be executed by an embedded processor or host processor (see FIG. 21). Controls generated by the spectrum expert 5140, network expert 5210 or other applications are coupled to a device through the spectrum aware drivers 5020, which in turn may control the baseband signal processing (e.g., modem) 5010 and/or the radio 600.

At still a higher level above these software programs may be higher level application services 5200, such as user interface applications, network management applications, etc. A network spectrum interface (NSI) 5150 serves as an application programming interface between the higher level application services 5200 and the processes on the other side of the NSI 5150.

The measurement engine 5100 collects and aggregates output from the SAGE 10 and normalizes the data into meaningful data units for further processing. Specifically, the measurement engine 5100 accumulates statistics for time intervals of output data from the SAGE 10 to track, with respect to each of a plurality of frequency bins that span the frequency band, average power, maximum power and duty cycle. In addition, the measurement engine 5100 accumulates pulse events for signal pulses output by the SAGE that fit the configured criteria. Each pulse event may include data for power level, center frequency, bandwidth, start time, duration and termination time. The measurement engine 5100 may build histograms of signal pulse data that are useful for signal classification. Finally, the measurement engine 5100 accumulates raw received signal data (from the snapshot buffer of the SAGE 10) useful for location measurement in response to commands from higher levels in the architecture. The measurement engine 5100 may maintain short-term storage of spectrum activity information. Furthermore, the measurement engine 5100 may aggregate statistics related to performance of a wireless network operating in the radio frequency band, such as an IEEE 802.11 WLAN. In response to requests from other software programs or systems (via the network spectrum interface described hereinafter), the measurement engine 5100 responds with one or more of several types of data generated by processing the data output by the SAGE 10.

The classification engine 5120 compares the outputs of the SAGE 10 against data templates and related information of known signals in order to classify signals in the frequency based on energy pulse information detected by the SAGE. The classification engine 5120 can detect, for example, signals that interfere with the operation of one or more devices (e.g., occupy or occur in the same channel of the unlicensed band as a device operating in the band). The output of the classification engine 5120 includes classifiers of signals detected in the frequency band. A classification output may be, for example, "cordless phone", "frequency hopper device", "frequency hopper cordless phone", "microwave oven", "802.11x WLAN device", etc. The classification engine 5120 may compare signal data supplied to it by the measurement engine against a database of information of known signals or signal types. The signal classification database may be updated for new devices that use the frequency band. In addition, the classification engine 52 may output information describing one or more of the center frequency, bandwidth, power, pulse duration, etc. of the classified signal, which is easily obtained directly from the signal detector output of the SAGE. This may particularly useful for a classified signal that is determined to interfere with operation of other devices in the frequency band.

Examples of signal classification techniques are described in commonly assigned co-pending U.S. application Ser. No. 10/246,364, filed Sep. 18, 2002, entitled "System and Method for Signal Classification of Signals in a Frequency Band," the entirety of which is incorporated herein by reference. These signal classification techniques that may be used are based on pulse histograms, pulse time signatures and other custom algorithms, examples of which are described in the aforementioned pending patent application. It should be understood that other signal classification techniques may be used with the output of the SAGE 10.

The location engine 5130 computes the physical location of devices operating in the frequency band. One example of a location measurement technique involves using snapshot buffer data collected by the measurement engine 5100 to perform time difference of arrival measurements at known locations of a signal transmitted by the device to be located and another reference signal to determine a location of a variety of devices (such as interferers) operating in the region of the frequency band. Sometimes simply moving an interferer to a different location can resolve transmission problems that another device or network of devices may be experiencing. The location engine 5130 may coordinate measurements obtained from multiple locations in the network. An example of a location engine is disclosed in commonly assigned co-pending U.S. application Ser. No. 60/319,737, filed Nov. 27, 2002, entitled "System and Method for Locating Wireless Devices in an Unsynchronized Wireless Network," the entirety of which is incorporated herein by reference.

Many other techniques to determine the location of wireless radio communication devices are known in the art and may be used as well. The location engine 5130 may alternatively reside in software "above" the NSI 5150. When an interference condition in the frequency band is detected, the spectrum expert 5140 may command the location engine 5130 to locate the source of the interferer. The output of the location engine 5130 may include position information, power level, device type and/or device (MAC) address. In addition, a network security application below or above the NSI may command the location engine 5130 to locate a rogue device that may present a possible security problem.

The spectrum expert 5140 is a process that optimizes operation of devices operating in the frequency band, given knowledge about the activity in the frequency band obtained by the measurement and classification engines. For example, the spectrum expert 5140 processes data from the SAGE 10 and optionally statistics from a particular wireless network operating in the frequency band, such as an IEEE 802.11x network, in order to make recommendations to adjust parameters of a device, or to automatically perform those adjustments in a device. The spectrum expert 5140 may be a software program that is executed, for example, by a network management station. Parameters that can be adjusted (manually or automatically) based on output of the spectrum expert 5140 include frequency channel, transmit power, fragmentation threshold, RTS/CTS, transmit data rate, CCA threshold, interference avoidance, etc. Example of interference mitigation techniques are described in commonly assigned and co-pending U.S. application Ser. No. 10/248,434, filed Jan. 20, 2003, and entitled "Systems and Methods for Interference Mitigation with Respect to Periodic Interferers in Short-Range Wireless Applications," the entirety of which is incorporated herein by reference. The spectrum expert 5140 may operate on triggers for alert conditions in the frequency band, such as detection of a signal that interferes with the operation of a device or network of devices operating in the frequency band, to automatically report an alert, and/or adjust a parameter in a device in response thereto. For example, the spectrum expert 5140 may operate to control or suggest controls for a single WLAN AP.

The NSI 5150 may be transport independent (e.g., supports Sockets, SNMP, RMON, etc.) and parses spectrum information into sub-sections for session and radio control, measurement, events (classification), location and protocol specific enhanced statistics and controls. End user on-demand commands to check the spectrum knowledge or activity information at a particular device may be received from an application residing above the NSI 5150 and translated into a request for a particular process below the NSI 5150 to supply the requested information.

The higher level application services 5200 may include software and systems that perform broader analysis of activity in a frequency band, such as managing multiple WLANs, managing a WLAN associated with one or more wireless LANs, network security for both wired and wireless LANs, etc. These applications may call upon the services of any one or more of the software processes shown on the other side of the NSI 5150. For example, there may be a network expert 5210, security services 5220, location services 5230, user interfaces 5240, and systems integrations 5250 to integrate the lower level processes with other applications, such as a network management application 5260. For example, the network management application 5260 may be executed by the network management station 1090 that is located in a central monitoring or control center (telephone service provider, cable Internet service provider, etc.) coupled to the sensor devices, APs, etc., as well as the devices which it controls (e.g., APs) via a wide area network (WAN) connection, e.g., the Internet, a dedicated high speed wired connection, or other longer distance wired or wireless connection.

An example of a security application use of the SAGE 10 is to identify a particular device for security purposes based on its pulse signature. For example, a network management system may manage a wireless network, such as an IEEE 802.11 network. Security of the wireless network is one function of the network management system. Each device authorized to operate in the wireless network may be assigned an address used to associate and operate in the network. An IEEE 802.11 access point (AP) may also require authorization to operate. Whenever a device goes active in the wireless network, whether it is a station (STA) or AP, its pulse characteristics are captured when it transmits (by a device operating in the network having a SAGE 10) to verify whether it is an authorized device (i.e., not a fraudulent device masquerading as an authorized device). These characteristics may include very specific pulse duration, pulse bandwidth, pulse power, etc. that may uniquely identify each device. The network management system may store a database of pulse characteristics against addresses (e.g., MAC addresses or IP addresses) for each device. When a device transmits, it will inevitably include an address that is recognized by an AP in the network. The pulse characteristics (captured by a SAGE enabled device, such as an AP operating in the band) associated with a signal transmitted by a device on an address are compared to the data in the database for that address. If there is a substantial match, the device is said to be authorized. If there is not a match, the device is declared to be unauthorized and steps can be taken to investigate that device further. Consequently, a fraudulent device masquerading as a valid device under a valid address can be detected.

Spectrum Activity Information and Accessing it Using the NSI

The measurement engine 5100, classification engine 5120, location engine 5130 and spectrum expert 5140 perform spectrum analysis functions and generate information that may be used by application programs or systems that access these functions through the NSI 5150. The NSI 70 may be embodied by instructions stored on a computer/processor readable medium and executed by the processor (server 1055 or network management station 1090) that executes the one or more application program or systems. For example, this processor would execute instructions for an NSI "client" function that generates the request and configurations for spectrum analysis functions and receives the resulting data for the application program. The processor(s) that execute(s) the measurement engine, classification engine, location engine and/or spectrum expert will execute instructions stored on an associated computer/processor readable medium (shown in FIGS. 20-22) to execute an NSI "server" function that responds to requests from the NSI client to generate configuration parameters and initiate spectrum analysis functions by the measurement engine, classification engine, location engine and/or spectrum expert to perform the requested spectrum analysis function and return the resulting data. The measurement engine may in turn generate controls for the SAGE drivers 5000 to configure the SAGE 10 and/or radio 600.

It should be further understood that the classification engine, location engine and spectrum expert can be viewed as a client to the measurement engine and would generate requests to, and receive data from, the measurement engine similar to the manner in which an application program would interact with the measurement engine. Further still, the spectrum expert can be viewed as a client to the classification engine and location engine and request analysis services of those engines.

The NSI 5150 may be transport independent (e.g., supports Sockets, SNMP, RMON, etc.) and may be designed for implementation in a wired or wireless format, such as by TCP/IP traffic from an 802.11 AP to a PC which is running software designed to accept the traffic for further analysis and processing. The TCP/IP traffic (or traffic using some other network protocol) could also be carried by a PCI bus inside a laptop PC, provided the PC has built-in 802.11 technology, or an 802.11 NIC. If the source of the spectrum information data stream is a TCP/IP connection, the application program would implement a socket, and access the correct port, to read the data stream. A sample of typical code for this purpose is shown below. (The sample is in Java, and shows client-side code.) Once the port connection to the data stream is established, the use of the data stream is determined by the network management software itself.

```
! Open Socket and Port (Remember to first assign the correct
value
! for the 802.11 device PortNumber)
Socket MyClient;
try {
    MyClient = new Socket("Machine name", PortNumber);
}
catch (IOException e) {
    System.out.println(e);
```

-continued

```
}
! Create input stream to get data from NSI
DataInputStream input;
try {
    input = new DataInputStream(MyClient.getInputStream( ));
}
catch (IOException e) {
    System.out.println(e);
}
! Create DataOutputStream to send control commands and
! configuration data to NSI
DataOutputStream output;
try {
    output = new DataOutputStream(MyClient.getOutputStream( ));
}
catch (IOException e) {
    System.out.println(e);
}
```

The class DataInputStream has methods such as read. The class DataOutputStream allows one to write Java primitive data types; one of its methods is writeBytes. These methods can be used to read data from, and write data to, the NSI 5150.

If the transport of the data stream occurs over other low-level media, other methods are used to access the data stream. For example, if the data is carried over a PC's PCI bus, a PCI device driver will typically provide access to the data.

The information provided by the NSI to an application program corresponds to data generated by the measurement engine 5100 (through the SAGE), classification engine 5120, location engine 5130, and/or the spectrum expert 5140.

In acting as the API, the NSI has a first group of messages that identify (and initiate) the spectrum analysis function (also called a service or test) to be performed and provide configuration information for the function. These are called session control messages and are sent by the application program to the NSI. There is a second group of messages, called informational messages, that are sent by the NSI (after the requested spectrum analysis functions are performed) to the application program containing the test data of interest.

Most of the spectrum analysis functions (i.e., tests) have various configuration parameters, which are sent via session control messages, and which determine specific details of the test. For example, in monitoring the spectrum, session control messages tell the NSI how wide the bandwidth should be (narrowband or wideband), and the center frequency of the bandwidth being monitored. In many cases, detailed test configuration parameters for a spectrum analysis function can be omitted from the session control messages. In those cases, the NSI uses default settings.

Examples of spectrum analysis functions that the measurement engine 5100 (in conjunction with the services of the SAGE 10) may perform, and the resulting data that is returned, include:

Spectrum Analyzer Power vs. Frequency Data. This data describes the total power in the spectrum as a function of frequency, over a given bandwidth.

Spectrum Analyzer Statistics Data. This data provides a statistical analysis of the data in RF power vs. frequency measurements.

Pulse Event Data—This data describes characteristics on individual RF pulses detected by the SAGE 10. The characteristics for (and thus the types of pulses) detected by the SAGE 10 can be configured.

Pulse Histogram Data. This data describes the distribution of pulses per unit of time, in terms of the percentage of pulses distributed among different frequencies, energy levels, and bandwidths.

Snapshot Data. This data contain portions of raw digital data of the RF spectrum captured by the snapshot buffer of the SAGE 10. The data can help identify the location of devices, and can also be used to extract identifier information which can determine the brand of certain devices operating in the frequency band, for example. Snapshot data may also be useful for signal classification.

The classification engine 5120 may perform spectrum analysis functions to determine and classify the types of signals occurring in the frequency band, and together with optional recommendation or descriptive information that may be provided by the classification engine or spectrum expert 5140, the resulting data that is returned are called spectrum event data, which describe specific events, such as detecting a particular signal type as going active or inactive in the frequency band. The spectrum expert 5140, as well as the network expert 5120 and other applications or processes may use the output of the classification engine 5120.

There are numerous ways to format the NSI messages to provide the desired API functionality in connection with the spectrum analysis functions. The following are examples of message formats that are provided for the sake of completeness, but it should be understood that other API message formats may be used to provide the same type of interface between an application program and spectrum analysis functions pertaining to activity in a frequency band where signals of multiple types may be simultaneously occurring.

A common message header may be used by both session control messages and information messages. The common header, called the sm1StdHdr_t header, comes at the very beginning of all messages and provides certain general identifying information for the message. An example of the general format of the common header is explained in the table below.

| Sub-Field | Description and Notes |
|---|---|
| msgLen | 'msgLen' is the length of the message in bytes. |
| msgType | 'msgType' is an integer which indicates whether this is a |
| sessType | Start Test message, a data message, etc. 'sessType' is an integer which indicates the type of test, such as a pulse test, or an spectrum analyzer test. |
| configToken | This value is set by the user (the requesting application program also called the Network Management Software) when a test is set up. The purpose is to help the requesting application program distinguish incoming data based on different test configurations. |
| timestampSecs | Use of the time stamp is message dependent. |
| Src | 'src' and 'dest' fields are intended to facilitate |
| Dest | multiplexing of session routing across common transport connections, where needed. |

Informational messages are started with two headers: the common header (sm1StdHdr_t), followed by the Info Header (sm1InfoHdr_t). The sm1InfoHdr_t header provides specific identifying parameters for information messages:

| Sub-Field Name | Description and Notes |
|---|---|
| transactionSeq | Sequence for this message. This starts at 1, and is incremented for each succeeding message. The increment reflects the number of data samples (transactionCnt) in the previous messages. For some types of messages the number of data points, and hence the transactionCnt, is fixed at '1'; for these message types successive messages always have their transactionSeq incremented by '1'. |
| transactionCnt | 'transactionCnt' generally indicates the number of entries in a message, where entries are discrete units of data. Its use is message dependent. For example, for Power vs. Frequency spectrum messages, this value indicates the number of sequential "snapshots" of the RF spectrum in the message. (Each snapshot is encapsulated in a specific sequence of bytes. If the transactionCnt has a value of 10, then the message contains 10 successive snapshots of the RF spectrum; there are ten matching byte patterns which follow, each of which reports on one snapshot of the RF spectrum.) |

A summary of all the messages that may be sent via the NSI is contained in the table below. The numeric values in the table below correspond to the values that are used in the msgType sub-field of the sm1StdHrd_t field.

| msgType Name | msgType Value | Direction | Meaning |
|---|---|---|---|
| SESS_START_REQ | 40 | User→NSI | Start a service, or copying a service. |
| SESS_STARTED_RSP | 41 | NSI→User | Test started. |
| SESS_PENDING_RSP | 42 | NSI→User | Session will start when the service is freed up from another user. |
| SESS_REJECT_RSP | 43 | NSI→User | Session could not be started. |
| SESS_STOP_REQ | 44 | User→NSI | Request to stop the service. |
| SESS_STOPPED_RSP | 45 | NSI→User | Service stopped, either in response to user request or due to problems. |
| SM_MSG_L1_INFO | 46 | NSI→User | Informational message containing test data. |
| SESS_QUERY_REQ | 47 | User→NSI | Requests the current test configuration. |
| SESS_QUERY_RSP | 48 | NSI→User | Current test configuration. |
| SESS_POLL_REQ | 49 | User→NSI | Requests a poll, or flushing, of pulse histogram test data. |
| SESS_POLL_RSP | 50 | NSI→User | Pulse histogram test data. |
| SESS_RECONFIG_REQ | 51 | User→NSI | Reconfigure a test session. |
| SESS_RECONFIG_RSP | 52 | NSI→User | Response to reconfiguration request. |
| SESS_VENDOR_REQ | 52 | User→NSI | Vendor-defined request. |
| SESS_VENDOR_RSP | 53 | NSI→User | Vendor-defined response. |

Examples of informational messages, which as suggested above, are NSI formatted versions of the output of the measurement engine 5100 and classification engine 5120, and optionally the spectrum expert 5140, are described.

Spectrum Analyzer Power vs. Frequency Data

The SAGE 10 will analyze a frequency band centered at a frequency which may be controlled. Moreover, the bandwidth of the frequency band analyzed may be controlled. For example, a portion, such as 20 MHz (narrowband mode), of an entire frequency band may be analyzed, or substantially an entire frequency band may be analyzed, such as 100 MHz (wideband mode). The selected frequency band, is divided into a plurality of frequency "bins" (e.g., 256 bins), or adjacent frequency sub-bands. For each bin, and for each sample time interval, a report is made from the output of the SAGE 10 on the power detected within that bin as measured in dBm. The measurement engine 5100 supplies the configuration parameters to the SAGE drivers 15 and accumulates the output of the SAGE 10 (FIG. 1).

Figure 24:
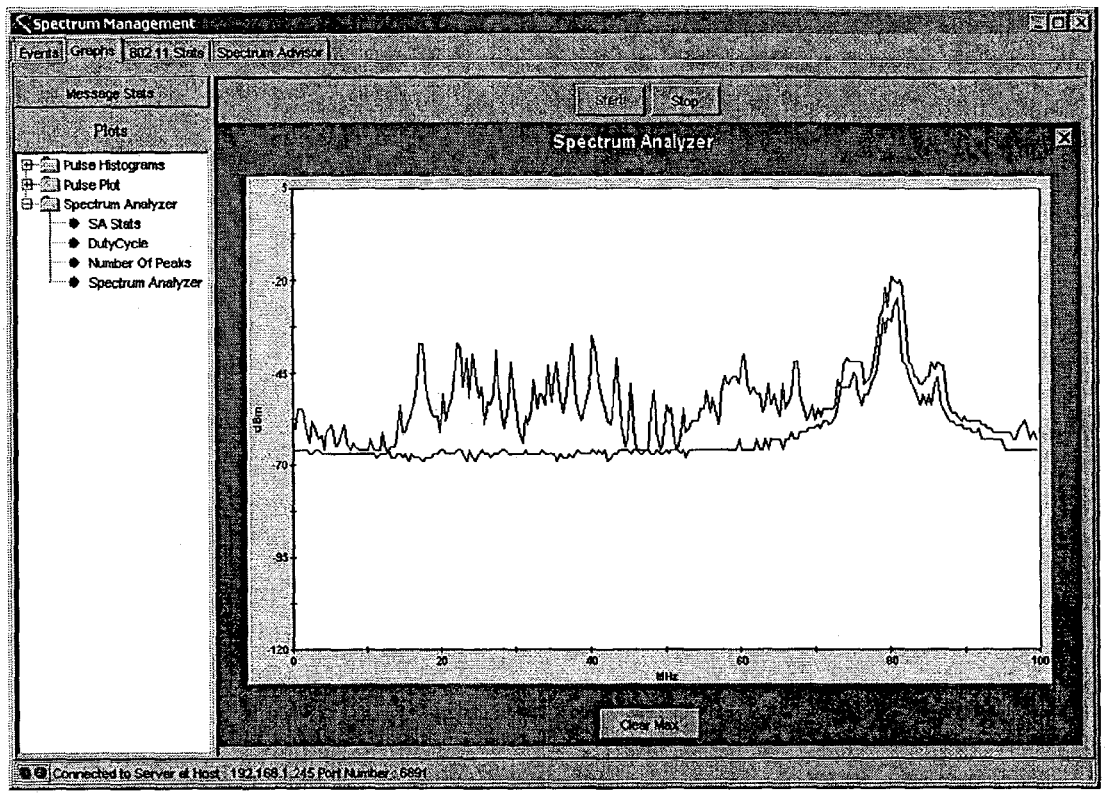
FIGS. 24 through 27 are graphical diagram showing how SAGE output may be displayed.

FIG. 24 (also described further hereinafter) illustrates a graph that may be created from power measurements taken at a given time interval. In the illustration, the vertical bars do not represent the distinct frequency bins. Of the two jagged lines shown in FIG. 24, the lower line represents a direct graph of the data in a single snapshot of the spectrum at a given instant in time. It corresponds to the data in one, single sapfListEntries field, described below. However, a spectrum analysis message may contain multiple sapfListEntries fields; each such field corresponding to a single snapshot of the spectrum. The upper jagged line was constructed by a software application. It represents the peak values seen in the RF spectrum over the entire testing period to the present instant.

An example of the structure of the spectrum analyzer power vs. frequency data is as follows.

| Primary Field Names | Description and Notes |
| --- | --- |
| sm1StdHdr_t | Standard header. |
| sm1InfoHdr_t | The second standard header. |
| sm1SapfMsgHdr_t | Describes the frequency band being analyzed, providing both the center frequency and the width of the each of the 256 bins. |
| sapfListEntries | This fields contains the primary data of interest, that is, the RF signal power in dBm for each of the 256 frequency bins. There may be only a single instance of this field in the message, or there may be multiple instances. If there is more than one such field, each field corresponds to a single snapshot in a time-series of snapshots of the RF spectrum. The number of instances is given by the sm1InfoHdr_t.transactionCnt sub-field. |

In the second standard header, the msgType is 46 to identify the message as an informational message, and the sessType is 10 (SM_L1_SESS_SAPF) to identify that data results from a session that is a spectrum analyzer power vs. frequency test.

The field below is the standard information header for spectrum analyzer power vs. frequency data.

| Sub-Field Name | Description and Notes |
| --- | --- |
| transactionSeq | Sequence for this message. This starts at 1 for the first message. For each subsequent message, it is incremented by the value of transactionCnt in the previous message. |
| transactionCnt | Number of sapfList entries in message (sapfList). In other words, this is the number of sequential "snapshots" of the RF spectrum in the message. |

This field sm1SapfMsgHdr_t below describes the frequency spectrum that is being monitored. While this message provides the center frequency and the width of the bins, it may not provide the total bandwidth being measured. This can be calculated (low end=frqCenterkHz−128*binSize, high end=frqCenterkHz+128*binSize. The radio receiver being used to monitor the bandwidth need not actually span the full bandwidth. As a result, some of the frequency bins at either end of the spectrum will typically show zero (0) RF power.

| Sub-Field Name | Description and Notes |
| --- | --- |
| frqCenterkHz | Center Frequency of the power vs. frequency lists in kHz. |
| binSizekHz | Size of bins in kHz. |

For a single snapshot of the RF spectrum at a moment in time, the sapfListEntries field explained below contains the information of primary interest, namely, the power level in dBm for each of the frequency bins.

| Sub-Field Name | Description and Notes |
| --- | --- |
| timestampSecs timestampmicrosecs | Timestamp seconds, and fractional portion of timestamp in μseconds. The time is counted from the beginning of the test, not from some absolute time (i.e., not like in the UNIX operating system). |
| powerValuesdBm | Bins (−128 to 127) dBm power values. The value reflects the energy that the radio receiver "sees" in the portion of the frequency spectrum corresponding to this bin. |

The frequency range corresponding to bin "N", where N goes from 0 to 255, is given by:

$$LowFrequency[N] = \text{sm1SapfMsgHdr\_t} frqCenterkHz +$$
$$(N-128) * \text{sm1SapfMsgHdr\_t} binSizekHz$$
$$HighFrequency[N] = \text{sm1SapfMsgHdr\_t} frqCenterkHz +$$
$$(N-127) * \text{sm1SapfMsgHdr\_t} binSizekHz$$

Spectrum Analyzer Statistics Data

The spectrum analyzer statistics data/messages provide a statistical analysis of the data in the frequency spectrum.

A single message is built from a specified number of FFT cycles, where a single FFT cycle represents an, e.g., 256 frequency bin output of the FFT. For example, 40,000 successive FFTs of the RF spectrum, taken over a total time of ¹⁄₁₀ of a second, are used to construct the statistics for a single message.

Figure 25:
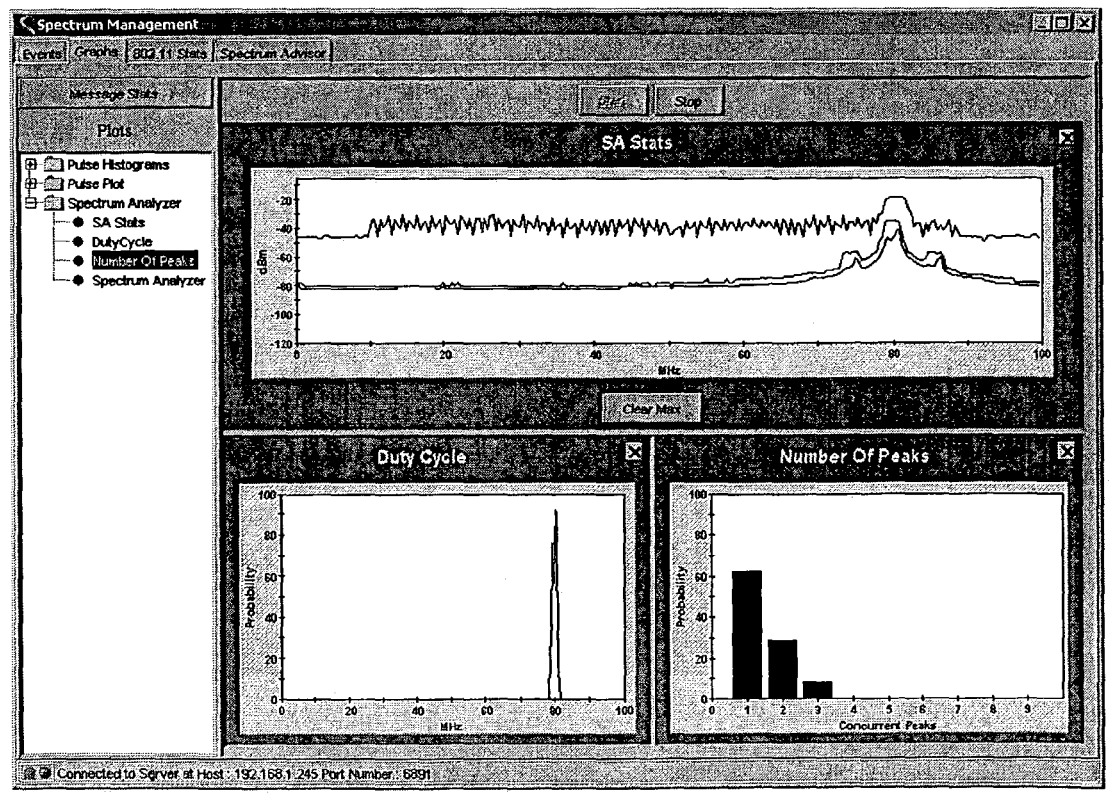

FIG. 25 shows the kind of information that can be conveyed in the spectrum analyzer statistics data. The bottom line shows the average power over the sampling period (i.e., over the 40,000 FFTs, or ¹⁄₁₀ second). The top line represents the "absolute maximum power" over all spectrum analyzer statistics messages received so far.

An example of the overall structure of the spectrum analyzer statistics data is:

| Field Name | Description and Notes |
| --- | --- |
| sm1StdHdr_t | msgType = 46 (SM_MSG_L1_INFO) sessType = 11 (SM_L1_SESS_SASTATS) |
| sm1InfoHdr_t | No special fields |

-continued

| Field Name | Description and Notes |
|---|---|
| sm1SaStatsMsgHdr_t | This field contains general parameters about the statistical sampling process. See format below. |
| statsBins | 256 Spectrum Analysis Stats Bins. See discussion. |
| activeBins | 10 bins for active peaks. See discussion. |
| quality | A number from 0 to 100 indicating the quality of the entire band. 0 is the worst, 100 is the best. Values 0–33 indicate "POOR", 34–66 indicates "GOOD" and 67–100 indicates EXCELLENT. |

This message header sm1SaStatsMsgHdr_t field contains parameters which describe the sampling process, examples of which are below.

| Sub-Field Name | Description and Notes |
|---|---|
| bwkHz | The bandwidth (narrow/wide) for the statistical analysis of the RF spectrum in kHz. Narrowband is approximately 20 MHz, and wideband is approximately 100 MHz. |
| cycleCnt | The number of FFT cycles accumulated into the statistics. This is user configurable, but is typically in the range of 20,000 to 40,000. |
| startTimeSecs startTimeUsecs | Start timestamp in seconds, and start timestamp, fractional portion, in μseconds, for the current message, indicating when measurements for the current set of statistics began. Measured from when the test started running. |
| endTimeSecs endTimeUsecs | End timestamp in seconds, and end timestamp, fractional portion, in μseconds, for the current message, indicating when measurements for the current set of statistics finished. Measured from when the test started running. |
| centerFreqkHz | Center Frequency in kHz. User configurable. |
| pwrThreshDbm | dBm of the current power threshold used for duty cycle and active bins information. This represents the minimum power the RF spectrum must have to be counted in the duty cycle and active bin statistics (these statistics are discussed further below). |
| noiseFloorDbm | dBm value of the current noise floor. |

There are, for example, 256 consecutive statsBins, each with four sub-fields as shown in the table below. Each statsBin, with its four subfields, contains the statistical data for a particular bandwidth. To calculate the width of each frequency bin, the following formula may be used:

binWidth=sm1SaStatsMsgHdr_t. bwkHz /256

The lower and upper bandwidth for each bin is giving by the following formulas:

LowBandwidth[$N$]=sm1SaStatsMsgHdr_t. centerFreqkHz+(($N$−128)*binWidth)

HighBandwidth[$N$]=sm1SaStatsMsgHdr_t. centerFreqkHz+(($N$−127)*binWidth)

| Sub-Field Name | Description and Notes |
|---|---|
| avgDbm[0] | Average dBm power level (−128 to 127 dBm) for this frequency bin. |
| maxDbm[0] | Maximum dBm power level (−128 to 127 dBm) for this frequency bin. |
| dutyPercent[0] | The percentage of time, multiplied by 2, that the power level for this bin remained above a (user-defined) threshold. |
| avgDbm[1] | Average dBm power level (−128 to 127 dBm) for this frequency bin. |
| maxDbm[1] | Max dBm power level (−128 to 127 dBm) for this frequency bin. |
| dutyPercent[1] | The percentage of time, multiplied by 2, that the power level for this bin remained above a (user-defined) threshold. |
| avgDbm[N] | Average dBm power level (−128 to 127 dBm) |
| maxDbm[N] | Max dBm power level (−128 to 127 dBm) |
| dutyPercent[N] | Percentage X 2 that power remained above threshold. |
| avgDbm[255] | Average dBm power level (−128 to 127 dBm) |
| maxDbm[255] | Max dBm power level (−128 to 127 dBm) |
| dutyPercent[255] | Percentage X 2 that power remained above threshold. |

There are ten consecutive activeBins which record "peak" activity. The bins may be viewed as being indexed consecutively, from 0 to 9. For each bin, the value in the bin should be interpreted as follows. In the Nth bin, if the value in the bin is X, then for (X/2)% of the time, there were N peaks in the RF spectrum during the sampling period, except for the special case below for the 10th bin, called bin 9.

| Sub-Field Name | Description and Notes |
|---|---|
| activeBins[0] | If the value in this bin is X, then (X/2)% of the time, there were no peaks (0 peaks) in the RF spectrum. |
| activeBins[1] | If the value in this bin is X, then (X/2)% of the time, there was 1 peak in the RF spectrum. |
| activeBins[2] | If the value in this bin is X, then (X/2)% of the time, there were 2 peaks in the RF spectrum. |
| activeBins[8] | If the value in this bin is X, then (X/2)% of the time, there were 8 peaks in the RF spectrum. |
| activeBins[9] | If the value in this bin is X, then (X/2)% of the time, there were 9 or more peaks in the RF spectrum. |

As described above in conjunction with the SAGE 10, peaks are spikes, or very brief energy bursts in the RF spectrum. If a burst persists for a certain period of time (e.g., approximately 2.5 μsec), the SAGE 10 will detect the peak, and the peak will be included in the statistics described in this subsection. Such brief peaks are generally not included in pulse data or pulse statistics. Also as described above, if a series of consecutive peaks are seen over a continuous time period, all at the same frequency, this series—once it reaches some minimum time threshold—it will be counted as a pulse. FIG. 25 also shows how the number of peaks may be displayed associated with activity in the frequency band.

The exact minimum duration of a pulse, for testing purposes, is configurable by the application program, but a typical time may be 100 μsec. Since the SAGE 10 can detect RF events as brief as 2.5 μsec, a typical pulse would need to persist through at least 40 FFTs before being acknowledged as being a pulse.

Pulse Event Data

A signal pulse is a sustained emission of RF energy in a specific bandwidth starting at a specific time. The SAGE 10 detects pulses in the radio frequency band that satisfy certain configurable characteristics (e.g., ranges) for bandwidth, center frequency, duration and time between pulses (also referred to as "pulse gap"). When the SAGE 10 detects a pulse that has these characteristics, it outputs pulse event data for the pulse including:

Start Time—Measured from when the SAGE first begins detecting pulses.

Duration—The lifetime of the pulse.
Center Frequency—The center frequency of the pulse.
Bandwidth—How wide the pulse is.
Power—Average power in dBm.

The overall structure of a pulse event (PEVT) data/message is shown in the table below.

| Field Name | Description and Notes |
|---|---|
| sm1StdHdr_t | msgType = 46 (SM_MSG_L1_INFO)<br>sessType = 12 (SM_L1_SESS_PEVT) |
| sm1InfoHdr_t | transactionCnt = number of PEVTs in message; each PEVT contains data on one pulse. |
| classPevts | sm1Pevts: an array of 'transactionCnt' PEVTs of the form 'sm1Pevt_t' shown below. Each field contains data on one pulse |

This information header field is the standard information header for pulse event messages.

| Sub-Field Name | Description and Notes |
|---|---|
| transactionSeq | Sequence for this message. This begins with 1 for the first message. For each successive message, it is incremented by the transactionCnt in the previous message. (In other words, it is incremented by the number of pulses reported on in the previous message.) |
| transactionCnt | Number of PEVTs in this message (Pevts). Each PEVT field corresponds to one pulse. |

There may be one or many pulse events in the message. Each instance of the classPevts field below, describes the properties of one pulse.

| Sub-Field Name | Description and Notes |
|---|---|
| sdId | This indicates which of 4 internal pulse detectors are being used by SAGE to detect this pulse. |
| termCodeFlags | This byte contains a series of flags which indicate how the pulse was terminated. |
| dBm | Pulse power in dBm. |
| frqCenterkHz | Center Frequency of the pulse in kHz.<br>The value shown will typically range from 0 to 100,000 kHz. To obtain the actual center frequency, add this value to the low end of the frequency spectrum being tested.<br>Example: If the frequency spectrum being tested ranges from 2,350,000 kHz to 2,450,000 kHz, and the frqCenterkHz value is 40,000 kHz, then the actual center frequency of the pulse is approximately 2,390,000 kHz.<br>Note: Actual resolution is ±200 to 500 kHz. |
| bandwidthkHz | Bandwidth of the pulse in kHz.<br>Note: Actual resolution is ±200 to 500 kHz. |
| durationUs | Pulse Duration in μseconds |
| timeOnSecs<br>timeOnUsecs | Pulse Time On, seconds portion; and Pulse Time On, fractional portion in μseconds. The time the pulse began is measured from when the test started running, not from someone absolute, fixed date. |

Pulse Histogram Data

While it is possible to access information about individual pulses, it may also be useful to work with the statistical information about pulses detected and occurring in the frequency band over time. That information is provided by pulse histogram data. The pulse histograms track distributions of: duration of the pulses (the percentage of pulses with short, medium, and long durations); gaps in time between the pulses (the percentage of pulses with short time gaps between them, medium time gaps, and long time gaps); bandwidth of pulses; frequency of pulses; and power of pulses.

Figure 26:
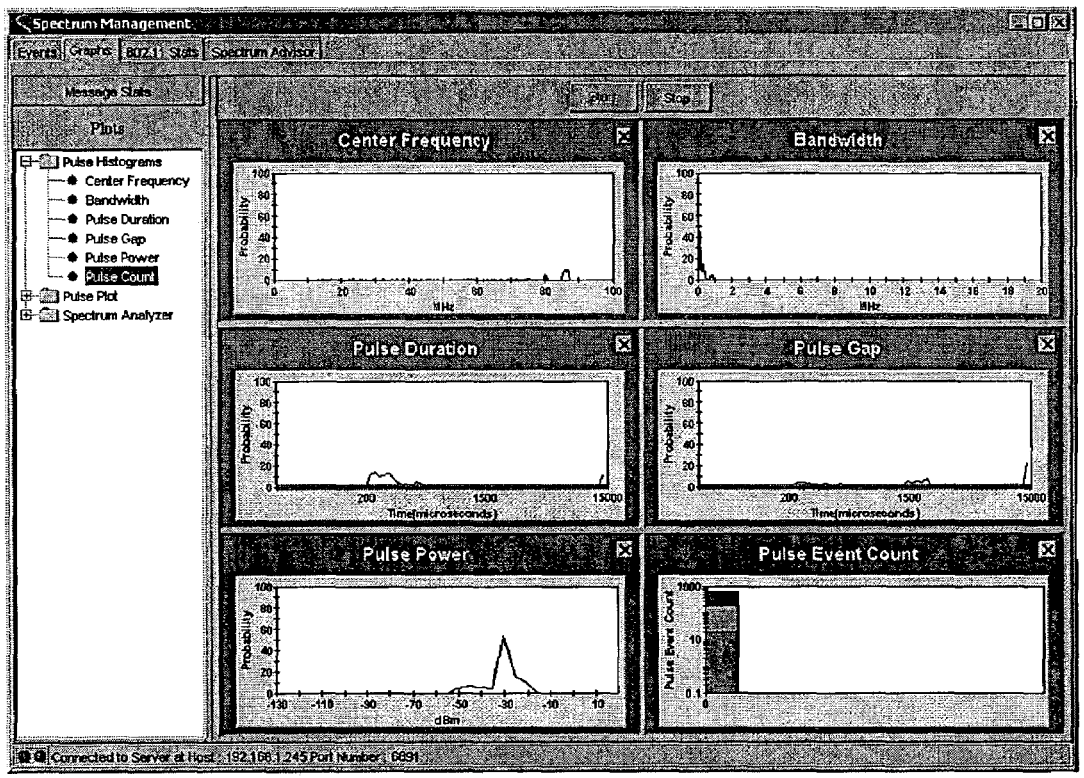

FIG. 26 illustrates graphical displays for exemplary pulse histograms.

The overall structure of the pulse histogram data is shown in the following table.

| Field Name | Description and Notes |
|---|---|
| sm1StdHdr_t | msgType = 46 (SM_MSG_L1_INFO)<br>sessType = 13 (SM_L1_SESS_CLASS) |
| sm1InfoHdr_t | no special fields |
| sm1PhistMsgHdr_t | Provides detailed information about the sampling process. |
| pulseDurationHistogram | Pulse Duration Histogram |
| pulseGapHistogram | Pulse Gap Histogram |
| pulseBandwidthHistogram | Pulse Bandwidth Histogram |
| centerFreqHistogram | Center Frequency Histogram |
| powerHistogram | Power Histogram |

This PhistMsgHdr field describes the frequency spectrum which is being monitored, and some other parameters of the overall sampling process.

| Sub-Field Name | Description and Notes |
|---|---|
| classMsgType | SM1_CLASS_PHIST_MSG == 1, (Pulse Histogram Msg) |
| numSampleIntervals | Number of sample intervals. If a dedicated radio receiver is continually listening for pulses, this value will be 1 (indicating a single sampling interval). If the radio device is doubling as a transmitter, then it cannot listen all the time; this parameter will indicate the number of times the radio device was actually able to listen for pulses. |
| avgSampleDurationMs | Average sample time size in msec.<br>If a dedicated radio device is continually listening for pulses, this value will be the same as the amount of time the SAGE 10 has been instructed to listen for pulses before sending statistical data. If the listening device cannot listen all the time, then multiply:<br>TALT = avgSampleDurationMs * numSampleIntervals to obtain the total actual listening time (TALT). To obtain the fraction of listening time, divide the TALT by the amount of time the CLP has been instructed to listen for pulses before sending statistical data. [The total listening time can also be calculated from the fields below: endTimeSecs + endTimeUsecs − (startTimeSecs + startTimeUsecs)] |
| histBwkHz | Histogram bandwidth in kHz |
| histCenterFreqkHz | Histogram Radio Center frequency in kHz |
| startTimeSecs<br>startTimeUsecs | Start timestamp seconds, and start timestamp, fractional portion in microseconds. This is measured from when the pulse histogram operation was initiated, not from some absolute starting time (i.e., not like in the UNIX operating system). |
| endTimeSecs<br>endTimeUsecs | End timestamp seconds, and end timestamp, fractional portion in microseconds. Again, this is measured from when the pulse histogram operation was initiated. |
| numPulseEvents | Number of pulse events recorded for this histogram. |

The pulse duration histogram fields contain a series of bytes. Each of the data bytes, or bins—in sequence—indicates the percentage (multiplied by two) of pulses that fall into a given range of durations. The table below categorizes data into smallBins, mediumBins, and largeBins and are only examples of how to track pulse duration.

The first bin (bin 0) contains the percentage (×2) of pulses that were between 0 μsec and 9 μsec. The second bin (bin 1) contains the percentage, multiplied by 2, of pulses that were between 10 μsec and 19 μsec in duration. Each of these "bins" is 10 μsec wide. This continues up to the 20th bin (bin 19), whose value is the percentage, multiplied times 2, of pulses that were between 190 and 199 μsec in length.

The next twenty-six bins are similar, except they are wider; specifically, they are 50 μsec wide. Bin 20 has a value which indicates the percentage (×2) of pulses that were between 200 μsec and 249 μsec in length. Again, there are twenty-six bins which are 50 μsec wide. Bin number 45 has a value which indicates the percentage (times 2) of pulses that were between 1450 μsec and 1499 μsec in length.

The final set of 27 bins each indicate the percentage (×2) of pulses that are wider still, specifically 500 μsec wide. Bin number 46 includes pulses whose duration was between 1500 μsec and 1999 μsec in length. Bin 72 includes pulses whose duration was between 14499 and 14999 μsec.

Pulse Duration Histogram Bins

| Sub-Field Name | Description and Notes |
|---|---|
| smallBins | Each bin contains the percentage (x2) of pulses that fell within a 10 μsec range. The range starts with 0 μsec to 9 μsec, and increases by 10 μsec for each consecutive byte. The final bin (bin number 19) covers pulses with widths between 190 to 199 μsec. |
| mediumBins | Each bin contains the percentage (x2) of pulses that fell within a 50 μsec range. The range starts with 200 μsec to 249 μsec, and increases by 50 μsec for each consecutive bin. The final bin-which is the 26th bin of the mediumBins, the 46th bin overall, and is numbered as bin 45-covers pulses with widths between 1450 to 1499 μsec. |
| largeBins | Each bin contains the percentage (x2) of pulses that fell within a 500 μsec range. The range starts with 1500 μsec to 1999 μsec, and increases by 5000 μsec for each consecutive bin. The 73rd bin (which is numbered as bin 72) covers pulses with widths between 14499 to 14999 μsec. |

The pulse gap histogram indicates the percentage (multiplied by two) of gaps between pulses, where the duration of the gap falls within a given time range. The bins do not reflect when the gaps occurred, they reflect how long the gaps were. Gaps are measured between the start of one pulse and the start of the next. This is because the start of a pulse tends to be sharply delineated, while a pulse may trail off more gradually. For example, assume there were a total of twenty gaps between pulses. Of these twenty, only two gaps had a duration between 10 μsec and 19 μsec. The first gap, which lasted 12 μsec, occurred at time 15.324 seconds. The second gap, which lasted 15 μsec, occurred at time 200.758 seconds. Both gaps are recorded in the second bin (numbered as bin 1). Since the two gaps reflect 10% of all recorded gaps, the value in the second bin (bin 1) will be 2×10%=20 (since all percentages are multiplied by two).

Pulse Gap Histogram Bins

| Sub-Field Name | Description and Notes |
|---|---|
| smallBins | Each consecutive bin contains the percentage (x2) of gaps between pulses, where the length of the gap fell within a 10 μsec range. The range starts with gaps that are 0 μsec to 9 μsec long, and increases by 10 μsec for each consecutive byte. The 20th and final bin (bin number 19) covers gaps whose duration was between 190 to 199 μsec. |
| mediumBins | Each bin contains the percentage (x2) of gaps whose duration fell within a 50 μsec range. The range starts with 200 μsec to 249 μsec (so all gaps whose duration is within this range are included in this first bin, number 20), and increases by 50 μsec for each consecutive bin. The final bin-which is the 26th bin of the mediumBins, the 46th bin overall, and is numbered as bin 45-covers gaps whose duration was between 1450 to 1499 μsec. |
| largeBins | Each bin contains the percentage (x2) of gaps whose duration fell within a 500 μsec range. Gaps whose duration was between 2500 μsec to 2999 μsec are reflected in the first bin; each consecutive bin increases the duration by 5000 μsec. The final bin-which is the 27th bin of the largeBins, the 73rd bin overall, numbered as bin 72-covers gaps with widths between 14499 to 14999 μsec. |

For the pulse bandwidth histogram, each data bin reflects a progressively wider bandwidth. For example, if the first bin represents pulses from 0 to 9.999 kHz in width, then the second bin represents pulses from 10 kHz to 19.999 kHz, the third bin pulses from 20 kHz to 29.999 kHz in width, etc. The value stored in the bin is the percentage (×2) of the pulses that had a bandwidth somewhere within the indicated range. For example, assume the size of each bin is 80 kHz. Suppose also that the SAGE 10 detected 1000 pulses and there are 256 frequency bins. The pulses with a bandwidth between 0 and 20,480 kHz. As another example, assume the SAGE 10 detects 65 pulses, each of which had a bandwidth somewhere between 400 and 480 kHz. Then, 6.5% of the pulses fall within the sixth bandwidth range, so the 6th bin (bin number 5) will have a value of 2×6.5%=13.

The bandwidth bins may have exactly the same width. For example, if the first bin is 80 kHz wide (and includes data for pulses with bandwidths from 0 to 15 79.999 kHz), then all successive bins will be 80 kHz wide. The second bin includes pulses from 80 kHz to 159.999 kHz; and the 256th bin—still 80 kHz wide—includes pulses with bandwidths from 20,400 kHz to 20,479.999 kHz.

Pulse Bandwidth Histogram Bins

| Sub-Field Name | Description and Notes |
|---|---|
| binSizekHz | Size of bin in kHz. |
| numBinsUsed | N, for example 256. |
| freqBins | The percentage (x2) of pulses which have a bandwidth corresponding to the bandwidth of this byte. The first byte (byte 0) represents pulse bandwidths from 0 to binSizekHz. The second byte (byte 1) represents pulse bandwidths from binSizekHz to 2 x binSizekHz. (So byte 1 contains the % * 2 of pulses whose bandwidth fell within this range.) In general, the $N^{th}$ bin represents pulses with bandwidths between (N − 1) * binSizekHz, and N * binSizekHz. Again, the value of the byte represents the % * 2 of pulses whose bandwidths fell within this range. |

For the pulse center frequency histogram, each data bin reflects a range of frequencies. The value stored in the bin is the percentage, multiplied times two, of the pulses whose center frequency fell within the indicated range of frequencies.

All frequency bins may be exactly the same width. However, in general, the lowest bin (byte number 0) does not start with the frequency 0 Hz. Recall that the pulse histogram message header (PhistMsgHdr_t) has a sub-field histCenterFreqkHz, which is measure in kHz. This field defines the center frequency for the pulse center frequency histogram.

The following formulae give the actual frequency range covered by each bin of this histogram, indicating both the low frequency and the high frequency of the range. The number N is the bin number, where bin numbers are counted from freqBins 0 to freqBins 255:

Low Frequ. (bin N)=histCenterFreqkHz−(128*binSizekHz)+(N*binSizekHz)

High Frequ. (bin N)=histCenterFreqkHz−(128*binSizekHz)+((N+1)*binSizekHz))

Suppose the size of each bin, in kHz, is 100 kHz, and that the bandwidth is 2.4 GHz. Frequencies are actually being monitored in the range from 2,387,200 kHz to 2,412,800 kHz. Suppose also that SAGE 10 detected 1000 pulses, and 80 pulses with center frequencies in the range from 2,387,600 kHz to 2,387,699 kHz. Then 8% of the pulses fall within the fifth bandwidth range, so bin 4 will have a value of 2×8%=16.

The field structure for the pulse center frequency histogram is indicated in the table below.

Pulse Center Frequency Histogram Bins

| Sub-Field Name | Description and Notes |
|---|---|
| binSizekHz | Size of bin in kHz, |
| numBinsUsed | N, for example 256. |
| freqBins | The percentage (x2) of pulses that have a central frequency corresponding to this byte. |

For the pulse power histogram, each bin reflects a certain power range, measured in dBm. The value of each bin reflects the percentage (×2) of those pulses whose power level fell within the indicated range.

Pulse Power Histogram Bins

| Sub-Field Name | Description and Notes |
|---|---|
| powerBins | Each bin indicates the % (x2) of those pulses which fell within the bin's designated power range. The range of each bin is 5 dBm, and the lower power of the lowest bin is −130 dBm. Therefore: bin[0] = −130 to −126 dBm bin[1] = −125 to −121 dBm bin[2] = −120 to −116 dBm . . . bin[N] = −130 + (N * 5) to −126 + (N * 5) . . . bin[29] = +15 to +19 dBm |

Snapshot Data

Snapshot data, unlike other data provided by the NSI, is not based on data analysis by the SAGE or software. Rather, this data provide raw data from the ADC which precedes the SAGE and that converts the received signal analog signal to digital data.

The raw ADC data may be expressed in n-bit I/Q format, where 'n' is indicated by 'bitsPerSample'. The snapshot samples can be used for location measurements, or for detailed pulse classification (such as identifying the exact model of a device). The size of the sample data contained in 'snapshotSamples' is typically 8 K bytes. The overall structure of the message is shown in the following table.

| Field Name | Description and Notes |
|---|---|
| sm1StdHdr_t | msgType = 46 (SM_MSG_L1_INFO) sessType = 17 (SM_L1_SESS_SNAP) |
| sm1InfoHdr_t | transactionCnt = 1 |
| smSnapshotMsg_t | Snapshot message body. K is 24 + 'snapshotSamplesLen' |

An example of a snapshot message smSnapshotMsg_t field is defined below.

| Sub-Field Name | Description and Notes |
|---|---|
| snapshotStartSecs | TARGET snapshot time in seconds |
| snapshotStartNanosecs | TARGET snapshot time in nanoseconds. |
| numberOfSamples | Number of IQ Snapshot Samples |
| bitsPerSample | Number of bits in a sample |
| radioGainDb | Radio gain in dB: −127 to 128 dB This is the radio gain used at the start of the sample interval. It may be used to convert the raw IQ samples into corresponding dBm power levels. |
| pulseDetectorId | Pulse Detector ID. Value of 0xFF indicates that a Pulse Detector was NOT used to trigger sampling. |
| reserved | Reserved for future expansion |
| snapshotSamplesLen | Number of bytes (N) in the 'snapshotSamples' field below. |
| snapshotSamples | Sample data. The size of this snapshotSamples is typically 8 k Bytes. Size N is the value in 'snapshotSamplesLen'. |

Spectrum Event Data

The msgType for spectrum event data is 46 and the sessType is 14 (SM_L1_SESS_EVENT). A format for the smEventMsg_t spectrum event message field is described in the table below.

| Sub-Field Name | Description and Notes |
|---|---|
| EventType | Character string. Up to 16 characters, null terminated. Some typical examples of event types are: "Information", "Identification", "Interferer", "Error". |
| EventDateTime | Number of seconds past an arbitrary date, e.g., Jan. 1, 1970 when smEventMsg was received. This field is essentially a placeholder; the value must be filled in by the receiving application. 0 is sent by the target. Displayed as hh:mm:ss mm/dd/yyyy. |
| EventTimestampSecs | TARGET event timestamp in seconds. Times are measured from when the monitoring began of the environment, not from some absolute calendar time. |
| EventTimestampUsecs | TARGET fractional portion of timestamp in microseconds. Times are measured from when the monitoring began of the environment, not from some absolute calendar time |
| EventId | Specific ID numbers are assigned to specific types of events. For example, a microwave oven startup may be '1', a Bluetooth device may be '2', a cordless phone may be '3', etc. For "Interferer" event messages, the following format applies: |

-continued

| Sub-Field Name | Description and Notes | | |
|---|---|---|---|
| | Low Address Byte | High Address Byte | |
| | 16 High Bits-Reserved | 15 Bits-Device ID | 1-Bit: On/Off |
| | The Device ID must be combined with the On/Off bit to obtain the actual numeric value of the field. For example, if the Device ID for a Bluetooth™ device is '2', the fifteen-bit pattern is '0000 0000 0000 010'. But with the On/Off bit appended to the right, the bit pattern becomes: '0000 0000 0000 0101' = Decimal 5 (device on), or '0000 0000 0000 0100' = Decimal 4 (device off). | | |
| EventSourceId | Identifies the target source. This parameter is only significant when more than one source (for example, more than one AP) is feeding data to the requesting software or system. | | |
| AlertLevel | Warning Levels for Messages | | |
| | Value | Severity | Suggested Display Colors |
| | 1 | Severe | Red |
| | 2 | High | Orange |
| | 3 | Elevated | Yellow |
| | 4 | Guarded | Blue |
| | 5 | Low | Green |
| EventMsg | This is a brief character string message, null terminated, which identifies the event that caused the message. For example, it may say "Microwave oven has started", or "Cordless phone". The content of the message is essentially redundant with the EventId (above), except that it provides text instead of a numeric identifier. | | |
| EventDescription | The event description will typically contain more detailed information, and will often include advisory and/or recommendation information as to how to resolve interference or other situation caused by the event source. | | |
| EventDetail | The event detail will generally include pertinent technical parameters, such as power levels or frequency bandwidth associated with the event. Newline characters delimit individual lines. | | |

Software and systems communicate requests to the NSI for data from the services on the other side of the NSI using the session control messages referred to above. An example of the format of the session control messages is as follows. There is a standard header followed by information elements. An information element is a data structure with several parts, as described in the following table:

| Field Name | Description |
|---|---|
| infoElementLen | Number of bytes in this information element, including this length field. |
| infoElementType | Information element type number. This type is used to distinguish the information element. The types are UNIQUE across ALL messages. Ex: An 'infoElementType' of '1' indicates "Reject Reason", and has a particular meaning independent of the 'sm1StdHdr_t.msgType' field. |
| infoElementBody | This contains the significant data of the information element, and may have one or more sub-fields. The information element body. The format of the data is determined by the infoElementType field. |

Typical information elements provide data such as the SAGE configuration data, radio configuration data, and service specific data (e.g., pulse data, spectrum data, etc.). Examples of NSI information elements are provided in the table below:

| Information Element Name | infoElementType (decimal) | Description |
|---|---|---|
| IE_RETURN_CODE | 1 | Activity completion status return code information |
| IE_SESSION_CFG | 2 | Session priority and startup configuration |
| IE_SAGE_CFG | 3 | Common SAGE Config effecting multiple services |
| IE_RADIO_CFG | 4 | Common radio configuration |
| IE_COPY_CFG | 5 | Request copy of any data for that service, with optional notification of configuration updates. |
| IE_SAPF_CFG | 6 | Spectrum Analyzer Power vs. Frequency configuration |
| IE_PD_CFG | 7 | Pulse Detector Configuration |
| IE_SA_STATS_CFG | 8 | Spectrum Analyzer Stats configuration |
| IE_PHIST_CFG | 9 | Configuration of PHIST service |
| IE_PEVT_CFG | 10 | Configuration of PEVT service |
| IE_SNAP_CFG | 12 | Snapshot Buffer configuration |
| IE_VENDOR_CFG | 13 | Vendor specific configuration information. |
| IE_FLOW_CTRL | 15 | INFO Message Flow Control |
| IE_VERSION | 16 | Version of NSI being used. |

There is an advantage to using information elements in NSI session control messages. The format of session control messages can be modified or expanded over time, as technology is further developed, while requiring no revisions to existing software or systems that use the NSI. In other words, enhancements to the messages do not break legacy code.

In traditional software design, the network management software would be coded with the expectation of specific data structures for each of the session control messages. Any time the session control messages were changed or enhanced, changes would be required in the code for the network management software, and the code would need to be recompiled.

With session control messages, however, this is no longer necessary. Session control messages are processed as follows.

1. The requesting software or system reads the message header, and determines what kind of message it is receiving.

2. Software developers know what kinds of information elements will follow the header field based on a specification document. Design decisions are made to determine what kinds of actions the software or system will take in response to those information elements.

3. In the code itself, after reading the header field, the software loops through information elements which follow. Only for information elements of interest—which can by flagged by the infoElementType field in each information element—the software takes appropriate action.

Additional information elements may be added to some of the session control messages. However, during the "looping" process the requesting software ignores any information elements which are not of interest to it, so the additional information elements in the control messages do not require any changes in the software code. Of course, it may be desirable to upgrade a software program to take advantage of additional types of information; but again, until that new software is in place, existing software continues to function.

This benefit works in both directions. For example, in sending messages to the NSI, the software program can send an information element which fine-tunes the behavior of the SAGE. Typically, however, SAGE's default operating modes are satisfactory, and there is no need to make changes. Rather than having to send an information element containing redundant, default configuration data for SAGE, this information element can simply be omitted.

A handshaking type protocol may be used to setup, initiate and terminate a session between the application and the NSI. There are numerous techniques known in the art to provide this function. For example, all tests are started by sending a sm1StdHdr_t field. Additional, optional information elements may follow. The NSI responds with messages indicating that the test has started successfully; that it was rejected; or that the test is pending (the test is queued behind other requests for the same service). The four possible session control reply messages are Started, Pending, Rejected, and Stop.

All Start Messages may have the following structure:

1. A required sm1StdHdr_t field with a msgType value of SESS_START_REQ (40), and a value for sessType to indicate the test to be performed. This field may come first. For example, to start a pulse event test, the sessType value of 12 is used, to start a pulse histogram test, a sessType value of 13 is used, to start a spectrum analyzer power vs. frequency test, a sessType value of 10 is used, etc.

2. An optional common session configuration information element. This configures parameters which are of interest for all the possible tests, described below.

3. For the Pulse Event test only, an optional information element to configure the pulse detectors.

4. Optional information elements to configure the SAGE and the radio.

5. An optional, vendor-specific information element, typically (but not necessarily) related to further configurations to the radio.

6. An optional session-type specific information element, with configuration information for the particular test (PEVT, PHIST, SAPF, etc.).

The general/common session configuration element IE_Session_CFG is optional when starting tests, i.e., with SESS_START_REQ. If it is not sent, the default values are used.

| Sub-Field Name | Description |
| --- | --- |
| infoElementLen | Len = 20 |
| infoElementType | IE_SESSION_CFG = 2 |
| infoElementBody | |
| pendingTimeoutMs | Number of milliseconds before "START" times out. A value of '0' (default) indicates that the START request should NOT be queued (that is, no SESS_PENDING_RSP, or session pending response, is allowed). |
| configStopFlags | This field has an Offset of 8/36; it has a size of 4 bytes. Sometimes it is desired that the service which is now being started should later stop if certain other services are reconfigured; the reconfiguration(s) which stops the current service is indicated by these flags: 0x00000000: Do not stop for any reconfig  0x00000001: SAGE Config 0x00000002: Radio Config    0x00000004: SAPF Config 0x00000008: SA_STATS Config    0x00000010: SNAP Config (Note that there are four pulse detectors (PDs), numbered 0 through 3.) 0x00000020: PD 0 Config    0x00000040: PD 1 Config 0x00000080: PD 2 Config    0x00000100: PD 3 Config 0x00000200: PHIST Config    0x00000400: PEVT Config 0x00000800: 80211_STATS Config    0x00001000: Vendor Config 0xFFFFFFFF: Use Default Value (depends on service type, see sub-table below) 1. These 'configStopFlags' allow cross-service interdependence. It may seem odd to abort an Spectrum Analyzer vs. Power Frequency (SAPF) session when, say, a PD 0 (pulse detector 0) is reconfigured. However there may be cases where the use of the outputs of these sessions are interrelated, particularly for event classification software. 2. If a session attempts to reconfigure a service to the same values that it already has, the service is NOT stopped and the reconfiguration is considered "successful". |

-continued

| Sub-Field Name | Description |
| --- | --- |
| | 3. Flags can be combined. For example, 0x00000003 flags both SAGE and Radio Config<br>4. The default value depends on the service type:<br><br>Service             configStopFlags<br><br>ALL SERVICES EXCEPT 802.11 STATS     SAGE, Radio, Vendor Configs<br>Spectrum Analyzer (SAPF)     SAPF Config<br>Spectrum Analyzer Stats (SA_STATS)     SA_STATS Config<br>Pulse Event (PEVT)     PD 0, PD 1, PD 2, PD 3, PEVT Configs<br>Pulse Histogram (PHIST)     PD 0, PD 1, PD 2, PD 3, PHIST Configs<br>802.11 Stat (80211_STATS)     802.11 Stats, Radio, Vendor Configs<br>Snapshot Buffer (SNAP)     SNAP Config |
| sessionDurationMs | Duration of session in ms. 0 (the default) indicates no limit to the duration. |
| sessionPriority | 1 = highest, 254 = lowest, 255 (0xFF) requests the default session priority. |

The radio is configured to a starting bandwidth (either 2.4 GHz or one of the 5 GHz bands, for example) before the NSI can begin any testing. Similarly, before many pulse test services can be run, at least one (if not more) of SAGE's four pulse detectors need to be configured at least once. These services include Pulse Events, Pulse Histograms, Snapshot Data, and Spectrum Analyzer Power vs. Frequency (but only if this test is to be triggered by pulse events). Once the pulse detectors are configured, they can be left in their initial configuration for subsequent tests, although the application program can reconfigure them.

The radio configuration element IE_Radio_CFG is described in the table below. It is used to fine-tune the performance of the radio. If the information element is not sent as part of the message, the radio is configured to the default values.

| Sub-Field Name | Description |
| --- | --- |
| infoElementLen | Len = 8 |
| infoElementType | IE_RADIO_CFG = 4 |
| infoElementBody | |
| cfreqkHz | Center Frequency in kHz. Ex: 2400000 for 2.4 GHz There is no default value for this parameter. The radio must be configured to a starting center frequency by the user before 802.11 communications can begin (and of course, before the NSI can begin any testing), using either this information element or the vendor-specific information element. |
| radioBwkHz | Radio bandwidth in kHz. Examples:<br>83000 (83 MHz wideband radio) [default value]<br>23000 (23 MHz narrow band radio) |

The SAGE configuration information element IE_SAGE_CFG is optional. It fine-tunes the performance of the SAGE 10. If the information element is not sent as part of the message, the SAGE 10 is configured to the default values. An example of the SAGE configuration element is set forth below.

| Sub-Field Name | Description |
| --- | --- |
| infoElementType | IE_SAGE_CFG = 3 |
| infoElementBody | |
| lpfParm | Low Pass Filter Parameter:<br><br>Parameter Value     Low Pass Filter Value<br>0     1<br>1     1/2<br>2     1/4<br>3     1/8<br>4     1/16<br>5     1/32<br>6     1/64<br>7     1/128<br>0xFF     use default |
| sageCfgFlags | Flags indicate if custom radioGain, AGC (automatic gain control) config, and/or narrow-band SAGE mode are requested:<br>0x01: radioGainControl indicated below (in the radioGainControl field) is used.<br>0x02: agcControl indicated below (in the agcControl field) is used.<br>0x04: narrow band (20 MHz) SAGE Mode (rather than wideband, or 100 MHz, which is the default)<br>Flags correspond to bit settings for this byte, so 0x01 is the right-most bit;<br>0x02 is the second bit from the right;<br>0x04 is the third bit from the right.<br>Any combination of flags may be set. If the corresponding flag is '0' then the default value for these fields are used. |
| radioGainControl | This value is used if the matching bit is set in the sageCfgFlags. |
| agcControl | This value is used if the matching bit is set in the sageCfgFlags. "agc" stands for automatic gain control. |

The IE_VENDOR_CFG information element contains vendor specific configuration information. Typically this is a configuration that is specific to the particular radio in use.

| Sub-Field Name | Description |
| --- | --- |
| infoElementType | IE_VENDOR_CFG = 13 |
| vendorInfo | Vendor specific information. Format defined by Vendor. |

The NSI provides a pulse detector configuration element (IE_PD_CFG) which is used to configure the pulse detectors. This element must be used the first time the pulse detectors are configured. It is also used if and when the pulse detectors are reconfigured (which may be infrequent). The optional pulse events test configuration element (IE_PEVT_CFG) are shown in the table below. If this configuration element is not sent, the default values are used for the test.

| Sub-Field Name | Description |
| --- | --- |
| infoElementType | IE_PEVT_CFG = 10 |
| maximumNumPevts | Maximum number of Pulse Events in a given PEVT message (Default = 30) |
| pdUsed | These bit flags select which Pulse Detector(s) to use: 0x01: PD 0 used    0x02: PD 1 used 0x04: PD 2 used    0x08: PD 3 used Flags can be combined to indicate more than one pulse detector. For example, 0x0D (binary 0000 1101) indicates the use of pulse detectors 0, 2, and 3. A value of 0xF (binary 0000 1111) indicates to use all detectors (default value). |

Configuring the pulse detectors involves selecting which pulse detector(s) to use for a test. It also involves providing parameters which indicate the kind of signal pulse (for example, ranges for signal power, pulse duration, pulse center frequency, etc.) will, in fact, be interpreted as being a pulse. There are a variety of options when dealing with pulse detectors:

Use the existing pulse detector configuration for the service.

Allocate a currently unused detector.

Reconfigure an existing pulse detector.

Release a pulse detector so that other sessions may use it.

Whether configuring a pulse detector before using it for the first time, or reconfiguring the detector, the header field will first be sent with a particular msgType. This will be followed by the pulse detector configuration element, IE_PD_CFG, described in the table below. (Other information elements may be included in the message as well.) Pulse detectors are selected using PD_ID sub-field values from 0 to 3. These do not correspond to physical pulse detectors; rather, they are a logical reference to a pulse detector that is used by that transport connection supporting the sessions.

| Field Name | Description |
| --- | --- |
| infoElementType | IE_PD_CFG = 7 |
| pdID | Session Pulse Detector ID. Values of 0 to 3, for example. |
| configActionType | Configuration Action Type: 1: Allocate and configure the pulse detector for use by this session. 2: Reconfigure the existing pulse detector 3: Release the pulse detector for others to use. (If value is '3' then the remaining fields are ignored). |

-continued

| Field Name | Description |
| --- | --- |
| configProfile | Configuration Profile: 0: Use the profile fields below. In other words, use '0' for this field in order to completely determine the Pulse Detector configuration, using the remaining parameters in this information element. Any allowed non-zero value (currently 1 for short pulses, and 2 for long pulses): Selects one of several pre-defined configurations, suitable for detecting pulses from different kinds of sources. In this non-zero case, the remaining fields below are ignored. |
| bwMinkHz | Minimum pulse bandwidth in kHz. |
| bwMaxkHz | Maximum pulse bandwidth in kHz. |
| bwHoldkHz | Bandwidth hold value in kHz. |
| bwThreshDbm | dBm threshold value used to define a pulse. |
| cfreqMinkHz | Minimum value of pulse center frequency. Value is number of kHz from the start of the radio band. |
| cfreqMaxkHz | Maximum value of pulse center frequency in kHz. |
| cfreqHoldkHz | Center Frequency Hold value in kHz. |
| durMinUsecs | Minimum Pulse Duration in μseconds. |
| durMaxUsecs | Maximum Pulse Duration in μseconds. |
| durMaxTermElag | Action to be performed on Duration Max: 0: Terminate Pulse with TERMCODE 0 (max duration pulse) 1: Discard Pulse (pulse is ignored) |
| pwrMinDbm | dBm value indicating the minimum pulse power. |
| pwrMaxDbm | dBm value indicating the maximum pulse power. |
| pwrHoldDbm | power hold value. |

The field bwThreshDbm takes a signed dBm value that helps determine which RF signals will be counted as pulses. A pulse is defined by a series of time-contiguous, and bandwidth continuous "peaks", or brief spikes, which determine the overall bandwidth of the pulse (thus the reference to "bandwidth threshold"). A "peak floor" is established to determine which spikes of radio energy qualify as a valid "peak". Energy spikes below this "peak floor" do not qualify, whereas those above the "peak floor" do qualify. The bwThreshDbm parameter determines the "peak floor" based on whether 'bwThreshDbm' is positive or negative:

If bwThreshDbm is negative (ex: −65 dBm), then the peak floor is the same as the value of bwThreshDbm.

If bwThreshDbm is positive (ex: 24 dBm), then the peak floor is determined dynamically based on the current noise floor:

peak floor dBm=noise floor dBm+bwThreshDbm.

The noise floor based mechanism (bwThreshDbm is positive) is used almost exclusively because it responds well to changes in the radio spectrum environment.

There may be pre-defined pulse detection configurations, shown in the table below, to detect certain types of signal pulses.

| IE_PD_CFG configProfile Field Value | Profile Name | Profile Description/Notes |
| --- | --- | --- |
| 1 | ShortPulse1 | Captures short pulse frequency hoppers, including Bluetooth headsets and many cordless phones. |
| 2 | LongPulse1 | Captures long pulses output by microwave ovens and television transmissions (infant monitors, surveillance cameras, X-10 cameras, etc.). |

This following short pulse profile is suitable for detecting short pulse frequency hoppers, such as Bluetooth™ headsets and many cordless phones.

| IE_PD_CFG field name | Profile field value | Notes |
|---|---|---|
| bwMinkHz | 300 | Pulse BW from 300 kHz to 4 MHz, with 4.5 MHz hold |
| bwMaxkHz | 4000 | |
| bwHoldkHz | 4500 | |
| bwThreshDbm | 24 | Pulse defined 24 dBm above noise floor. |
| cfreqMinkHz | 6000 | 6 MHz to 94 MHz center frequency, with 2 MHz hold. |
| cfreqMaxkHz | 94000 | |
| cfreqHoldkHz | 2000 | |
| durMinUsecs | 250 | Pulse durations from 250 to 2000 µs. |
| durMaxUsecs | 2000 | |
| durMaxTermFlag | 1 | Discard the pulse if it is equal to, or longer than, the maximum duration of 2000 µs. |
| pwrMinDbm | −85 | Pulse power from −85 to 0 dBm, with 15 dB hold. |
| pwrMaxDbm | 0 | |
| pwrHoldDbm | 15 | |

The following long pulse profile is suitable for detecting long pulses output by Microwave Ovens and television transmissions (infant monitors, surveillance cameras, X-10 cameras, etc.).

| IE_PD_CFG field name | Profile field value | Notes |
|---|---|---|
| bwMinkHz | 300 | Pulse BW from 300 kHz to 20 MHz, with 8 MHz hold |
| bwMaxkHz | 20000 | |
| bwHoldkHz | 8000 | |
| bwThreshDbm | 24 | Pulse defined 24 dBm above noise floor. |
| cfreqMinkHz | 6000 | 6 MHz to 94 MHz center frequency, with 8 MHz hold. |
| cfreqMaxkHz | 94000 | |
| cfreqHoldkHz | 8000 | |
| durMinUsecs | 2800 | Pulse durations from 2800 to 8000 µs |
| durMaxUsecs | 8000 | |
| durMaxTermFlag | 0 | Do not discard long pulses |
| pwrMinDbm | −70 | Pulse power from −70 to 0 dBm, with 20 dB hold. |
| pwrMaxDbm | 0 | |
| pwrHoldDbm | 20 | |

Before running a pulse histogram test for the first time, the pulse detectors need to be configured. This is done by first running a pulse event test, described above. A session control message is sent containing a header field with a sessType value of '13'. That is followed by the optional information elements, as shown in the table below detailing the optional pulse histogram test configuration element (IE_PHIST_CFG). If it is not sent, the default values (shown in the table) are used.

| Sub-Field Name | Description |
|---|---|
| infoElementType | IE_PHIST_CFG = 9 |
| forwardTimeoutMs | Number of milliseconds between each Pulse Histogram message update. The default is 1000 (which yields 1 Pulse Histogram message each second). |
| pdUsed | These bit flags select which Pulse Detector(s) to use: 0x01: PD 0 used   0x02: PD 1 used 0x04: PD 2 used   0x08: PD 3 used Flags can be combined to indicate more than one pulse detector. For example, 0x0D (binary 0000 1101) indicates the use of pulse detectors 0, 2, and 3. A value of 0xF (binary 0000 1111) indicates to use all detectors (default value). |

The spectrum analyzer power vs. frequency test is started by sending a session control message containing a header field with a sessType value of '10'; that is followed by the optional information elements, as shown below.

| Sub-Field Name | Description |
|---|---|
| infoElementType | IE_SAPF_CFG = 6 |
| usecsBetweenSamples | This value indicates the number of µseconds between spectrum analyzer power vs. frequency samples. The default value of 100,000 translates to 10 samples per second. |
| transitionalPdUsed | Indicates of which PD to use for Transitional Mode. 0x00: PD 0 used   0x01: PD 1 used 0x02: PD 2 used   0x03: PD 3 used 0xFF: Transitional mode NOT USED (default value) If 'transitionalPdUsed' is not equal to 0xFF, then the SAPF sample collection is turned on and off via the specified Pulse Detector. When the Pulse Detector is ON (a pulse is in progress), SAPF samples are collected. When the Pulse Detector transits to OFF, the samples are stopped. The time between samples sent to the user is still determined by 'usecsBetweenSamples'. |

The spectrum analyzer statistics test is started by send a session control message containing a header field with a sessType value of '11'. That is followed by the optional information elements, as described below.

| Sub-Field Name | Description |
|---|---|
| infoElementType | IE_SA_STATS_CFG = 8 |
| usecsBetweenSamples | Indicates the number of µseconds between spectrum analyzer stats updates. A default value of 100,000 translates to 10 samples per second. |
| pwrThreshDbm | dBm power threshold value used by "duty cycle" and "peak count" stats info. The default value is 24 dBm. (The "duty cycle" statistics indicate how often the signal power is above the threshold value. The "peak count" statistics will only count peaks at or above the threshold.) |

The field pwrThreshDbm takes a signed dBm value that helps determine the minimum power level for the "duty cycle" and the "peak count." The pwrThreshDbm parameter determines the "floor", or minimum energy level for these measurements, based on whether pwrThreshDbm is positive or negative:

If pwrThreshDbm is negative (e.g.,: −65 dBm), then the floor is the same as the value of pwrThreshDbm.

If pwrThreshDbm is positive (e.g.,: 24 dBm), then the floor is determined dynamically based on the current noise floor: power floor dBm=noise floor dBm+pwrThreshDbm. A noise floor based mechanism (pwrThreshDbm is positive) is used almost exclusively because it responds well to changes in the radio spectrum environment.

The spectrum event data test is started by sending a message containing a header field with a sessType value of '14'.

The snapshot message test is started by sending a message containing a header field with a sessType value of '17', followed by the optional configuration elements. The optional snapshot message configuration element (IE_SNAP_CFG) follows. If it is not sent, default values are used for the test.

| Sub-Field Name | Description |
| --- | --- |
| infoElementLen | Len = 12 |
| infoElementType | IE_SNAP_CFG = 12 |
| numberSamples | Number of samples to capture |
| snapPdUsed | Snapshot Pulse Detector used to trigger the snapshot.<br>0x00: PD 0 used          0x01: PD 1 used<br>0x02: PD 2 used          0x03: PD 3 used<br>0xFF: Snapshot Use DISABLED |

By specifying which pulse detector is used to trigger the snapshot capture, it is possible to control which types of signal pulses are detected to trigger a raw ADC data capture.

The NSI may reply to test start messages to inform the requesting software application of the status of the test, and the ability of the underlying applications to deliver data for the requested tests. It is also possible to stop a test that has been requested. The table below summarizes the session control status messages which may be sent via the NSI.

FIGS. 24-27 illustrate exemplary screens to display spectrum activity information. An exemplary graphs panel consists of the graphs or plots on the right of the screen and plot type on the left tree view. When the tree view is opened and any plot type is clicked, the corresponding plot will be added and displayed on the right side. Any plot on the right side of the screen can be removed by clicking on the close icon on the plot. As soon as the "Start" button is hit and data is available on the socket the spectrum analyzer plots will be plotted. If the "Stop" button is pressed the plotting action is disabled and the spectrum analyzer plots will no longer be updated with incoming data. The spectrum activity information is displayed on the spectrum analyzer graphs, pulse histograms and pulse plots.

The spectrum analyzer graph in FIG. 24 contains spectrum analyzer power vs. frequency information, described above. The spectrum analyzer stats are shown in FIG. 25 and include the spectrum analyzer stats graph, the duty cycle graph, and number of peaks bar chart. This SA stats graph displays statistical data on the frequency spectrum. It is based on spectrum messages, where a single message is built from a specific number of successive FFT cycles. Typically, 40,000 successive FFTs of the RF spectrum, taken over a total time of 1/10 of a second, are used to construct the statistics for a single message. A first line shows the average power over the sampling period (i.e., over the 40,000 FFTs, or 1/10 second). A second line, which can change rapidly from 1/10 of a second to the next, represents the "maximum power per single sampling period." It shows the maximum power achieved in each of 256 frequency bins, during the 1/10 second sampling period. A third line represents the "absolute maximum power" over all messages received so far. The Duty Cycle graph shows the percentage of the time that, for a given frequency, the power in the RF spectrum is above a specified threshold.

The Number of Peaks chart shows the percentage of time that there are "N" peaks in the RF spectrum. For example, if the "0" bar is hovering around 50%, then 50% of the time there are no peaks at all. If the "1" bar is hovering at around 20%, then 20% of the time there is just 1 peak in the RF spectrum. If the "2" bar hovers at 5%, then 5% of the time SAGE is detecting 2 peaks in the RF spectrum. (The "9" bar is a special case: If the "9" bar is hovering at, say, 3%, then 3% of the time SAGE is seeing 9 or more peaks in the RF spectrum.

FIG. 26 shows exemplary pulse histogram plots for center frequency, bandwidth, pulse duration, pulse gap, pulse power and pulse count. As soon as the "Start" button and histogram data is available on the socket the histograms will be plotted. If the "Stop" button is pressed the plotting action is disabled and the histograms will no longer be updated with incoming data. The following types of plots are available for viewing:

Center Frequency shows the distribution of the central frequencies of the pulses. The graph spans a bandwidth of 100 MHz. The actual central frequency is determined by combining the central frequency shown on the graph with the overall RF center frequency (2.4 GHz). Also, both ends of the graph are typically flat, since the actual bandwidth captured by the radio is 83 MHz.

Bandwidth shows the distribution of the bandwidths of the pulses.

Pulse Duration shows the distribution of the duration of the pulses. For example, a peak at around 200 μsec indicates that many of the pulses persist for about 200 μsec.

Pulse Gap shows the distribution of the gap times. A peak at about 1500 μsec indicates that many of the pulses are separated in time by gaps that are about 1500 μsec long.

Pulse Power indicates the distribution of the power of the pulses.

Pulse Count indicates, on a logarithmic scale, the number of pulse events counted per sample interval. Colors may be used indicate that the number of pulses poses little risk, some risk, or significant risk, for example, to a particular type of communications occurring in the radio frequency band, such as 802.11 communications.

Figure 27:
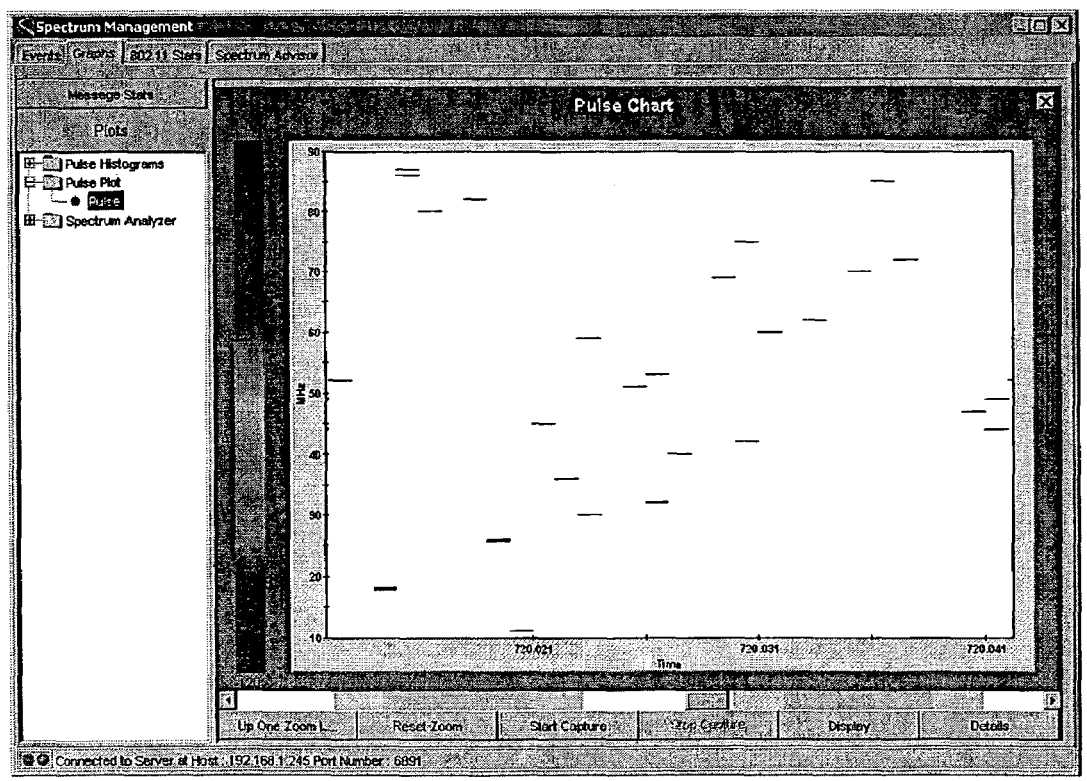

FIG. 27 shows a pulse chart/plot for various pulses detected in the frequency band. When the "Capture" button is selected, the GUI application will capture the pulses and display them on the pulse chart. Each pulse is defined in three dimensions and presents a single dot for each pulse. It is intended to show the time at which each pulse occurred (horizontal axis), the center frequency (vertical axis), and the power (the dot color). A color-coded legend may be used on the left side of the pulse chart. A zooming action can be performed by dragging the mouse on a specified area in the plot below the area to be zoomed, in order to magnify that area.

Figure 28:
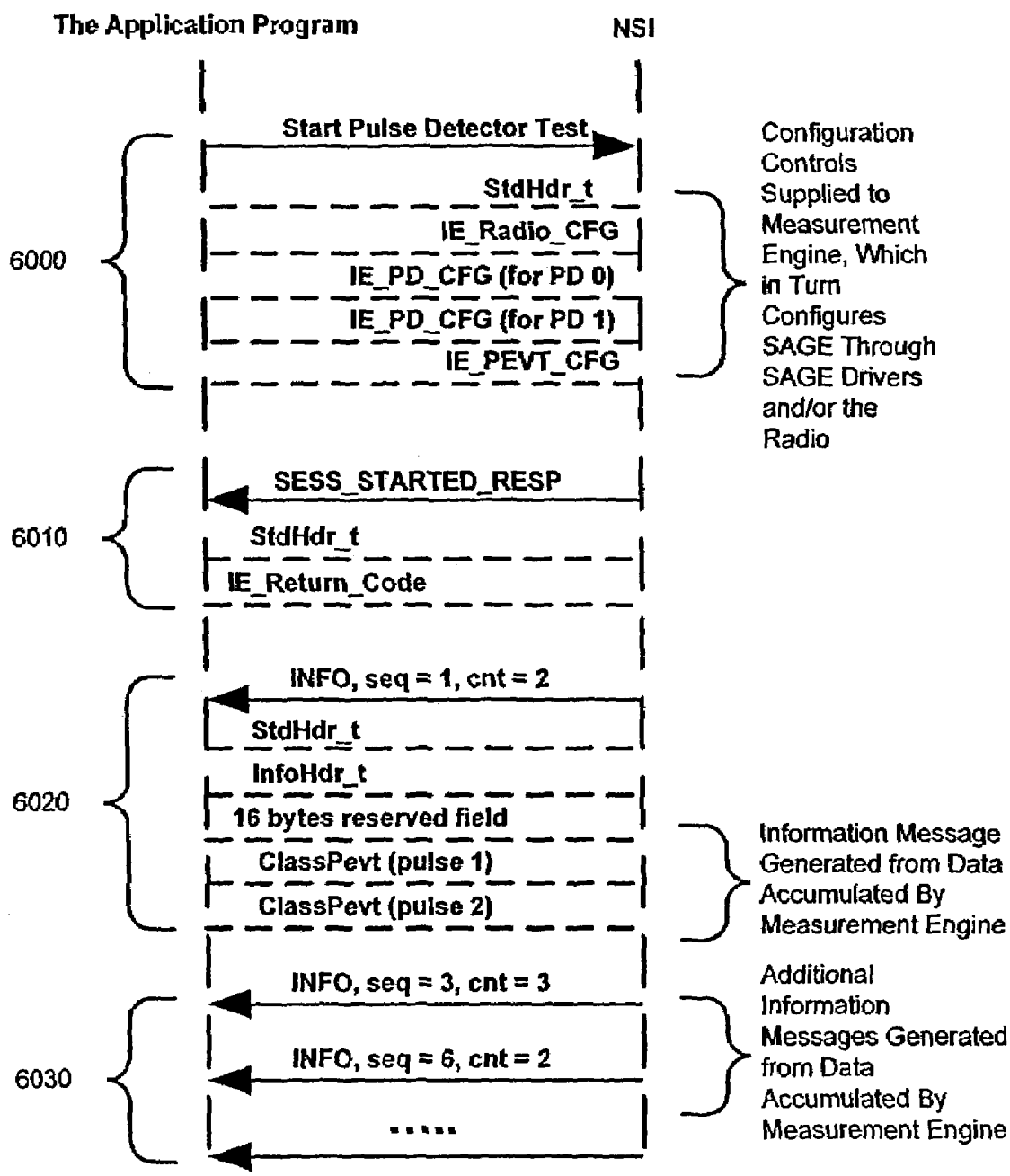
FIG. 28 is a ladder diagram illustrating how messages are generated to access SAGE data through a network spectrum interface (NSI).

An example of how the NSI can be used to configure and obtain data from a SAGE pulse detector is shown in FIG. 28. In the diagram, solid lines are for the unified message and the dotted lines indicate the headers, information elements and information messages sent that make up a single message. Step 6000 represents a software application sending to the NSI a start message. The message includes a message header with a particular msgType value that indicates it is a start message and a sessType value to indicate that it is a pulse event test. If it is the first message request sent, the start message includes either the IE_Radio_CFG element, or the IE_VENDOR_CFG element. Two IE_PD_CFG elements are sent to configure pulse detector 0 to detect short pulses and pulse detector 1 to detector long pulses. A pulse event information element IE_PEVT_CFG is also sent to indicate which of the configured pulse detectors to use. The applicable data from the SAGE is generated and made available to the NSI. In step 6010, the NSI replies with a message confirming that the service was started and the status of the service in process. In step 6020, a series of informational messages are sent with data. Each message includes indicates that it is an informational message and includes one or more of the ClassPevt fields which hold the actual data that described the measured properties of pulses that are detected within the configured parameters. Further information messages are sent as shown at step 6030.

In sum, a method is provided for generating information pertaining to activity occurring in a radio frequency band, comprising steps of receiving energy in the radio frequency band in which activity associated with a plurality of signal types may occur; and generating spectrum activity information for activity in the radio frequency band from the received radio frequency energy.

In addition, a device is provided for generating information pertaining to activity occurring in a radio frequency band, comprising a spectrum analyzer that computes power values for radio frequency energy received in at least part of the radio frequency band for a time interval; and a signal detector coupled to the spectrum analyzer that detects signal pulses of radio frequency energy that meet one or more characteristics.

Furthermore, a processor readable medium is provided that is encoded with instructions that, executed by a processor, cause the processor to perform steps of computing power spectral information for radio frequency energy received during a time interval in at least part of a radio frequency band in which activity associated with a plurality of signal types may occur; and detecting from the power spectral information signal pulses of radio frequency energy that have meet one or more characteristics.

Further still, a system is provided that monitors activity in a radio frequency band where signals of multiple types may be occurring, comprising a process for analyzing radio frequency energy occurring in the radio frequency band and accumulating data associated with activity in the radio frequency band, wherein the process is responsive to a request containing parameters associated with spectrum analysis to be performed by the process.

Further, a system is provided that monitors activity in a radio frequency band where signals of multiple types may be occurring, comprising a process that generates spectrum activity information for activity in the radio frequency band based on received radio frequency energy from the radio frequency band; an application program that processes spectrum activity information pertaining to activity in the radio frequency band; and an application programming interface that presents messages the process and returns spectrum activity information to the application program.

The above description is intended by way of example only and is not intended to limit the present invention in any way.

What is claimed is:

1. A method for generating information pertaining to activity occurring in a radio frequency band, comprising:
    a. receiving energy in the radio frequency band in which activity associated with a plurality of signal types may occur;
    b. generating power values at a plurality of frequency bins from a digital signal representing radio frequency energy received in the radio frequency band during a time interval;
    c. adding the power at each frequency bin for a current time interval with the power at the corresponding frequency bin for a previous time interval to obtain an average power at each frequency bin;
    d. comparing the power at each frequency bin with a power threshold to obtain a duty count of the number of times that the power at each frequency bin exceeds the power threshold over time intervals.

2. The method of claim 1, and further comprising comparing the power at each frequency bin for a current time interval with the power at the corresponding frequency bin for a previous time interval to track the maximum power in each frequency bin over time intervals.

3. The method of claim 2, and further comprising storing in a memory one or more of: the average power at each frequency bin, the duty count for each frequency bin and the maximum power for each frequency bin over time intervals.

4. The method of claim 2, and further comprising comparing the power at each frequency bin with a peak threshold over multiple update cycles each of which comprises a plurality time intervals, thereby tracking the number of update cycles during which a certain number of peaks are detected.

5. The method of claim 4, and further comprising storing the number of update cycles during which the certain number of peaks are detected.

6. The method of claim 4, and further comprising displaying the duty count and number of peaks detected.

7. A method for generating information pertaining to activity occurring in a radio frequency band, comprising:
    a. receiving energy in the radio frequency band in which activity associated with a plurality of signal types may occur;
    b. generating power spectral information from the radio frequency energy received in the radio frequency band; and
    c. verifying authenticity of a device operating in the radio frequency band based on the power spectral information obtained when the device emits a signal in the radio frequency band.

8. The method of claim 7, wherein verifying comprises comparing signal pulse characteristics obtained when the device emits a signal with stored signal pulse characteristics that are associated with devices authorized to operate in the radio frequency band.

9. The method of claim 8, wherein verifying comprises comparing signal pulse characteristics associated with the emitted signal with signal pulse characteristics associated with an identifier that matches an identifier contained in the emitted signal and determining that the device is not authorized when the captured signal pulse characteristics do not match the stored signal pulse characteristics for that identifier.

10. A device for generating information pertaining to activity occurring in a radio freciuency band, comprising:
    a. a spectrum analyzer that computes power values for radio frequency energy received in at least part of the radio frequency band for a time interval; and
    b. a signal detector coupled to the spectrum analyzer that detects signal pulses of radio frequency energy that meet one or more characteristics, wherein the signal detector comprises a peak detector circuit that detects one or more peaks from the power values for a time interval, wherein a peak corresponds to power values above a threshold at a predetermined number of contiguous frequencies; and at least one pulse detector circuit coupled to the peak detector circuit that detects signal pulses that meet one or more characteristics based on one or more peaks detected the peak detector, wherein the pulse detector circuit outputs a trigger signal in response to detecting a signal pulse that meets the configurable characteristics.

11. The device of claim 10, and further comprising a memory responsive to the trigger signal that stores digital signals representing samples of radio frequency energy received in the radio frequency band.

12. The device of claim 10, wherein the memory further stores a timestamp signal identifying a time associated with an occurrence of the trigger signal.

13. The device of claim 10, wherein the memory is a first-in-first-out buffer.

14. A device for generating information pertaining to activity occurring in a radio frequency band, comprising:
   a. a spectrum analyzer that computes power values for radio frequency energy received in at least part of the radio frequency band for a time interval, wherein the spectrum analyzer receives as input a digital signal representing activity in at least a portion of the frequency band and comprises a power calculation circuit that computes power values for a plurality of frequency bins for a time interval, and wherein the spectrum analyzer further computes from the power values for the plurality of frequencies, one or more data selected from the group consisting of: average power at each frequency bin over time intervals; a duty count comprising a running sum at each time interval of the number of times the power at each frequency bin exceeds the power threshold; a maximum power for each frequency bin for a current and prior time intervals; and a running count of the number of time intervals in which a certain number of peaks have been detected;
   b. a signal detector coupled to the spectrum analyzer that detects signal pulses of radio frequency energy that meet one or more characteristics;
   c. a memory for storing the one or more data; and
   d. a memory controller coupled to the memory, wherein the signal detector circuit outputs a trigger signal in response to detecting a certain type of pulse, and wherein the trigger signal is coupled to the memory controller to write to the memory the output of the power calculation circuit for one or more time intervals.

15. A device for generating information pertaining to activity occurring in a radio frequency band, comprising:
   a. a radio receiver capable of receiving radio frequency energy in the radio frequency band in which activity associated with a plurality of signal types may occur, wherein the radio receiver downconverts signals in a portion of the radio frequency band, and is tunable to different portions of the radio frequency band;
   b. a spectrum analyzer that computes power values for radio frequency energy received in at least part of the radio frequency band for a time interval; and
   c. a signal detector coupled to the spectrum analyzer that detects signal pulses of radio frequency energy that meet one or more characteristics.

16. In combination, a device for generating information pertaining to activity occurring in a radio frequency band, comprising a radio receiver capable of receiving radio frequency energy in the radio frequency band in which activity associated with a plurality of signal types may occur, a spectrum analyzer that computes power values for radio frequency energy received in at least part of the radio frequency band for a time interval, and a signal detector coupled to the spectrum analyzer that detects signal pulses of radio frequency energy that meet one or more characteristics, wherein the radio receiver, spectrum analyzer and signal detector reside on a card device having an interface, and a host device coupled to the card device via the interface, wherein the host device comprises a host processor and memory that stores programs that are used to process the output of the spectrum analyzer and signal detector.

17. The method of claim 7, and further comprising storing for each of a plurality of authorized devices an identifier for the device and corresponding spectral characteristics for the device, and wherein verifying comprises recovering an identifier from signal emitted by the device and comparing the power spectral information for the signal emitted by the device with the stored spectral characteristics associated with that identifier to determine whether the device is an authorized device.

18. The method of claim 17, wherein the identifier is a MAC address or IP address.

19. The method of claim 17, and further comprising detecting that the device is masquerading as an authorized device when the power spectral information does not match the stored spectral characteristics associated with the identifier recovered from the signal transmitted by the device.

* * * * *